(12) United States Patent
Park et al.

(10) Patent No.: US 12,301,967 B2
(45) Date of Patent: May 13, 2025

(54) CAMERA MODULE AND OPTICAL DEVICE

(71) Applicant: LG INNOTEK CO., LTD., Seoul (KR)

(72) Inventors: Tae Bong Park, Seoul (KR); Jung Seok Oh, Seoul (KR); Jung Cheol Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 206 days.

(21) Appl. No.: 18/013,242

(22) PCT Filed: Aug. 5, 2021

(86) PCT No.: PCT/KR2021/010316
§ 371 (c)(1),
(2) Date: Dec. 27, 2022

(87) PCT Pub. No.: WO2022/031066
PCT Pub. Date: Feb. 10, 2022

(65) Prior Publication Data
US 2023/0336856 A1 Oct. 19, 2023

(30) Foreign Application Priority Data

| Aug. 6, 2020 | (KR) | ................. | 10-2020-0098397 |
| Aug. 6, 2020 | (KR) | ................. | 10-2020-0098398 |
| Aug. 4, 2021 | (KR) | ................. | 10-2021-0102580 |

(51) Int. Cl.
*H04N 23/54* (2023.01)
*H04N 23/55* (2023.01)
*H04N 23/68* (2023.01)

(52) U.S. Cl.
CPC ............ *H04N 23/54* (2023.01); *H04N 23/55* (2023.01); *H04N 23/687* (2023.01)

(58) Field of Classification Search
CPC ....... H04N 23/54; H04N 23/687; H04N 23/55
(Continued)

(56) References Cited

U.S. PATENT DOCUMENTS 5,061,868 A * 10/1991 Iwazaki ................. H02K 29/08
310/90
10,812,716 B2 10/2020 Kim et al.
(Continued)

FOREIGN PATENT DOCUMENTS

| CN | 105573014 | 5/2016 |
| CN | 210807408 | 6/2020 |

(Continued)

OTHER PUBLICATIONS

International Search Report (with English Translation) dated Nov. 17, 2021 issued in Application No. PCT/KR2021/010316.
(Continued)

*Primary Examiner* — Joel W Fosselman
(74) *Attorney, Agent, or Firm* — KED & ASSOCIATES, LLP

(57) ABSTRACT

One embodiment comprises: a fixed unit comprising first to fourth magnets; and a movable unit disposed so as to be spaced apart from the fixed unit. The movable unit comprises: a coil comprising first to fourth coil units facing the first to fourth magnets; a position sensor comprising a first sensor for outputting a first output by detecting a magnetic field of the first magnet, a second sensor for outputting a second output by detecting a magnetic field of the second magnet, and a third sensor for outputting a third output by detecting a magnetic field of the third magnet; a first control unit for receiving the first and second outputs and driving the first and third coil units; and a second control unit for receiving the second output and driving the second and fourth coil units, wherein the movable unit moves in a direction perpendicular to an optical axis or rotates about the optical axis, by means of an interaction between the first to fourth magnets and the first to fourth coil units.

19 Claims, 46 Drawing Sheets

(58) Field of Classification Search
USPC .......................................................... 348/335
See application file for complete search history.

(56) References Cited

U.S. PATENT DOCUMENTS

| | | | |
|---|---|---|---|
| 10,924,675 | B2 | 2/2021 | Hubert et al. |
| 2006/0064884 | A1* | 3/2006 | Seo ..................... H04N 23/68 |
| | | | 348/E5.046 |
| 2011/0096178 | A1 | 4/2011 | Ryu et al. |
| 2011/0193977 | A1 | 8/2011 | Yamada et al. |
| 2020/0120242 | A1* | 4/2020 | Wade ..................... G02B 7/02 |
| 2020/0192191 | A1 | 6/2020 | Wade et al. |
| 2021/0092297 | A1 | 3/2021 | Smyth et al. |

FOREIGN PATENT DOCUMENTS

| | | |
|---|---|---|
| CN | 211086872 | 7/2020 |
| JP | 2005-246233 | 9/2005 |
| JP | 4935308 | 5/2012 |
| JP | 5115494 | 1/2013 |
| KR | 10-2006-0051593 | 5/2006 |
| KR | 10-0952620 | 4/2010 |
| KR | 10-2010-0116706 | 11/2010 |
| KR | 10-1886362 | 8/2018 |
| KR | 10-2019-0097786 | 8/2019 |
| KR | 10-2020-0027741 | 3/2020 |
| KR | 10-2020-0058815 | 5/2020 |

OTHER PUBLICATIONS

European Search Report dated Jul. 10, 2024 issued in Application No. 21854323.9.

* cited by examiner

CAMERA MODULE AND OPTICAL DEVICE

CROSS-REFERENCE TO RELATED PATENT APPLICATIONS

This application is a U.S. National Stage Application under 35 U.S.C. § 371 of PCT Application No. PCT/KR2021/010316, filed Aug. 5, 2021, which claims priority to Korean Patent Application No. 10-2020-0098397, filed Aug. 6, 2020; Korean Patent Application No. 10-2020-0098398, filed Aug. 6, 2020; and Korean Patent Application No. 10-2021-0102580, filed Aug. 4, 2021, whose entire disclosures are hereby incorporated by reference.

TECHNICAL FIELD

Embodiments relate to a camera module and an optical instrument including the same.

BACKGROUND ART

Voice coil motor (VCM) technology, which is used in conventional general camera modules, is difficult to apply to a micro-scale camera module, which is intended to exhibit low power consumption, and study related thereto has been actively conducted.

There is increasing demand for, and production of, electronic products such as smartphones and cellular phones equipped with cameras. Cameras for cellular phones have been increasing in resolution and decreasing in size, and accordingly, actuators therefor are also becoming smaller, larger in diameter, and more multifunctional. In order to realize a high-resolution cellular phone camera, improvement in the performance of the cellular phone camera and additional functions, such as autofocus, shutter shaking prevention, and zooming in and out, are required.

DISCLOSURE

Technical Problem

Embodiments provide a camera module, which is capable of increasing an OIS correction angle resulting from rolling operation and reducing the amount of power consumed during OIS operation, and an optical instrument including the same.

Technical Solution

A camera module according to an embodiment includes a fixed unit including a first magnet, a second magnet, a third magnet, and a fourth magnet, and a moving unit disposed so as to be spaced apart from the fixed unit. The moving unit includes a coil including a first coil unit facing the first magnet, a second coil unit facing the second magnet, a third coil unit facing the third magnet, and a fourth coil unit facing the fourth magnet, a position sensor including a first sensor configured to detect a magnetic field of the first magnet and to output a first output, a second sensor configured to detect a magnetic field of the second magnet and to output a second output, and a third sensor configured to detect a magnetic field of the third magnet and to output a third output, a first controller configured to receive the first output and the third output and to drive the first and third coil units, and a second controller configured to receive the second output and to drive the second and fourth coil units. The moving unit moves in a direction perpendicular to an optical axis or rotates about the optical axis due to interaction between the first to fourth magnets and the first to fourth coil units.

The moving unit may include a first circuit board spaced apart from the fixed unit, and the first to fourth coil units and the first and second controllers may be conductively connected to the first circuit board.

The camera module may include a support member coupled to the fixed unit and the moving unit, the fixed unit may include a second circuit board spaced apart from the first circuit board, and the support member may conductively connect the first circuit board to the second circuit board.

The camera module may include an image sensor disposed on the first circuit board.

The first controller may be configured to apply a first driving signal to the first coil unit and may be configured to apply a second driving signal to the third coil unit, and the second controller may be configured to apply a third driving signal to the second coil unit and may be configured to apply a fourth driving signal to the fourth coil unit. Each of the first to fourth driving signals may be an individual or independent signal.

Each of the first controller and the second controller may be a driver IC chip.

The first controller may be configured to transmit the first output and the third output to an external device using inter-integrated circuit (I2C) communication or serial peripheral interface (SPI) communication, and the second controller may transmit the second output to the external device using the I2C communication or the SPI communication.

The first controller may be configured to apply power to drive each of the first sensor and the third sensor, and the second controller may be configured to apply power to drive the second sensor.

A camera module according to another embodiment includes a fixed unit including a first magnet, a second magnet, a third magnet, and a fourth magnet, and a moving unit disposed so as to be spaced apart from the fixed unit. The moving unit includes a coil including a first coil unit facing the first magnet, a second coil unit facing the second magnet, a third coil unit facing the third magnet, and a fourth coil unit facing the fourth magnet, a position sensor including a first sensor configured to detect a magnetic field of the first magnet, a second sensor configured to detect a magnetic field of the second magnet, and a third sensor configured to detect a magnetic field of the third magnet, a first controller configured to apply a first driving signal to the first coil unit, to receive an output of the first sensor, to apply a second driving signal to the third coil unit, and to receive an output of the third sensor, and a second controller configured to apply a third driving signal to the second coil unit, to receive an output of the second sensor, and to apply a fourth driving signal to the fourth coil unit.

The first controller may be configured to transmit the output of the first sensor and the output of the third sensor to an external device using I2C communication or SPI communication, and the second controller may be configured to transmit the output of the second sensor to the external device using the I2C communication or the SPI communication.

A camera module according to still another embodiment includes a fixed unit including a first magnet, a second magnet, a third magnet, and a fourth magnet, and a moving unit disposed so as to be spaced apart from the fixed unit. The moving unit includes a first coil unit facing the first magnet, a second coil unit facing the second magnet, a third coil unit facing the third magnet, and a fourth coil unit facing the fourth magnet. Each of the first to fourth magnets includes an inner portion formed as one of an N pole and an S pole and an outer portion formed as the remaining one of the N pole and the S pole. The moving unit moves in an x-axis direction or a y-axis direction perpendicular to an optical axis or rotates about the optical axis due to interaction between the first to fourth magnets and the first to fourth coil units. The first and third coil units are coils used to move the moving unit in the x-axis direction, and the second and fourth coil units are coils used to move the moving unit in the y-axis direction. The first coil unit and the third coil unit do not overlap each other in the x-axis direction or the y-axis direction, and the second coil unit and the fourth coil unit do not overlap each other in the x-axis direction or the y-axis direction. The camera module may include a first controller configured to drive the first and third coil units and a second controller configured to drive the second and fourth coil units, and the moving unit may move in a direction perpendicular to the optical axis or may rotate about the optical axis due to interaction between the first to fourth magnets and the first to fourth coil units.

A camera module according to still another embodiment includes a fixed unit including a driving magnet and a moving unit disposed so as to be spaced apart from the fixed unit and including a driving coil and an image sensor. The driving magnet includes a first magnet, a second magnet, a third magnet disposed opposite the first magnet with respect to an optical axis, and a fourth magnet disposed opposite the second magnet with respect to the optical axis, and the driving coil includes a first coil unit facing the first magnet, a second coil unit facing the second magnet, a third coil unit facing the third magnet, and a fourth coil unit facing the fourth magnet. The moving unit moves in an x-axis direction or a y-axis direction perpendicular to the optical axis or rotates about the optical axis due to interaction between the first to fourth magnets and the first to fourth coil units. The first and third coil units are coils used to move the moving unit in the x-axis direction, and the second and fourth coil units are coils used to move the moving unit in the y-axis direction. The first coil unit and the third coil unit do not overlap each other in the x-axis direction or the y-axis direction, and the second coil unit and the fourth coil unit do not overlap each other in the x-axis direction or the y-axis direction.

The camera module may include a position sensor including a first sensor configured to detect a magnetic field of the first magnet, a second sensor configured to detect a magnetic field of the second magnet, and a third sensor configured to detect a magnetic field of the third magnet.

The camera module may include a controller configured to receive a first output of the first sensor, a second output of the second sensor, and a third output of the third sensor and to drive the first to fourth coil units. An independent driving signal may be supplied to each of the first to fourth coil units.

A first driving signal may be applied to the first coil unit, and a second driving signal may be applied to the third coil unit. The second coil unit and the fourth coil unit may be connected to each other in series, and a third driving signal may be applied to the second and fourth coil units connected to each other in series.

The controller may detect displacement of the moving unit in the x-axis direction or the y-axis direction or may detect a rotational angle of the moving unit about the optical axis using at least one of the first to third outputs.

The controller may detect a rotational angle of the moving unit about the optical axis using the first output and the third output.

The first coil unit and the third coil unit may be connected to each other in series, and a first driving signal may be supplied to the first and third coil units connected to each other in series. The second coil unit and the fourth coil unit may be connected to each other in series, and a third driving signal may be supplied to the second and fourth coil units connected to each other in series.

Advantageous Effects

Embodiments enable each of two driver ICs to independently drive four channels in order to perform OIS operation, thereby increasing an OIS correction angle resulting from rolling operation and reducing the amount of power consumed during OIS operation.

BEST MODE

Figure 1:
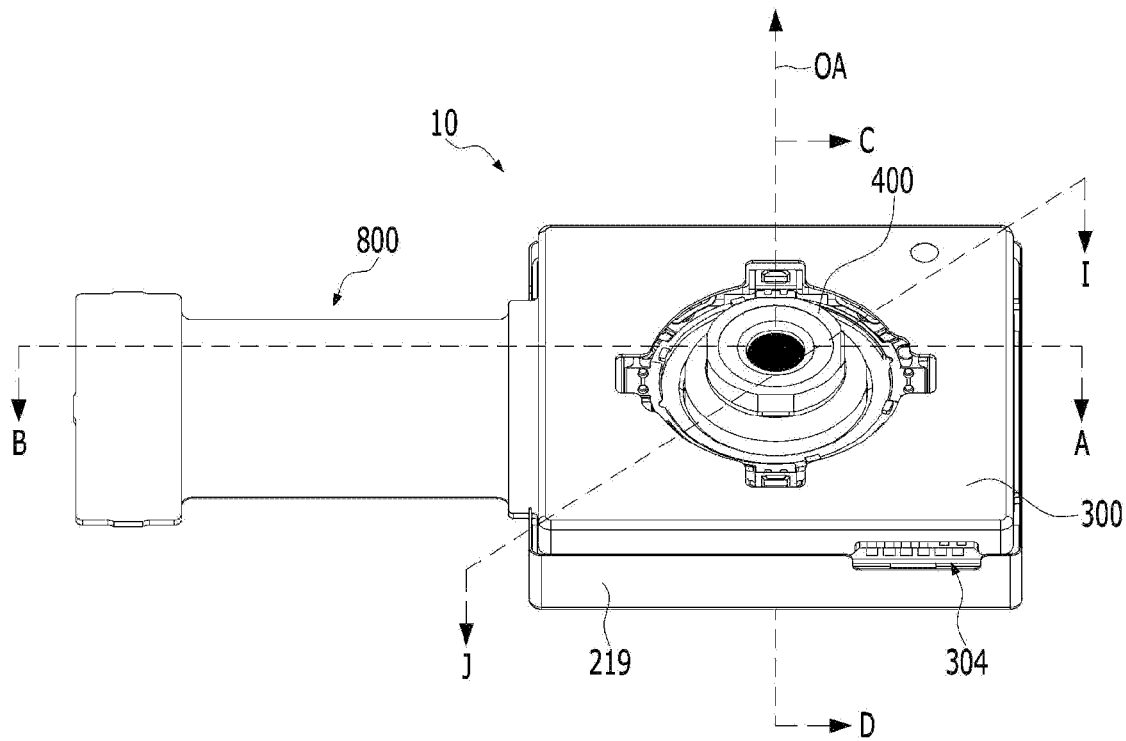
FIG. 1 is a perspective view of a camera module according to an embodiment.

Hereinafter, exemplary embodiments of the present disclosure will be described in detail with reference to the accompanying drawings.

The technical spirit of the disclosure is not limited to the embodiments to be described, and may be implemented in various other forms, and one or more of the components may be selectively combined and substituted for use without exceeding the scope of the technical spirit of the disclosure.

In addition, terms (including technical and scientific terms) used in the embodiments of the disclosure, unless specifically defined and described explicitly, are to be interpreted as having meanings that may be generally understood by those having ordinary skill in the art to which the disclosure pertains, and meanings of terms that are commonly used, such as terms defined in a dictionary, should be interpreted in consideration of the context of the relevant technology.

Further, the terms used in the embodiments of the disclosure are for explaining the embodiments and are not intended to limit the disclosure. In this specification, the singular forms may also include plural forms unless otherwise specifically stated in a phrase, and in the case in which "at least one (or one or more) of A, B, or C" is stated, it may include one or more of all possible combinations of A, B, and C.

In addition, in describing the components of the embodiments of the disclosure, terms such as "first," "second," "A," "B," "(a)," and "(b)" can be used. Such terms are only for distinguishing one component from another component, and do not determine the nature, sequence, or procedure of the corresponding constituent elements.

In addition, when it is described that a component is "connected," "coupled" or "joined" to another component, the description may include not only being directly "connected," "coupled" or "joined" to the other component but also being "connected," "coupled" or "joined" by another component between the component and the other component. In addition, in the case of being described as being formed or disposed "above (on)" or "below (under)" another component, the description includes not only the case where the two components are in direct contact with each other, but also the case where one or more other components are formed or disposed between the two components. In addition, when expressed as "above (on)" or "below (under)," it may refer to a downward direction as well as an upward direction with respect to one element.

Hereinafter, an AF moving unit may alternatively be referred to as a lens moving apparatus, a lens moving unit, a voice coil motor (VCM), an actuator, or a lens moving device. Hereinafter, a "coil" may alternatively be referred to as a coil unit, and an "elastic member" may alternatively be referred to as an elastic unit or a spring.

In addition, in the following description, a "terminal" may alternatively be referred to as a pad, an electrode, a conductive layer, or a bonding unit.

For convenience of description, a camera module according to an embodiment will be described using the Cartesian coordinate system (x,y,z), but the embodiments are not limited thereto, and may be described using other coordinate systems. In the respective drawings, the x-axis and the y-axis may be directions perpendicular to the z-axis, which is an optical-axis direction, the z-axis direction, which is the optical-axis (OA) direction, may be referred to as a "first direction," the x-axis direction may be referred to as a "second direction," and the y-axis direction may be referred to as a "third direction."

The camera module according to the embodiment may perform an "autofocus function." Here, the autofocus function is a function of automatically focusing an image of a subject on the surface of an image sensor.

In addition, the camera module according to the embodiment may perform a "hand-tremor compensation function." Here, the hand-tremor compensation function is a function of inhibiting the contour of a captured still image from being blurred due to vibration caused by shaking of a hand of a user when capturing the still image.

Figure 2:
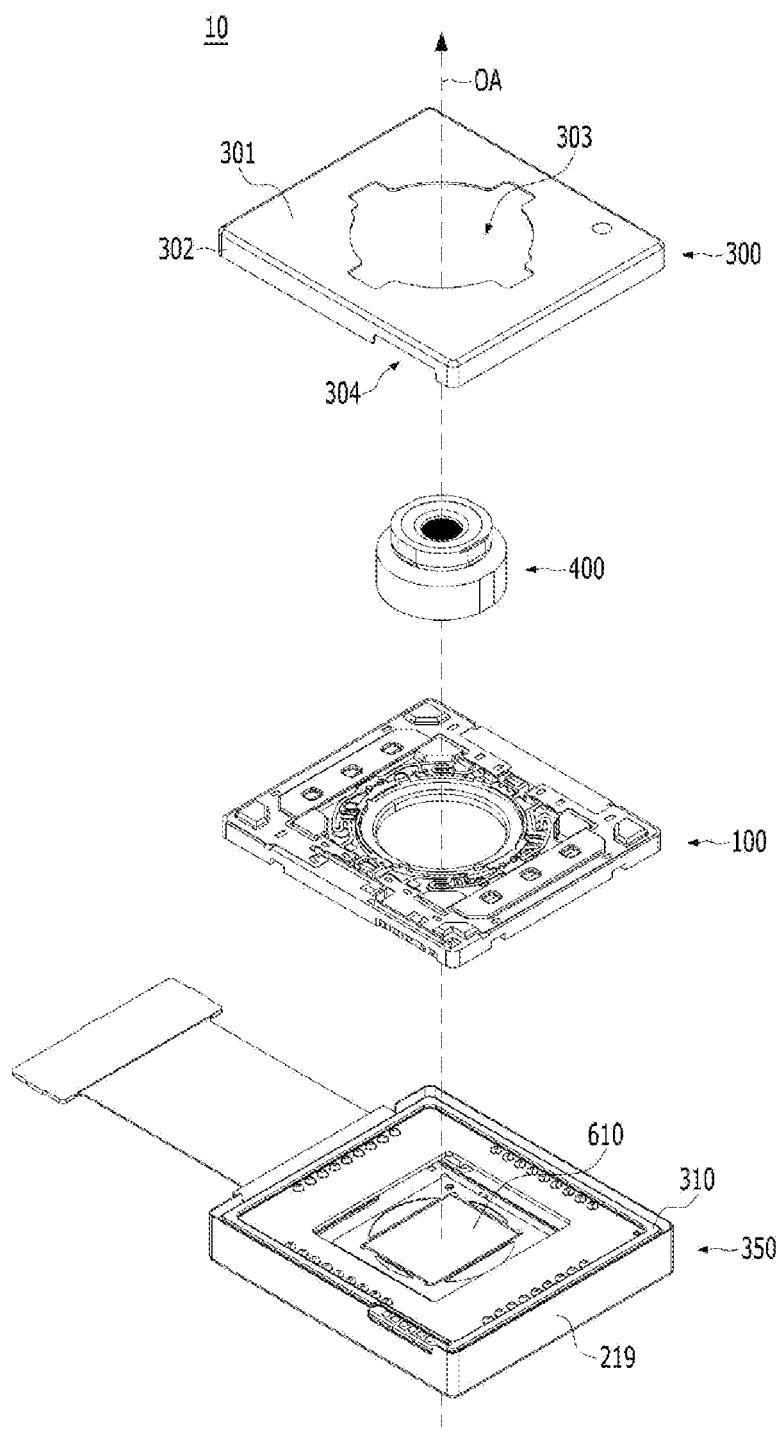
FIG. 2 is an exploded perspective view of the camera module shown in FIG. 1.
Figure 3:
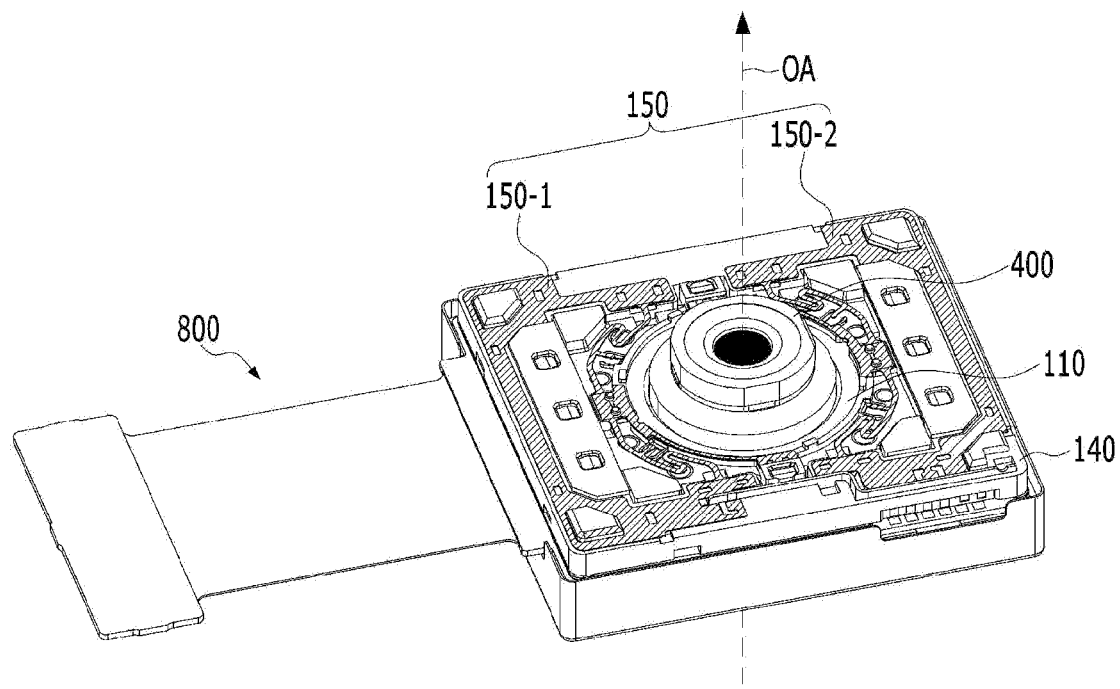
FIG. 3 is a coupled perspective view of the camera module shown in FIG. 1, with a cover member removed therefrom.
Figure 4:
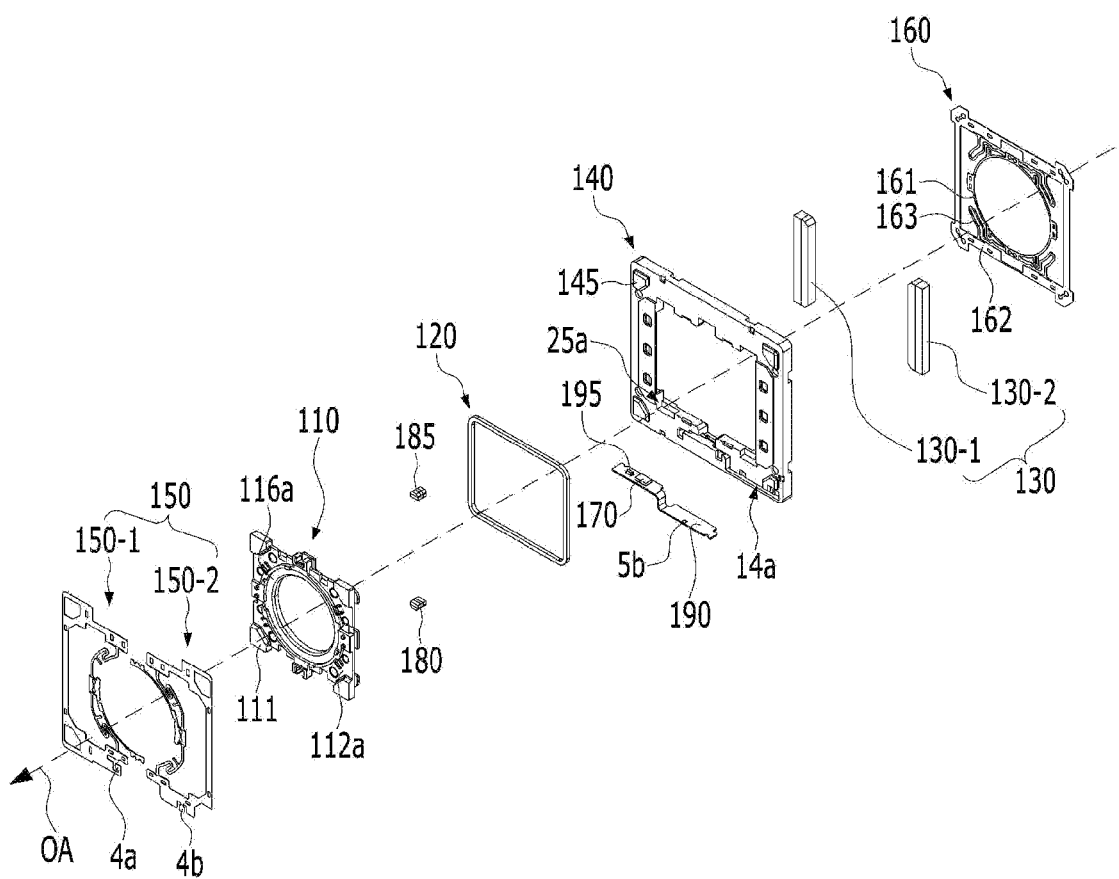
FIG. 4 is an exploded perspective view of an AF moving unit shown in FIG. 2.
Figure 5:
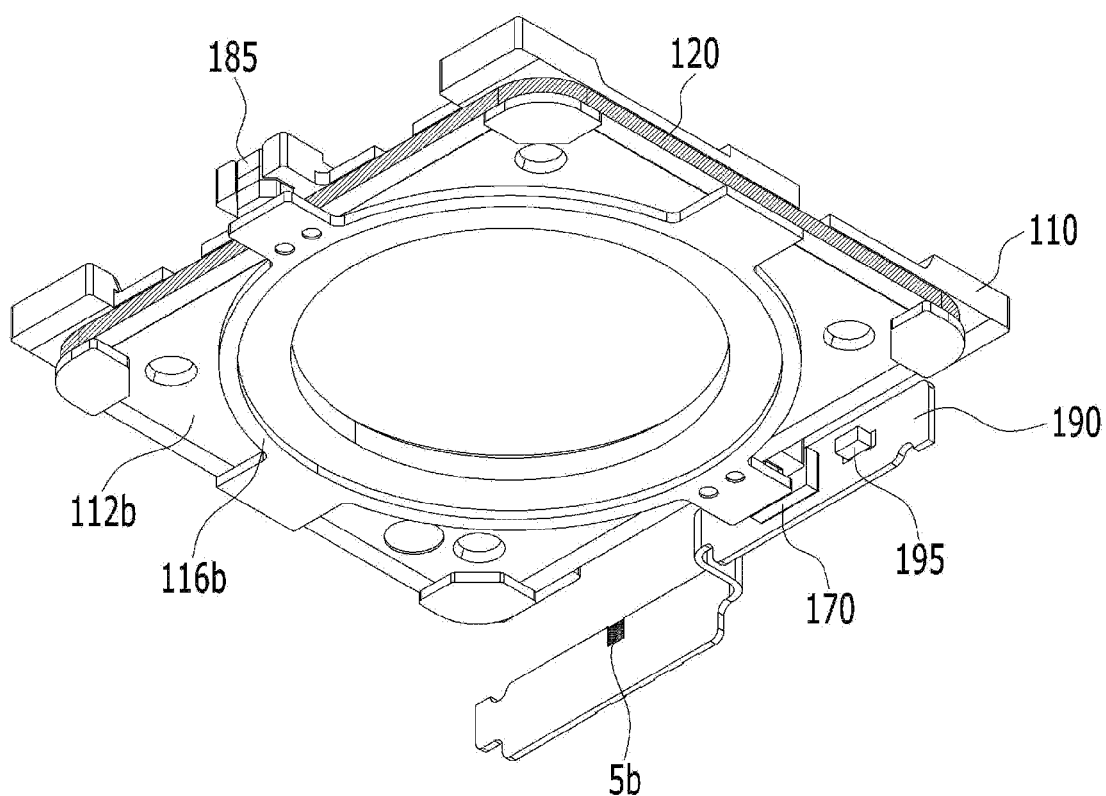
FIG. 5 is a perspective view of a bobbin, a sensing magnet, a balancing magnet, a first coil, a circuit board, a first position sensor, and a capacitor shown in FIG. 4.
Figure 6:
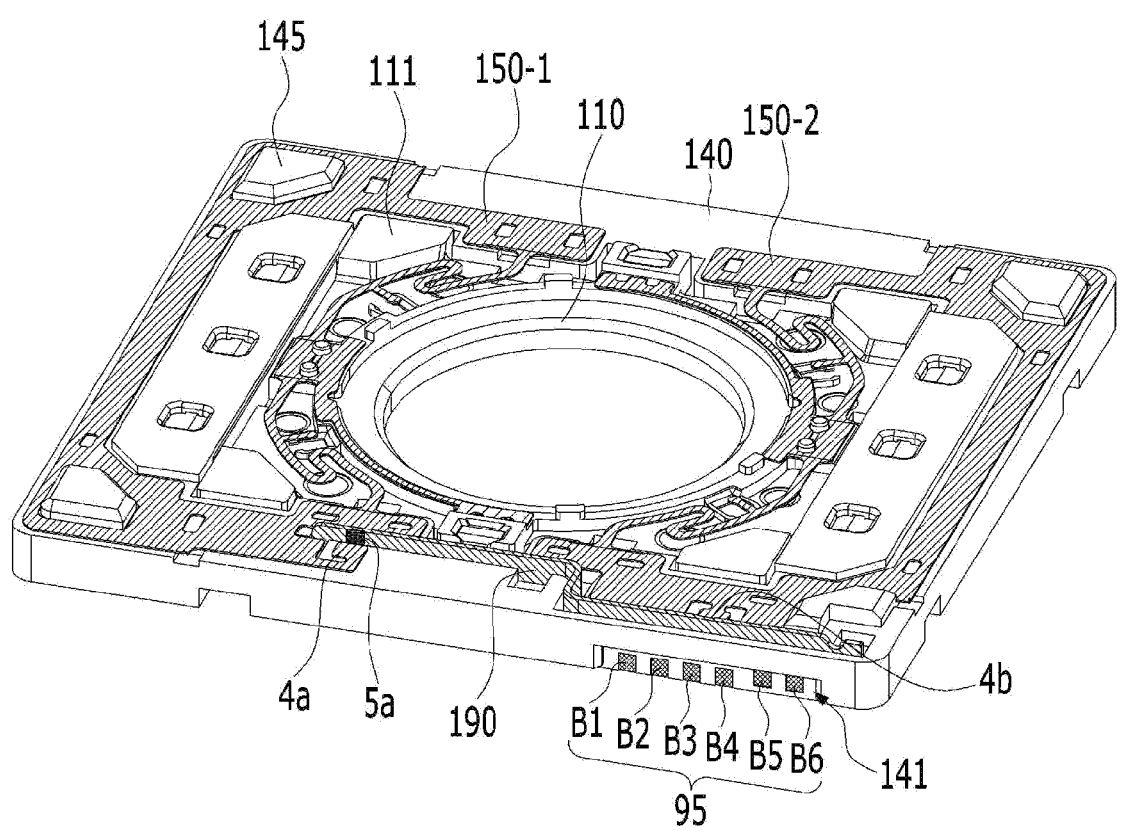
FIG. 6 is a perspective view of the bobbin, a housing, the circuit board, and an upper elastic member.
Figure 7:
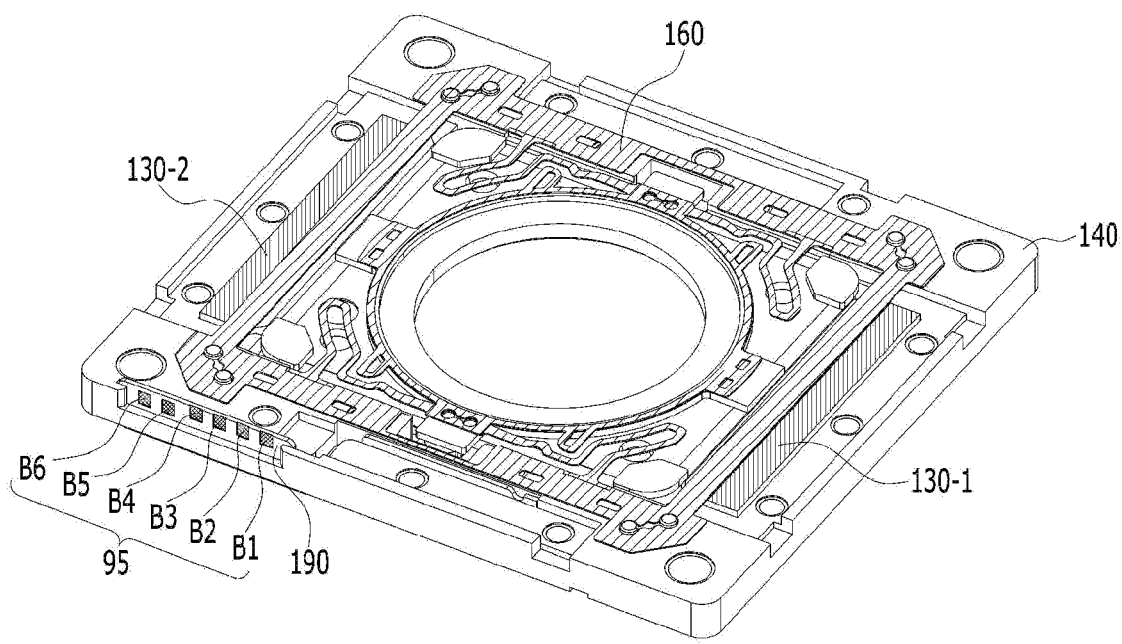
FIG. 7 is a bottom perspective view of the housing, the bobbin, a lower elastic member, a magnet, and the circuit board.

FIG. 1 is a perspective view of a camera module 10 according to an embodiment, FIG. 2 is an exploded perspective view of the camera module 10 shown in FIG. 1, FIG. 3 is a coupled perspective view of the camera module shown in FIG. 1, with a cover member 300 removed therefrom, FIG. 4 is an exploded perspective view of an AF moving unit 100 shown in FIG. 2, FIG. 5 is a perspective view of a bobbin 110, a sensing magnet 180, a balancing magnet 185, a first coil 120, a circuit board 190, a first position sensor 170, and a capacitor 195 shown in FIG. 4, FIG. 6 is a perspective view of the bobbin 110, a housing 140, the circuit board 190, and an upper elastic member 150, and FIG. 7 is a bottom perspective view of the housing 140, the bobbin 110, a lower elastic member 160, a magnet 130, and the circuit board 190.

Referring to FIGS. 1 to 7, the camera module 10 may include an AF moving unit 100 and an image sensor unit 350.

The camera module 10 may further include at least one of a cover member 300, a lens module 400, a base 210, or a bottom cover 219. The cover member 300, the base 210, and the bottom cover 219 may constitute a case.

The AF moving unit 100 may be coupled to the lens module 400, and may move the lens module in the optical-axis (OA) direction or a direction parallel to the optical axis. The autofocus function of the camera module 10 may be performed by the AF moving unit 100.

The image sensor unit 350 may include an image sensor 810. The image sensor unit 350 may move the image sensor 810 in a direction perpendicular to the optical axis, or may tilt or rotate the image sensor 810 with respect to the optical axis. The hand-tremor compensation function of the camera module 10 may be performed by the image sensor unit 350.

For example, the image sensor 810 may be rotated about at least one of the x-axis, the y-axis, or the z-axis.

For example, the image sensor 810 may be moved in at least one of the x-axis direction, the y-axis direction, or the z-axis direction.

For example, the image sensor 810 may be tilted about at least one of the x-axis, the y-axis, or the z-axis.

The AF moving unit 100 may alternatively be referred to as a "lens moving unit" or a "lens driving apparatus." Alternatively, the AF moving unit 100 may be referred to as a "first actuator" or an "AF driving unit."

In order to perform optical image stabilization (OIS) operation, the lens module 400 is not moved in a direction perpendicular to the optical axis, but the image sensor 810 may be moved in a direction perpendicular to the optical axis by the image sensor unit 350.

In addition, the image sensor unit 350 may alternatively be referred to as an "image sensor moving unit," an "image sensor shift unit," a "sensor moving unit," or a "sensor shift unit." Alternatively, the image sensor unit 350 may be referred to as a "second actuator" or an "OIS driving unit."

Referring to FIG. 4, the AF moving unit 100 may include a bobbin 110, a first coil 120, a magnet 130, and a housing 140.

The AF moving unit 100 may further include an upper elastic member 150 and a lower elastic member 160.

In addition, the AF moving unit 100 may include a first position sensor 170, a circuit board 190, and a sensing magnet 180 in order to implement AF feedback. In addition, the AF moving unit 100 may further include at least one of a balancing magnet 185 or a capacitor 195.

The bobbin 110 may be disposed in the housing 140, and may be moved in the optical-axis (OA) direction or the first direction (e.g. the Z-axis direction) by electromagnetic interaction between the first coil 120 and the magnet 130.

The bobbin 110 may have a bore formed therein in order to be coupled to the lens module 400 or to mount the lens module 400 therein. In an example, the bore in the bobbin 110 may be a through-hole formed through the bobbin 110 in the optical-axis direction, and may have a circular shape, an elliptical shape, or a polygonal shape, without being limited thereto.

The lens module 400 may include at least one lens and/or a lens barrel.

For example, the lens module 400 may include one or more lenses and a lens barrel accommodating the one or more lenses. However, the disclosure is not limited thereto. Any of various holding structures may be used in place of the lens barrel, so long as the same is capable of supporting one or more lenses.

In an example, the lens module 400 may be screwed to the bobbin 110. Alternatively, in another example, the lens module 400 may be coupled to the bobbin 110 by means of an adhesive (not shown). The light that has passed through the lens module 400 may pass through the filter 610, and may be introduced into the image sensor 810.

The bobbin 110 may include a protruding portion 111 formed on the outer surface thereof.

In an example, the protruding portion 111 may protrude in a direction parallel to a line perpendicular to the optical axis OA. However, the disclosure is not limited thereto.

The protruding portion 111 of the bobbin 110 may correspond to a recess portion 25a in the housing 140, and may be inserted into or disposed in the recess portion 25a in the housing 140. The protruding portion 111 may suppress or prevent the bobbin 110 from rotating beyond a predetermined range about the optical axis. In addition, the protruding portion 111 may serve as a stopper for preventing the bobbin 110 from moving beyond a predetermined range in the optical-axis direction (e.g. a direction from the upper elastic member 150 toward the lower elastic member 160) due to external impact or the like.

The bobbin 110 may have a first escape recess 112a formed in the upper surface thereof to avoid spatial interference with a first frame connection portion 153 of the upper elastic member 150. In addition, the bobbin 110 may have a second escape recess 112b formed in the lower surface thereof to avoid spatial interference with a second frame connection portion 163 of the lower elastic member 160.

The bobbin 110 may include a first coupling portion 116a in order to be coupled or secured to the upper elastic member 150. In an example, the first coupling portion of the bobbin 110 may take the form of a flat surface, but the disclosure is not limited thereto. In another embodiment, the first coupling portion may take the form of a protrusion or a recess.

In addition, the bobbin 110 may include a second coupling portion 116b in order to be coupled or secured to the lower elastic member 160. In an example, the second coupling portion 116b may take the form of a flat surface, but the disclosure is not limited thereto. In another embodiment, the second coupling portion 116b may take the form of a protrusion or a recess.

Referring to FIG. 5, the bobbin 110 may have a recess formed in the outer surface thereof to allow the first coil 120 to be seated therein, inserted thereinto, or disposed therein. The recess in the bobbin 110 may have a closed curve shape (e.g. a ring shape), which coincides with the shape of the first coil 120.

In addition, the bobbin 110 may have a first seating recess formed therein to allow the sensing magnet 180 to be seated therein, inserted thereinto, secured thereto, or disposed therein. In addition, the bobbin 110 may have a second seating recess formed in the outer surface thereof to allow the balancing magnet 185 to be seated therein, inserted thereinto, secured thereto, or disposed therein. In an example, the first and second seating recesses in the bobbin 110 may be formed in the outer surfaces of the bobbin 110 that face each other.

The first coil 120 is disposed on the bobbin 110, or is coupled to the bobbin 110. In an example, the first coil 120 may be disposed on the outer surface of the bobbin 110.

In an example, the first coil 120 may surround the outer surface of the bobbin 110 in the direction of rotation about the optical axis OA, but the disclosure is not limited thereto.

The first coil 120 may be directly wound around the outer surface of the bobbin 110, but the disclosure is not limited thereto. In another embodiment, the first coil 120 may be wound around the bobbin 110 using a coil ring, or may be embodied as a coil block having an angled ring shape.

Power or a driving signal may be supplied to the first coil 120.

The power or the driving signal supplied to the first coil 120 may be a DC signal, an AC signal, or a signal containing both DC and AC components, and may be of a voltage type or a current type.

When a driving signal (e.g. a driving current) is supplied to the first coil 120, electromagnetic force may be generated by electromagnetic interaction with the magnet 130, and the bobbin 110 may be moved in the optical-axis (OA) direction by the generated electromagnetic force.

At the initial position of the AF driving unit, the bobbin 110 may be movable upwards or downwards, which is referred to as bidirectional driving of the AF driving unit. Alternatively, at the initial position of the AF driving unit, the bobbin 110 may be movable upwards (or forwards), which is referred to as unidirectional driving of the AF driving unit.

At the initial position of the AF driving unit, the first coil 120 may be disposed so as to correspond to or overlap the magnet 130, which is disposed in the housing 140, in a direction parallel to a line that is perpendicular to the optical axis OA and extends through the optical axis.

In an example, the AF driving unit may include the bobbin 110 and components coupled to the bobbin 110 (e.g. the first coil 120, the sensing magnet 180, and the balancing magnet 185). In addition, the AF driving unit may further include the lens module 400.

The initial position of the AF driving unit may be the original position of the AF driving unit in the state in which no electric power is supplied to the first coil 120 or the position at which the AF driving unit is located as the result of the upper and lower elastic members 150 and 160 being elastically deformed due only to the weight of the AF driving unit.

In addition, the initial position of the bobbin 110 may be the position at which the AF driving unit is located when gravity acts in a direction from the bobbin 110 toward the base 210 or when gravity acts in a direction from the base 210 toward the bobbin 110.

The sensing magnet 180 may provide a magnetic field, which is detected by the first position sensor 170, and the balancing magnet 185 may cancel out the influence of the magnetic field of the sensing magnet 180 and may establish weight equilibrium with the sensing magnet 180.

The sensing magnet 180 may alternatively be referred to as a "sensor magnet."

The sensing magnet 180 may be disposed on the bobbin 110, or may be coupled to the bobbin 110.

The sensing magnet 180 may be disposed so as to face the first position sensor 170.

The balancing magnet 185 may be disposed on the bobbin 110, or may be coupled to the bobbin 110. In an example, the balancing magnet 185 may be disposed opposite the sensing magnet 180.

In an example, each of the sensing magnet 180 and the balancing magnet 185 may be a monopolar-magnetized magnet, which has one N pole and one S pole, but the disclosure is not limited thereto. In another embodiment, each of the sensing magnet 180 and the balancing magnet 185 may be a bipolar-magnetized magnet or a 4-pole magnet, which includes two N poles and two S poles.

The sensing magnet 180 may be moved together with the bobbin 110 in the optical-axis direction, and the first position sensor 170 may detect the intensity of the magnetic field or the magnetic force of the sensing magnet 180, which is moved in the optical-axis direction, and may output an output signal corresponding to the result of the detection.

In an example, the intensity of the magnetic field or the magnetic force detected by the first position sensor 170 may vary depending on displacement of the bobbin 110 in the optical-axis direction. The first position sensor 170 may output an output signal proportional to the detected intensity of the magnetic field, and the displacement of the bobbin 110 in the optical-axis direction may be detected using the output signal from the first position sensor 170.

The housing 140 accommodates therein the bobbin 110, and supports the magnet 130, the first position sensor 170, and the circuit board 190.

Referring to FIGS. 4, 6, and 7, the housing 140 may be formed so as to take the overall shape of a hollow column. In an example, the housing 140 may have a polygonal (e.g.

quadrangular or octagonal) or circular bore formed therein, and the bore in the housing 140 may take the form of a through-hole formed through the housing 140 in the optical-axis direction.

The housing 140 may include side portions, which correspond to or face side plates 302 of the cover member 300, and corners, which correspond to or face the corners of the cover member 300.

The housing 140 may include a stopper 145 formed on the upper portion, the upper surface, or the upper end thereof in order to be prevented from directly colliding with the inner surface of the upper plate 301 of the cover member 300.

In order to prevent the lower surface of the housing 140 from colliding with the circuit board 800 of the image sensor unit 350, the housing 140 may further include a stopper protruding from the lower surface thereof. Here, the stopper 145 may alternatively be referred to as a "boss" or a "protrusion."

Referring to FIG. 4, the housing 140 may have a mounting groove (or a seating groove) 14a formed therein to accommodate the circuit board 190. The mounting groove 14a may have a shape coinciding with the shape of the circuit board 190.

Referring to FIG. 6, the housing 140 may have an opening 141 formed therein to expose terminals B1 to B6 of a terminal unit 95 of the circuit board 190 therethrough. The opening 141 may be formed in the side portion of the housing 140.

The housing 140 may be provided on the upper portion, the upper end, or the upper surface thereof with at least one first coupling portion for coupling to a first outer frame 152 of the upper elastic member 150.

The housing 140 may be provided on the lower portion, the lower end, or the lower surface thereof with a second coupling portion for coupling and securing to a second outer frame 162 of the lower elastic member 160. For example, each of the first and second coupling portions of the housing 140 may be formed in the shape of a protrusion, a recess, or a flat surface.

The magnet 130 may be disposed in the housing 140. In an example, the magnet 130 may be disposed on the side portion of the housing 140. The magnet 130 may be an AF driving magnet for implementing AF operation.

In an example, the magnet 130 may include first and second magnets 130-1 and 130-2, which are disposed on two opposite side portions of the housing 140, but the disclosure is not limited thereto. In another embodiment, the magnet 130 may be disposed on a corner of the housing 140.

The magnet 130 may include two or more magnets.

At the initial position of the AF driving unit, the magnet 130 may be disposed in the housing 140 such that at least a portion thereof overlaps the first coil 120 in a direction parallel to a line that is perpendicular to the optical axis OA and extends through the optical axis OA.

Each of the first and second magnets 130-1 and 130-2 may be a monopolar-magnetized magnet, but the disclosure is not limited thereto. In another embodiment, each of the first and second magnets 130-1 and 130-2 may be a bipolar-magnetized magnet or a 4-pole magnet, which includes two N poles and two S poles.

The circuit board 190 may be disposed in the housing 140, and the first position sensor 170 may be disposed or mounted on the circuit board 190. In an example, the circuit board 190 may be disposed in the mounting groove 14a in the housing 140, and the terminals of the circuit board 190 may be exposed to the outside of the housing 140 through the opening 141 in the housing 140.

The circuit board 190 may include a terminal part (or a terminal unit) 95 including a plurality of terminals B1 to B6 in order to be conductively connected to an external terminal or an external device, and the plurality of terminals B1 to B6 may be conductively connected to the first position sensor 170.

The first position sensor 170 may be disposed on a first surface of the circuit board 190, and the plurality of terminals B1 to B6 may be disposed on a second surface of the circuit board 190. Here, the second surface of the circuit board 190 may be a surface opposite the first surface of the circuit board 190. For example, the first surface of the circuit board 190 may be a surface of the circuit board 190, which faces the bobbin 110 or the sensing magnet 180.

For example, the circuit board 190 may be a printed circuit board or an FPCB.

The circuit board 190 may include a circuit pattern or a wiring (not shown) for conductively connecting the first to sixth terminals B1 to B6 to the first position sensor 170.

When the bobbin 110 is moved, the first position sensor 170 may detect the magnetic field or the intensity of the magnetic field of the sensing magnet 180 mounted to the bobbin 110, and may output an output signal corresponding to the result of the detection.

The first position sensor 170 may be implemented as a Hall sensor alone. The first position sensor 170 may include two input terminals for receiving a driving signal or power and two output terminals for outputting a sensing voltage (or an output voltage).

When the first position sensor 170 is implemented as a Hall sensor alone, an AF controller (or a driver IC) configured to receive an output of the first position sensor 170 may be provided on the first circuit board 250. In an example, a controller 780 of an optical instrument 200A may receive an output signal of the first position sensor 170 from the AF controller, may receive first code values from a memory 512, and may control a driving signal that is to be applied to the first coil 120 using the received output of the first position sensor 170 and the received first code values, whereby feedback autofocus operation may be performed. In another embodiment, the AF controller may control a driving signal that is to be applied to the first coil 120 using the output of the first position sensor 170 and the first code values.

In an example, a driving signal may be applied to the first position sensor 170 through the first and second terminals B1 and B2 of the circuit board 190, and the output of the first position sensor 170 may be output to the outside through the third and fourth terminals B3 and B4.

The fifth and sixth terminals B5 and B6 of the circuit board 190 may be conductively connected to at least one of the upper elastic member 150 or the lower elastic member 160, and may provide a driving signal to the first coil 120.

For example, the fifth and sixth terminals B5 and B6 of the circuit board 190 may be conductively connected to the first and second elastic members 150-1 and 150-2 of the upper elastic member 150, and may provide a driving signal to the first coil 120 through the first and second elastic members 150-1 and 150-2.

In another embodiment, the first position sensor 170 may take the form of a driver IC including a Hall sensor. For example, the first position sensor 170 may include a Hall sensor and a driver. In this case, the first position sensor 170 may include first to fourth terminals for transmitting and receiving data to and from the outside using data communication using a protocol, for example I2C communication, and fifth and sixth terminals for directly applying a driving signal to the first coil 120. In addition, the first to fourth terminals of the first position sensor 170 may be conductively connected to the first to fourth terminals B1 to B4 of the circuit board 190.

In an example, the first position sensor 170 may transmit an output of the first position sensor 170 to the controller 780 of the optical instrument 200A using I2C communication, and the controller 780 of the optical instrument 200A may control a driving signal that is to be applied to the first coil 120 using the output of the first position sensor 170 and the first code values stored in the memory 512, whereby feedback autofocus operation may be performed. In another embodiment, the controller 780 may control a driving signal that is to be applied to the first coil 120 using the output of the first position sensor 170 and the first code values stored in the memory 512.

The fifth and sixth terminals of the first position sensor 170 may be conductively connected to the first coil 120 through at least one of the upper elastic member 150 or the lower elastic member 160, and may provide a driving signal to the first coil 120. For example, the fifth and sixth terminals of the first position sensor 170 may be conductively connected to the first and second elastic members 150-1 and 150-2, may be conductively connected to the first coil 120, and may provide a driving signal to the first coil 120.

The capacitor 195 may be disposed or mounted on the first surface of the circuit board 190. The capacitor 195 may be of a chip type. In this case, the chip may include a first terminal, which corresponds to one end of the capacitor 195, and a second terminal, which corresponds to the other end of the capacitor 195. The capacitor 195 may alternatively be referred to as a "capacitive element" or a "condenser."

The capacitor 195 may be conductively connected in parallel to the first and second terminals B1 and B2 of the circuit board 190 for providing power (or a driving signal) to the position sensor 170 from the outside. Alternatively, the capacitor 195 may be conductively connected in parallel to the terminals of the first position sensor 170 conductively connected to the first and second terminals B1 and B2 of the circuit board 190.

Since the capacitor 195 is conductively connected in parallel to the first and second terminals B1 and B2 of the circuit board 190, the capacitor 195 may serve as a smoothing circuit for removing ripple components included in power signals GND and VDD provided to the first position sensor 170 from the outside, and thus may provide stable and consistent power signals to the first position sensor 170.

The upper elastic member 150 may be coupled to the upper portion, the upper end, or the upper surface of the bobbin 110 and to the upper portion, the upper end, or the upper surface of the housing 140, and the lower elastic member 160 may be coupled to the lower portion, the lower end, or the lower surface of the bobbin 110 and to the lower portion, the lower end, or the lower surface of the housing 140.

The upper elastic member 150 and the lower elastic member 160 may elastically support the bobbin 110 with respect to the housing 140.

For example, the upper elastic member 150 may include first and second elastic members 150-1 and 150-2. In addition, although the lower elastic member 160 is illustrated in FIG. 4 as being formed as a single unit or a single component, the disclosure is not limited thereto.

In another embodiment, at least one of the upper elastic member or the lower elastic member may include a plurality of elastic units or springs, which are conductively isolated or spaced apart from each other.

The upper elastic member 150 may further include a first inner frame 151, which is coupled or secured to the upper portion, the upper surface, or the upper end of the bobbin 110, a first outer frame 152, which is coupled or secured to the upper portion, the upper surface, or the upper end of the housing 140, and a first frame connection portion 153, which connects the first inner frame 151 to the first outer frame 152.

The lower elastic member 160 may include a second inner frame 161, which is coupled or secured to the lower portion, the lower surface, or the lower end of the bobbin 110, second outer frames 162-1 to 162-3, which are coupled or secured to the lower portion, the lower surface, or the lower end of the housing 140, and a second frame connection portion 163, which connects the second inner frame 161 to the second outer frames 162-1 to 162-3.

Each of the first and second frame connection portions 153 and 163 may be bent or curved at least once so as to form a pattern having a predetermined shape.

Each of the upper elastic member 150 and the lower elastic member 160 may be formed of a conductive material.

Referring to FIGS. 4 and 5, the circuit board 190 may include two pads 5a and 5b. In an example, the first pad 5a may be located on the second surface of the circuit board 190, and the second pad 5b may be located on the first surface of the circuit board 190, but the disclosure is not limited thereto. In another embodiment, the first and second pads may be formed on any one of the first surface and the second surface of the circuit board 190.

The first and second pads 5a and 5b may be conductively connected to the fifth and sixth terminals B5 and B6 of the circuit board 190. In an example, the first pad 5a may be coupled to the first elastic member 150-1, and the second pad 5b may be coupled to the second elastic member 150-2.

In an example, the first outer frame of the first elastic member 150-1 may include a first coupling portion 4a coupled to the first pad 5a, and the first outer frame of the second elastic member 150-2 may include a second coupling portion 4b coupled to the second pad 5b.

In an example, one end of the first coil 120 may be coupled to the first elastic member 150-1, and the other end of the first coil 120 may be coupled to the second elastic member 150-2.

In another embodiment, the upper elastic member may be coupled to the first pad of the circuit board 190 so as to be conductively connected thereto, and the lower elastic member may be coupled to the second pad of the circuit board 190 so as to be conductively connected thereto. In still another embodiment, the lower elastic member may include two lower elastic members. Each of the two lower elastic members may be coupled or conductively connected to a corresponding one of the first and second pads of the circuit board 190, and the first coil 120 may be conductively connected to the two lower elastic members.

Figure 8:
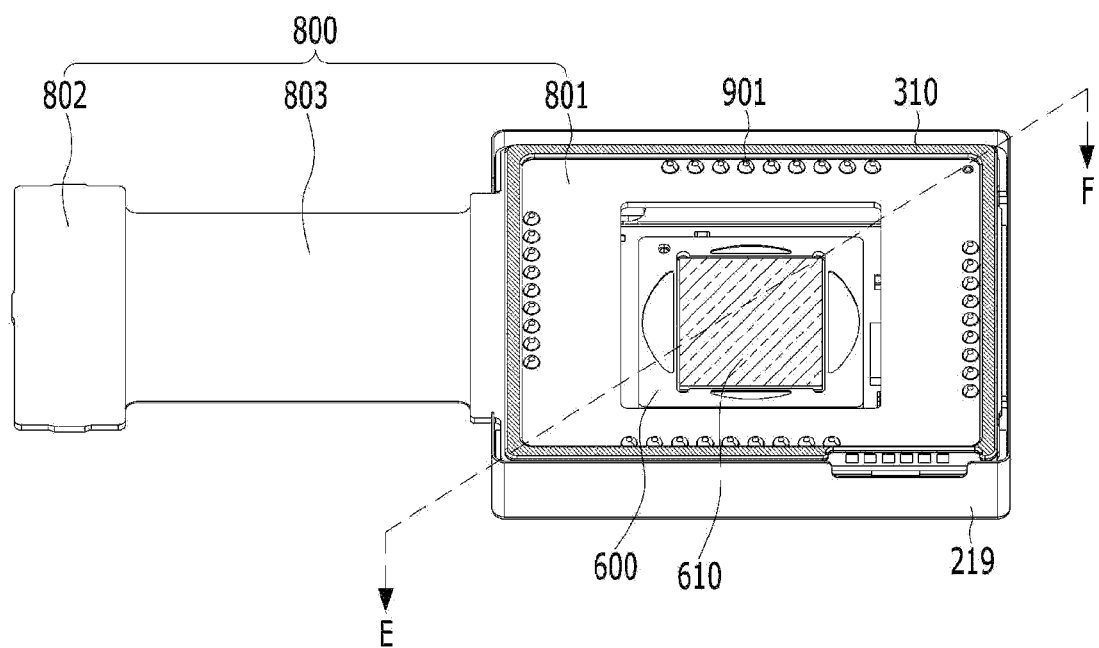
FIG. 8 is a perspective view of an image sensor unit.
Figure 9:
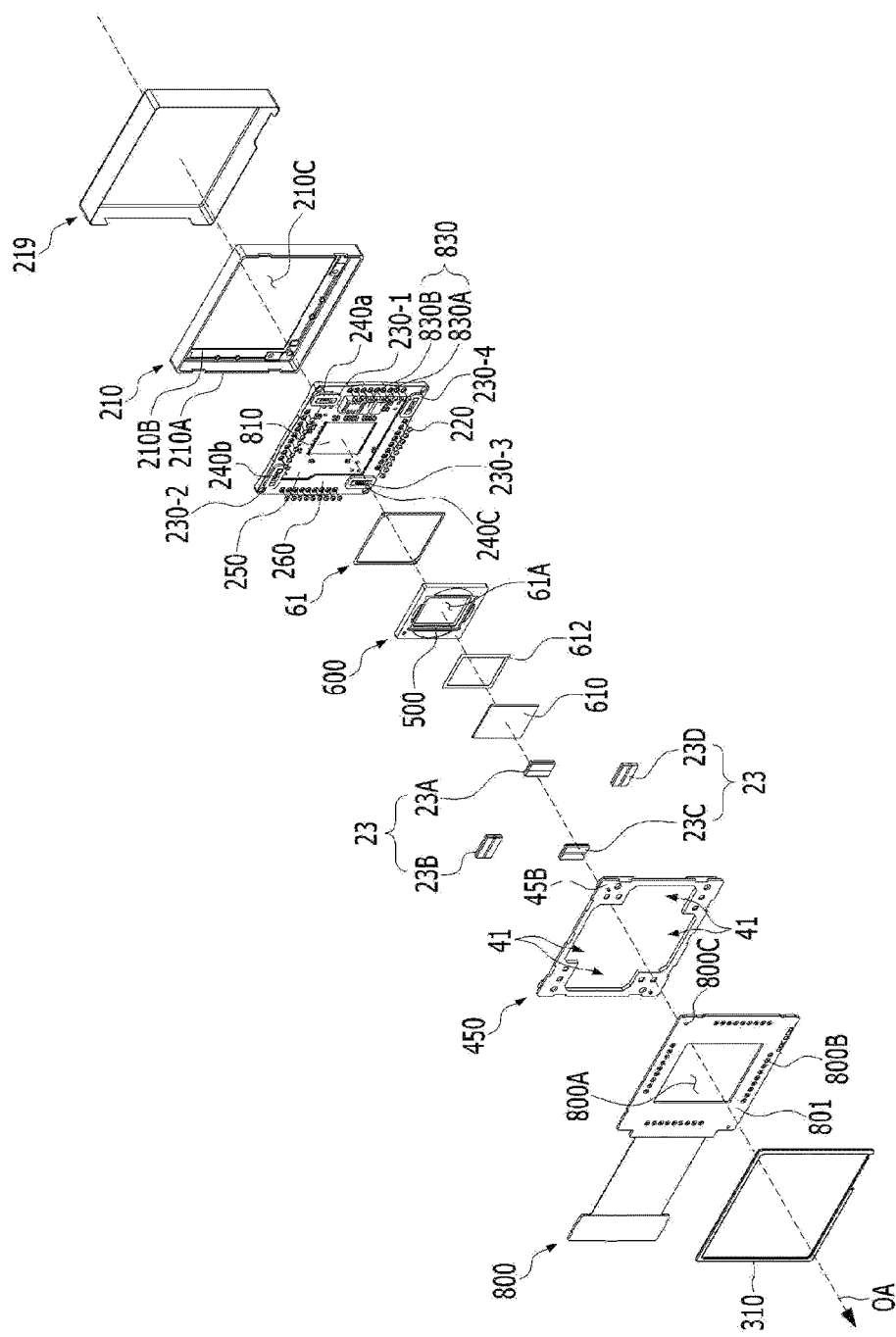
FIG. 9 is an exploded perspective view of the image sensor unit shown in FIG. 8.
Figure 10:
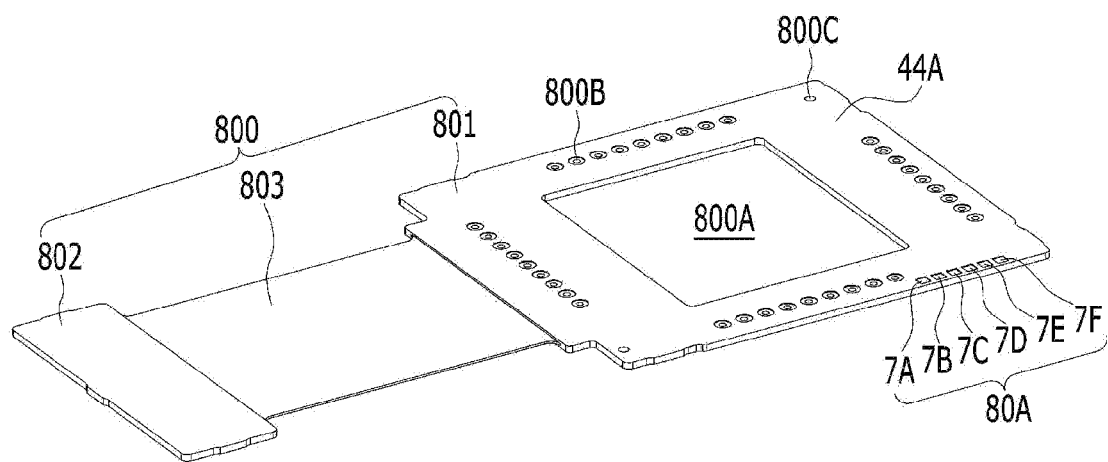
FIG. 10 is a perspective view of a second circuit board and a housing shown in FIG. 9.
Figure 10:
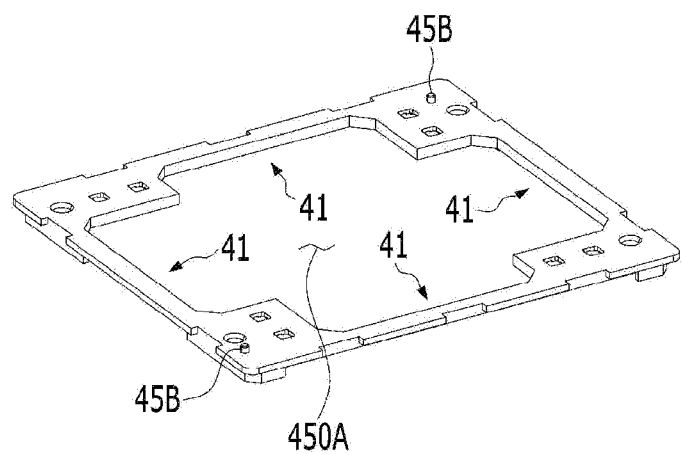
Figure 11:
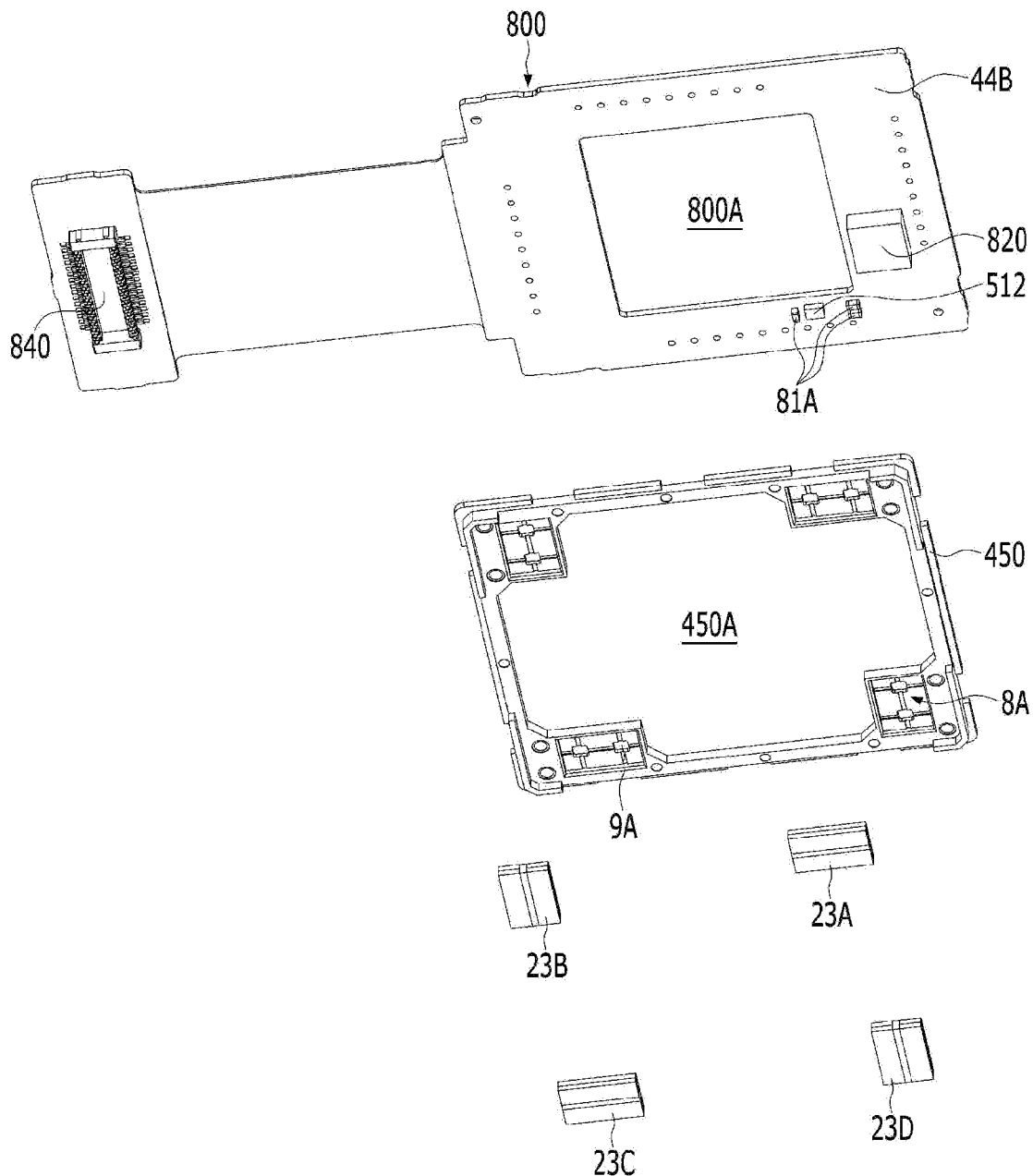
FIG. 11 is a perspective view of the second circuit board, the housing, and a magnet shown in FIG. 9.
Figure 12A:
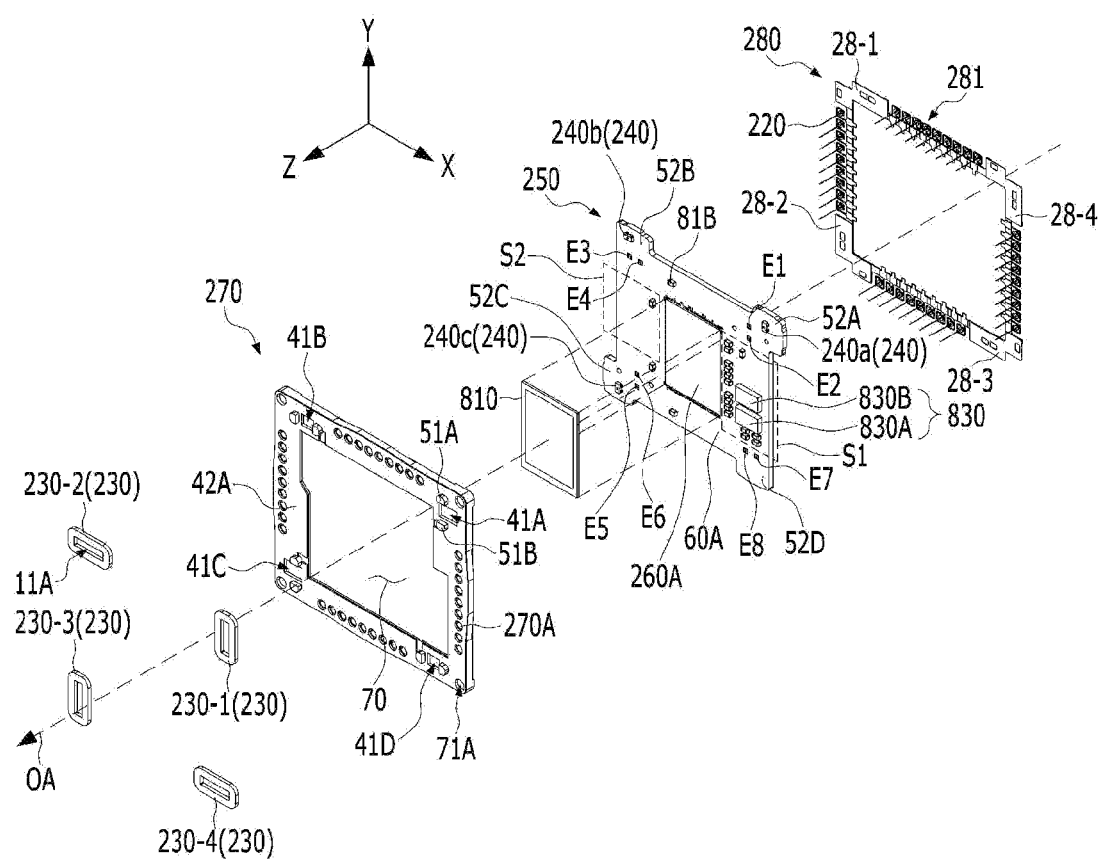
FIG. 12A is an exploded perspective view of a holder, a second coil, a first circuit board, a second position sensor, an image sensor, a support member, and an elastic connection member.
Figure 12B:
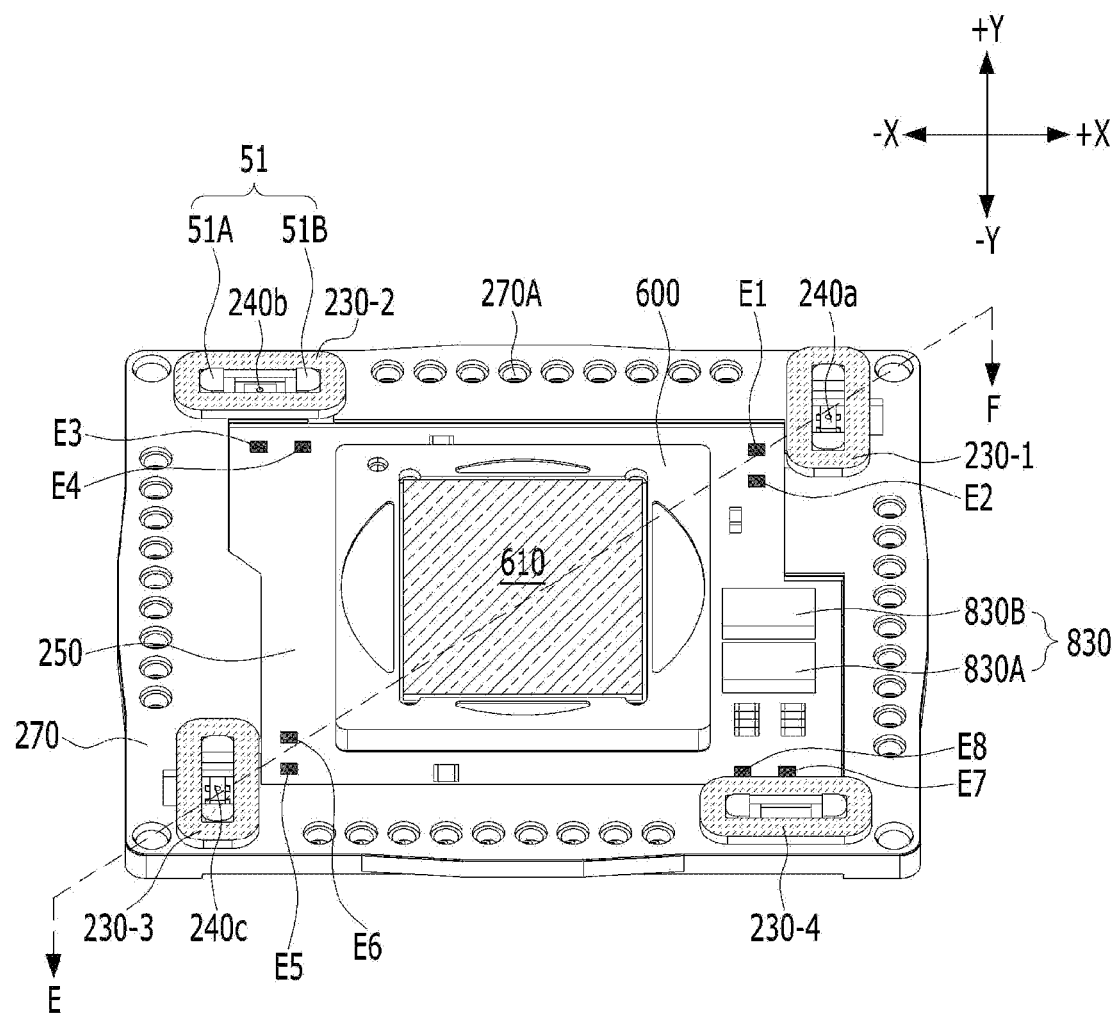
FIG. 12B is a perspective view of the holder, the second coil, the first circuit board, the second position sensor, a filter holder, and a filter shown in FIG. 12A.
Figure 13A:
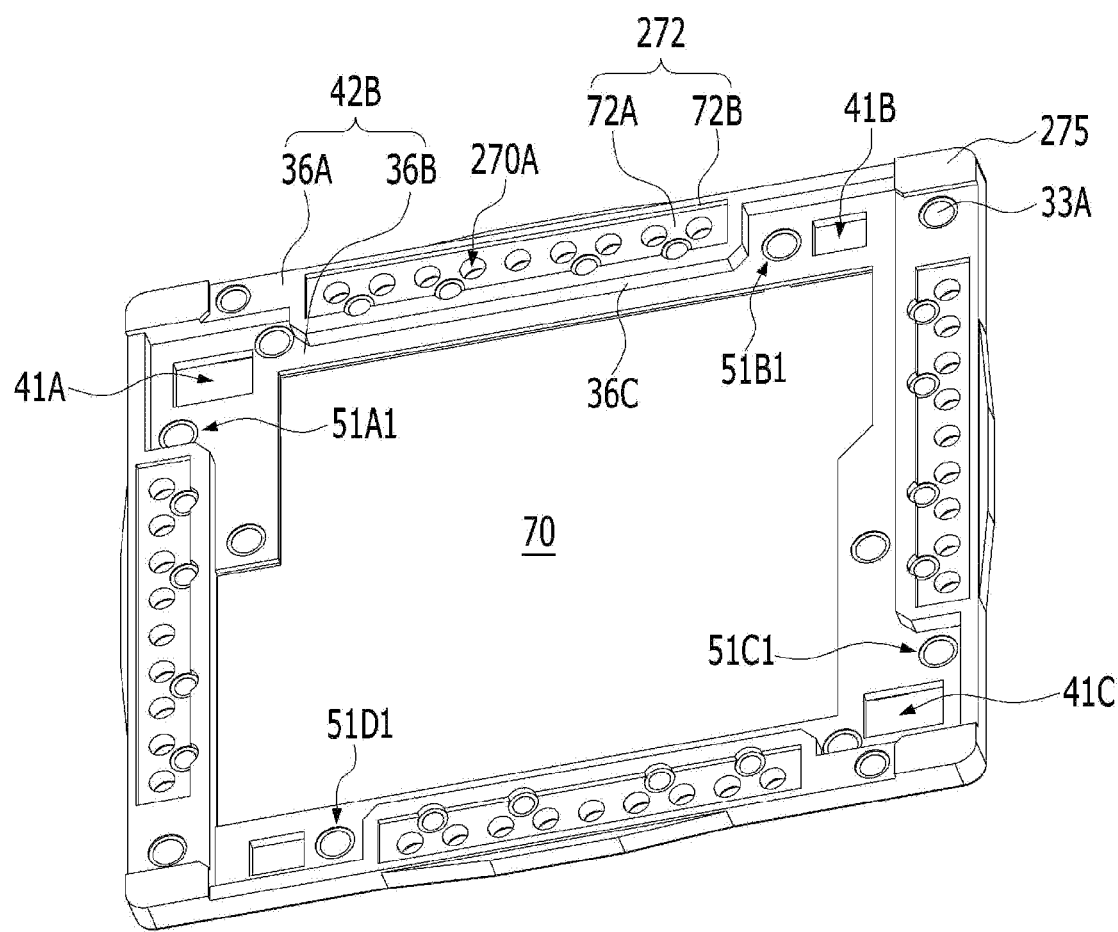
FIG. 13A is a bottom perspective view of the holder shown in FIG. 12A.
Figure 13B:
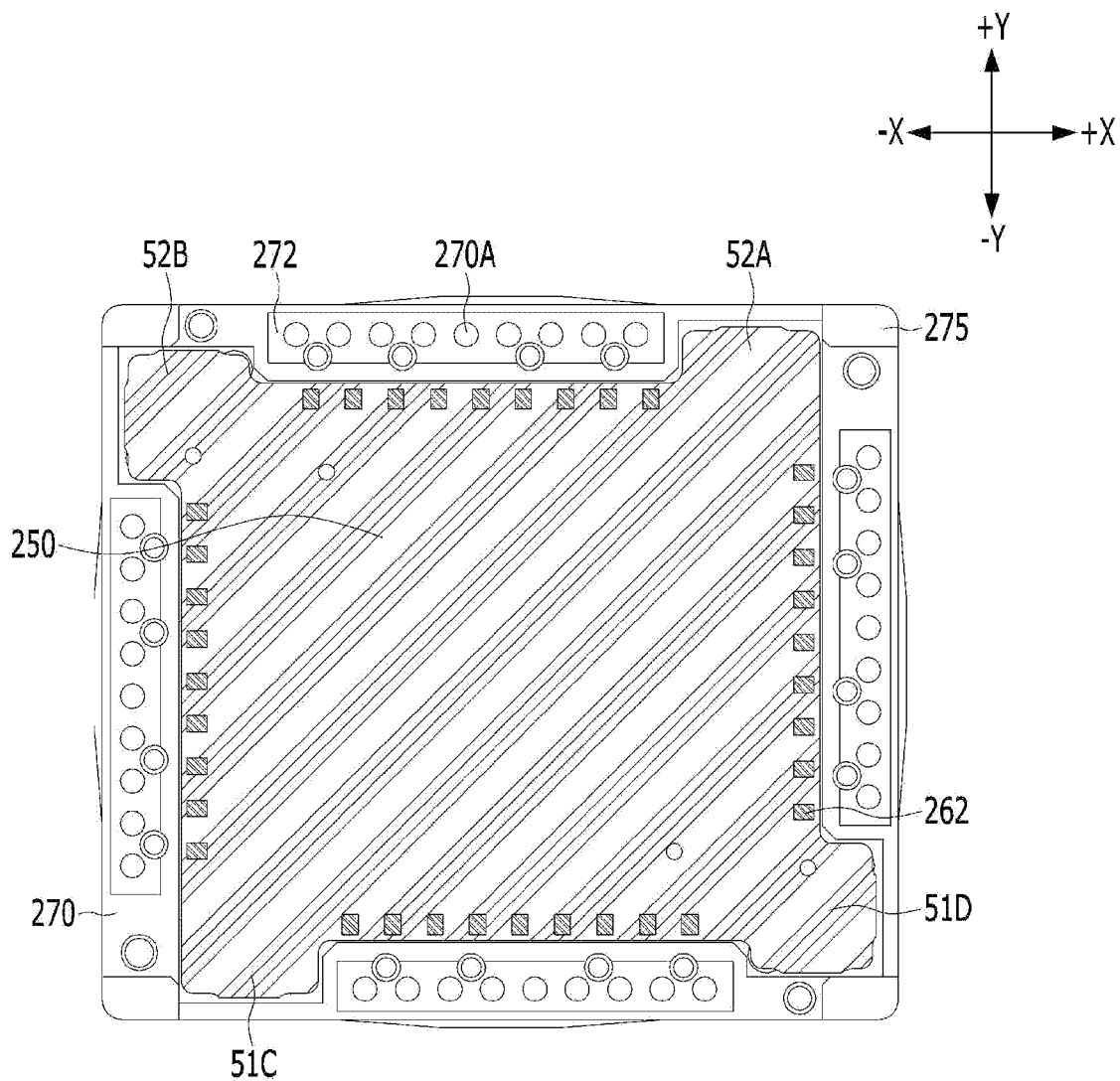
FIG. 13B is a bottom view of the holder and the first circuit board.
Figure 14:
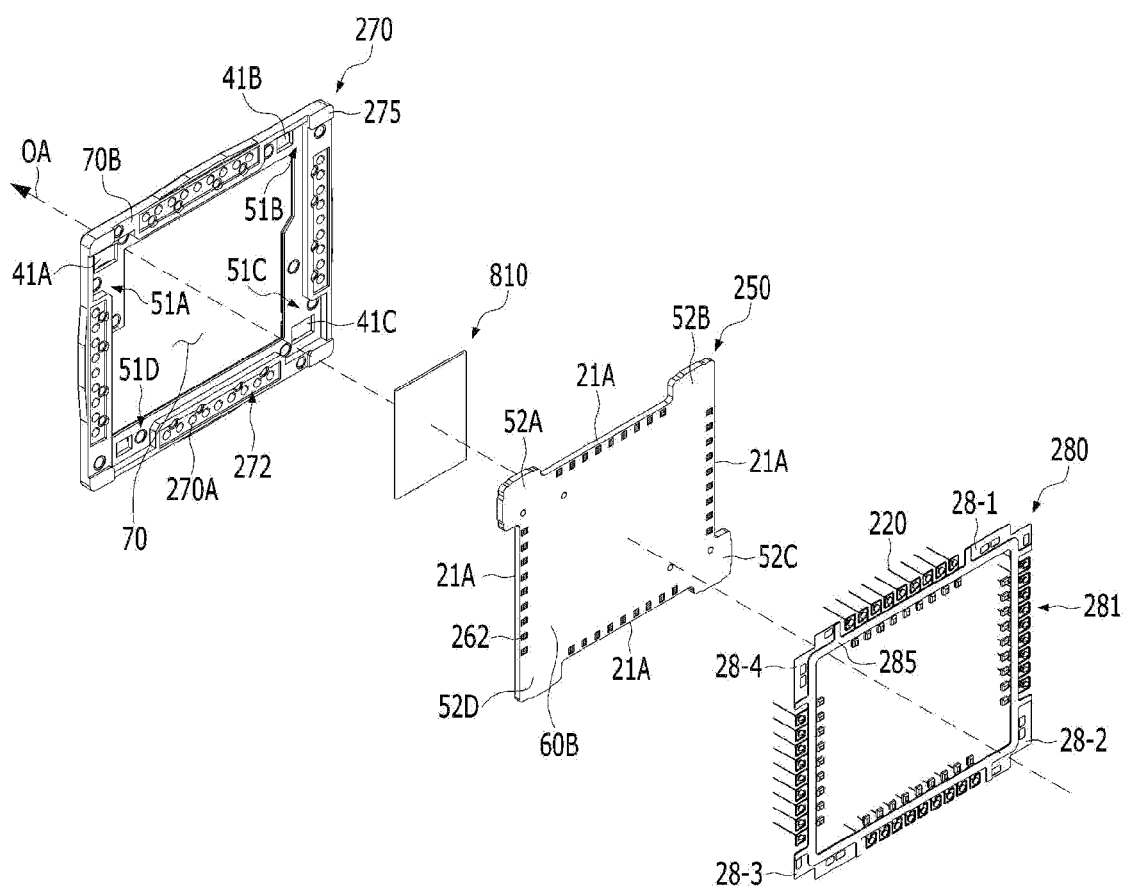
FIG. 14 is an exploded perspective view of the holder, the image sensor, the first circuit board, the support member, and the elastic connection member.
Figure 15:
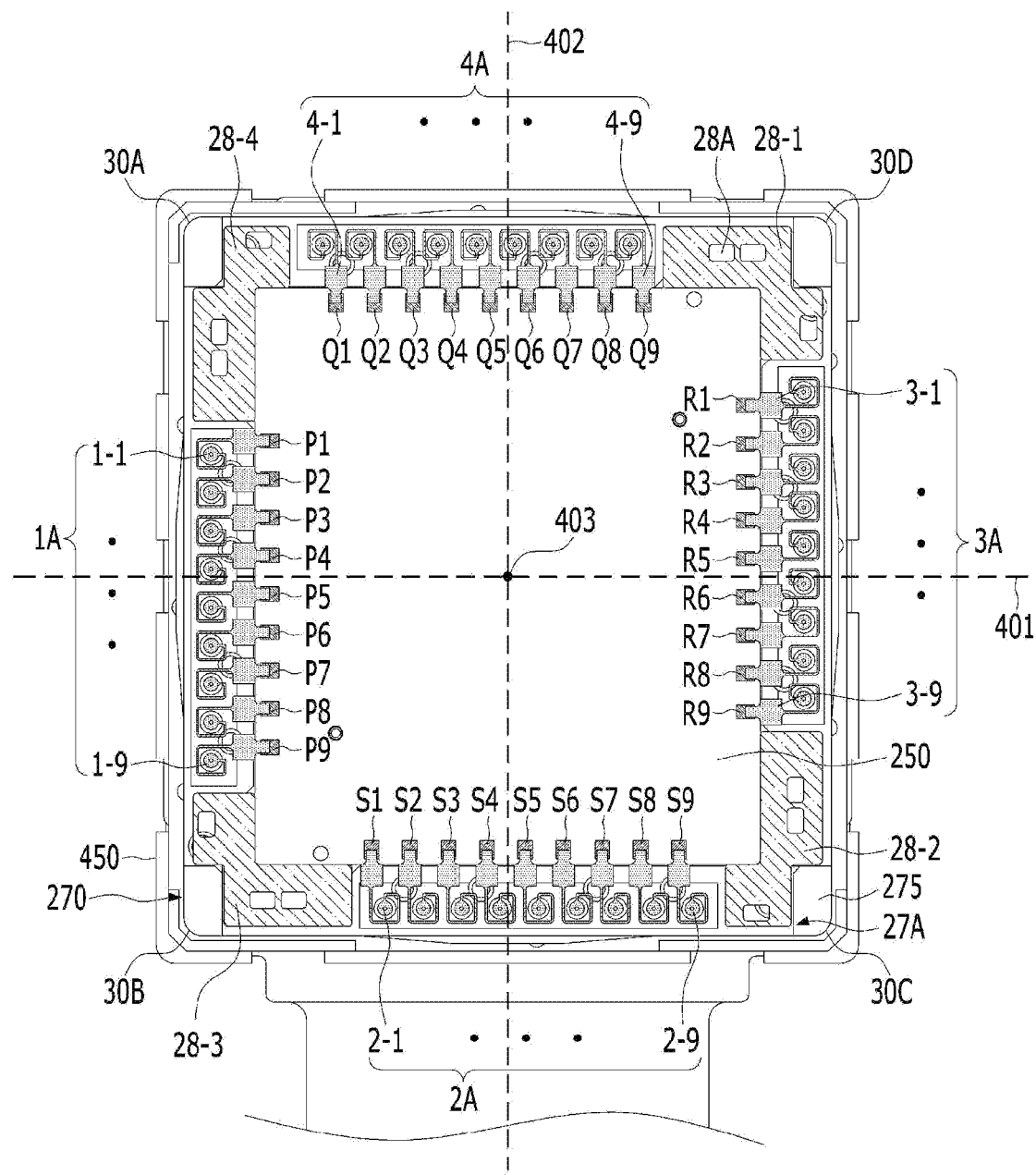
FIG. 15 is a bottom view of the holder, the first circuit board, and the elastic connection member.
Figure 16:
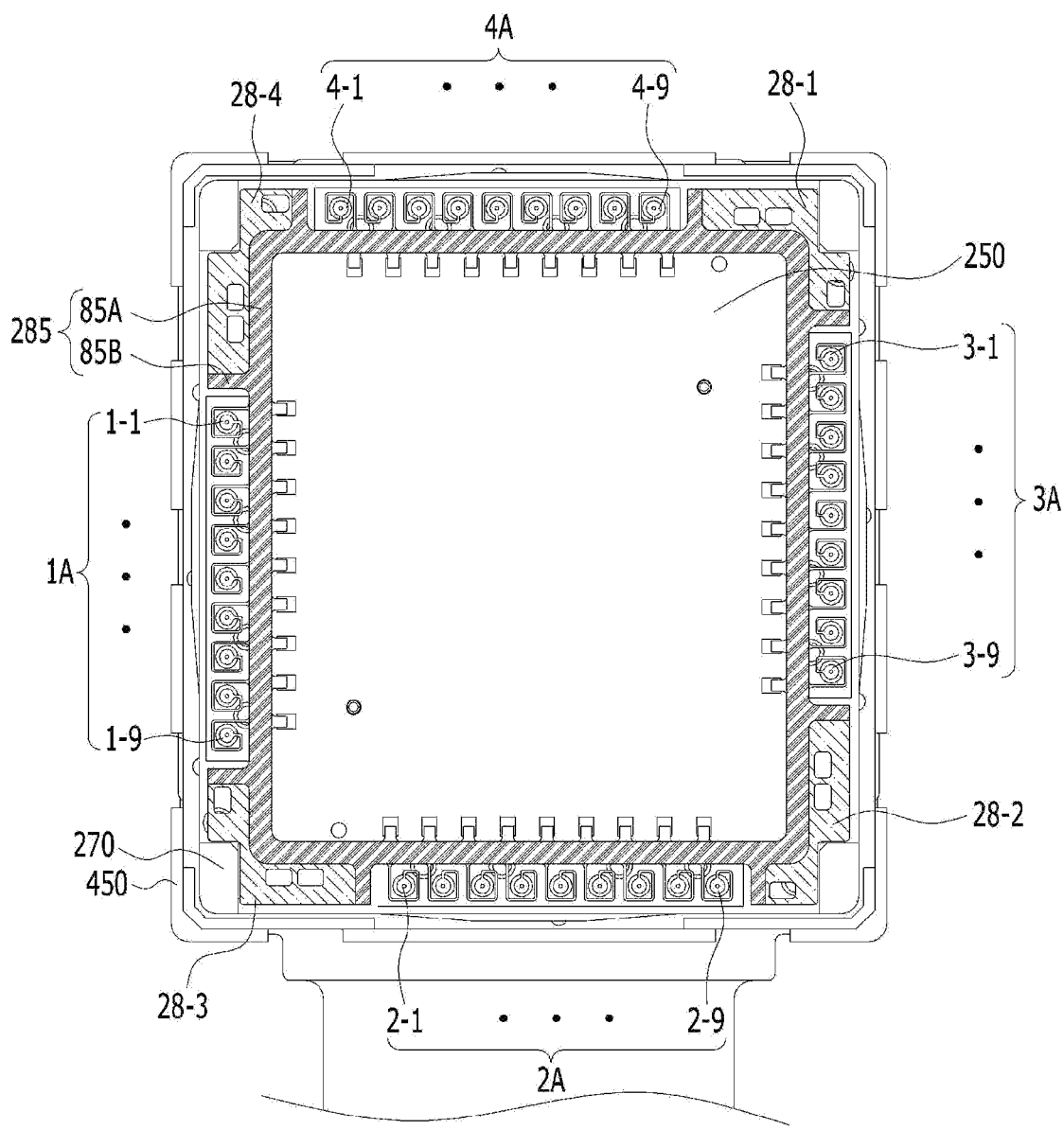
FIG. 16 is a bottom view of the holder, the first circuit board, the elastic connection member, and an insulation member.
Figure 17:
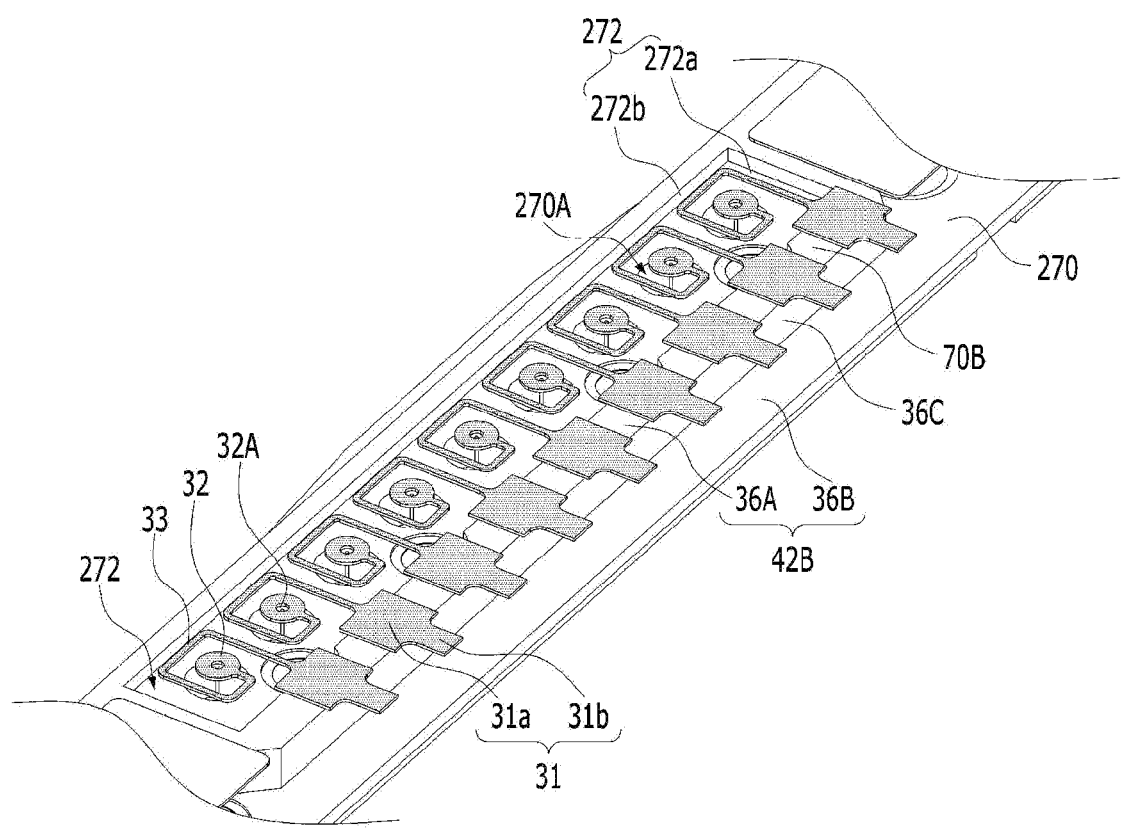
FIG. 17 is a partially enlarged view of the elastic connection member.
Figure 18:
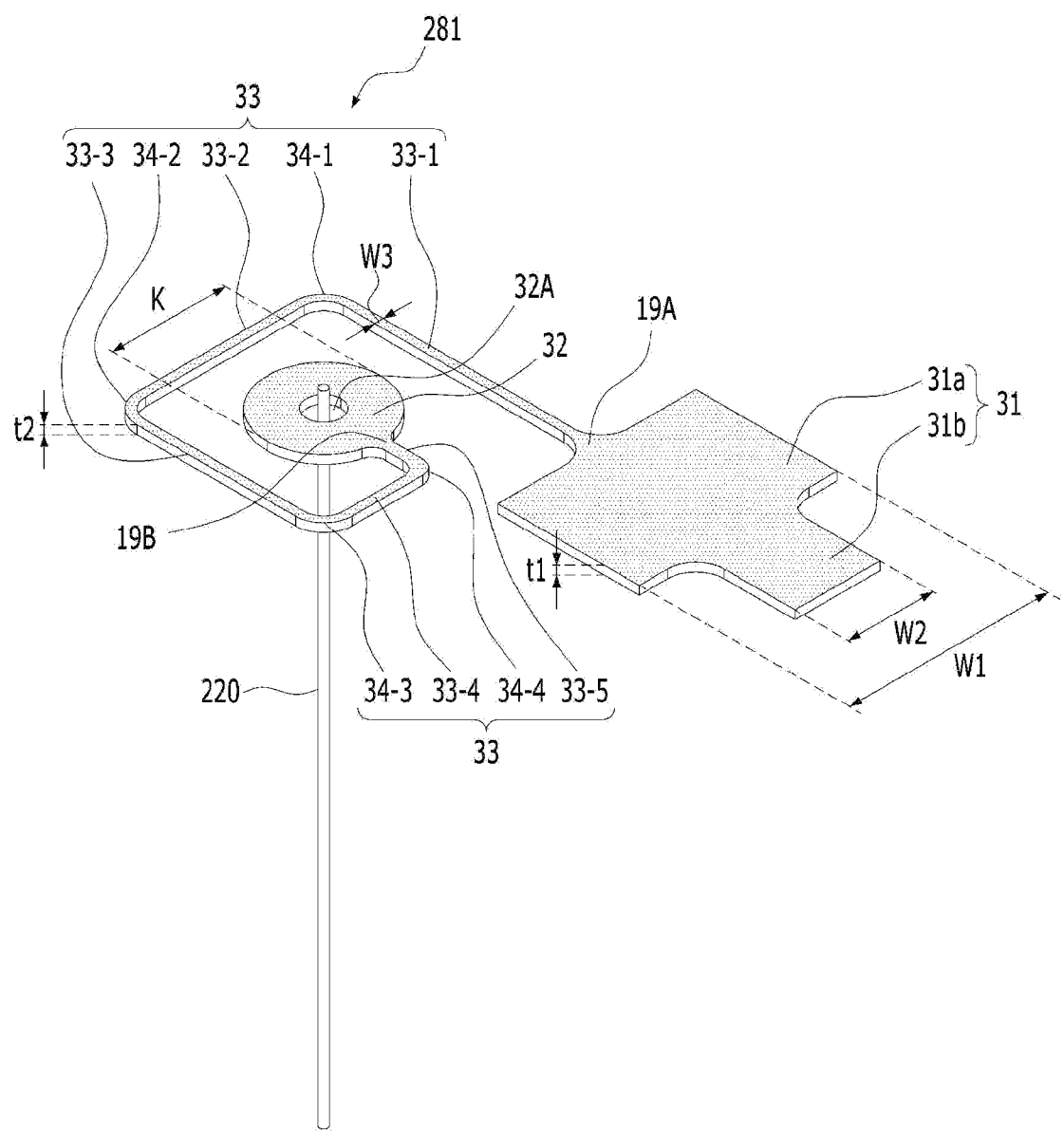
FIG. 18 is a bottom view of a single connection spring and the support member.
Figure 19A:
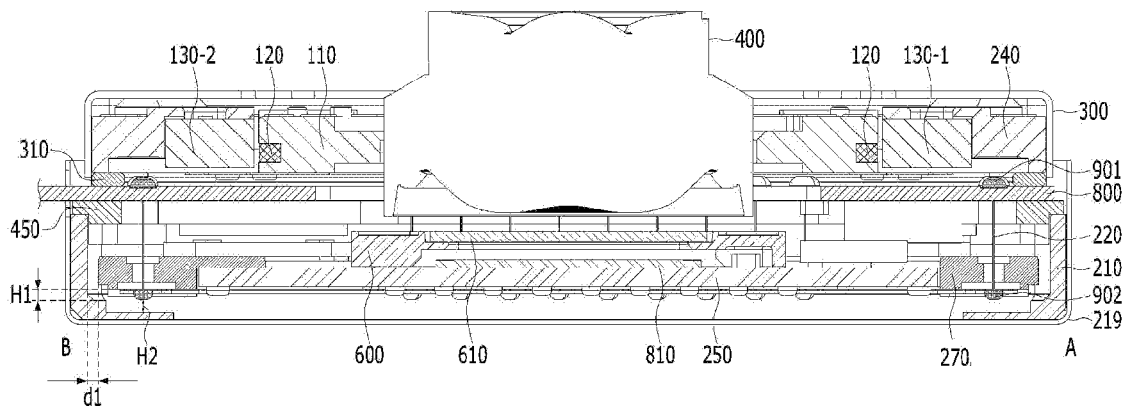
FIG. 19A is a cross-sectional view of the camera module shown in FIG. 1, taken along line AB.
Figure 19B:
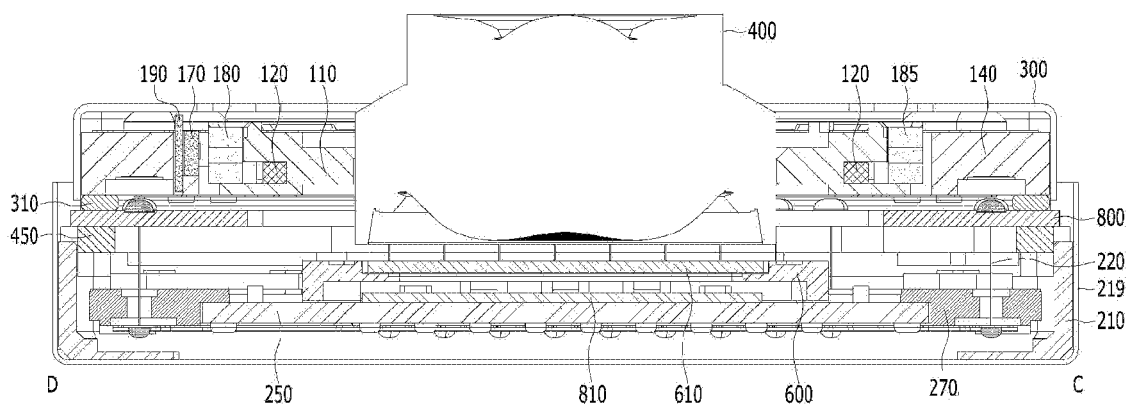
FIG. 19B is a cross-sectional view of the camera module shown in FIG. 1, taken along line CD.
Figure 20:
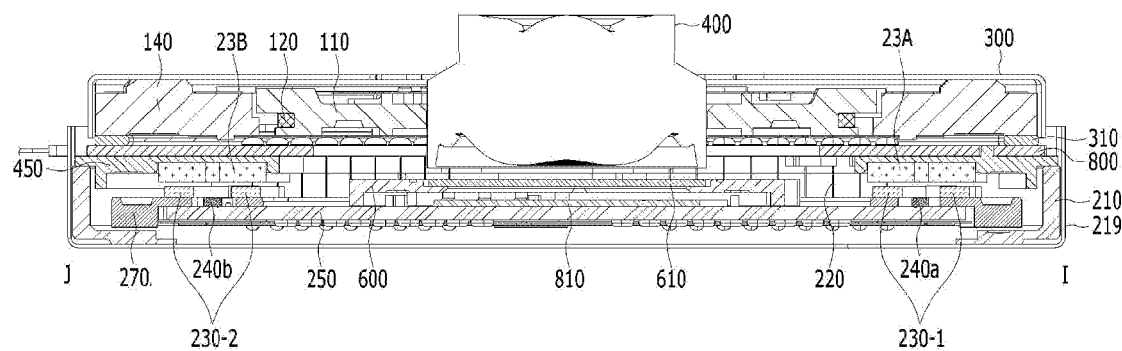
FIG. 20 is a cross-sectional view of the camera module shown in FIG. 1, taken along line IJ.
Figure 21:
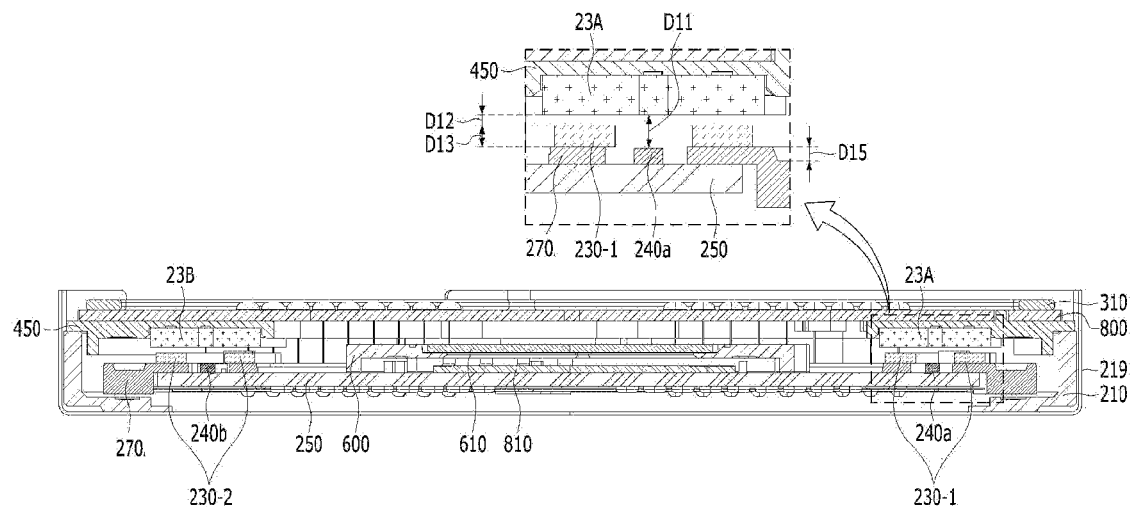
FIG. 21 is a cross-sectional view of the image sensor unit shown in FIG. 8, taken along line EF.

FIG. 8 is a perspective view of an image sensor unit 350, FIG. 9 is an exploded perspective view of the image sensor unit 350 shown in FIG. 8, FIG. 10 is a perspective view of a second circuit board 800 and a housing 450 shown in FIG. 9, FIG. 11 is a perspective view of the second circuit board 800, the housing 450, and a magnet 23 shown in FIG. 9, FIG. 12A is an exploded perspective view of a holder 270, a second coil 230, a first circuit board 250, a second position sensor 240, an image sensor 810, a support member 220, and an elastic connection member 280, FIG. 12B is a perspective view of the holder 270, the second coil 230, the first circuit board 250, the second position sensor 240, a filter holder 600, and a filter 610 shown in FIG. 12A, FIG. 13A is a bottom perspective view of the holder 270 shown in FIG. 12A, FIG. 13B is a bottom view of the holder 270 and the first circuit board 250, FIG. 14 is an exploded perspective view of the holder 270, the image sensor 810, the first circuit board 250, the support member 220, and the elastic connection member 280, FIG. 15 is a bottom view of the holder 270, the first circuit board 250, and the elastic connection member 280, FIG. 16 is a bottom view of the holder 270, the first circuit board 250, the elastic connection member 280, and an insulation member 285, FIG. 17 is a partially enlarged view of the elastic connection member 280, FIG. 18 is a bottom view of a single connection spring 281 and the support member 220, FIG. 19A is a cross-sectional view of the camera module 10 shown in FIG. 1, taken along line AB, FIG. 19B is a cross-sectional view of the camera module 10 shown in FIG. 1, taken along line CD, FIG. 20 is a cross-sectional view of the camera module 10 shown in FIG. 1, taken along line IJ, and FIG. 21 is a cross-sectional view of the image sensor unit 350 shown in FIG. 8, taken along line EF.

Referring to FIGS. 8 to 21, the image sensor unit 350 may include a fixed unit, which includes a magnet 23, and a moving unit, which includes a first circuit board 250 spaced apart from the fixed unit, a second position sensor 240 disposed on the first circuit board 250, a second coil 230 facing the magnet 23, and a spacing member disposed between the first circuit board 250 and the second coil 230.

For example, the spacing member may be a holder 270. Hereinafter, the holder 270 and the "spacing member" may be used interchangeably. The spacing member may have one or more holes 41A to 41C formed therein.

In an example, the spacing member may be embodied as a non-conductive member. In an example, the spacing member may be embodied as an injection-molded member, which can be easily formed in a certain shape through an injection-molding process. In addition, the spacing member may be made of, for example, a resin or plastic material.

The spacing member may include an upper surface 45A, which faces the fixed unit (e.g. the second circuit board 800), and a lower surface 45B, which is formed opposite the upper surface 45A. The second coil 230 may be disposed on the upper surface 45A of the spacing member, and the first circuit board 250 may be disposed on the lower surface 45B of the spacing member.

In an example, the second coil 230 may be located between a bore 70 in the spacing member and a side of the upper surface 45A of the spacing member.

At least a portion of the second position sensor 240 may be disposed in each of the holes 41A to 41C in the spacing member, and may overlap the magnet 23 in the optical-axis direction.

Each of the holes 41A to 41C in the spacing member may overlap at least a portion of the second coil 230 in the optical-axis direction.

The second position sensor 240 may not overlap the second coil 230 in the optical-axis direction.

The second coil 230 may have a hole 11A formed in the center thereof, and each of the holes 41A to 41C in the spacing member may overlap the hole 11A in the second coil 230 in the optical-axis direction.

The second position sensor 240 may overlap the hole 11A in the second coil 230 and each of the holes 41A to 41C in the spacing member in the optical-axis direction.

An empty space may be present between the magnet 130 and the second position sensor 240. In an example, at least a portion of the second coil 230 and/or at least a portion of the spacing member may not be interposed or disposed in the space between the magnet 130 and the second position sensor 240.

The image sensor unit 350 may include elastic support members 220 and 280 coupled to the fixed unit and the moving unit. The elastic support members 220 and 280 may elastically support the moving unit with respect to the fixed unit. The elastic support members 220 and 280 may alternatively be referred to as "support members" or "elastic members."

The fixed unit may include a second circuit board 800 disposed so as to be spaced apart from the first circuit board 250, and the elastic support members 220 and 280 may conductively connect the first circuit board 250 to the second circuit board 800.

The second coil 230 may be coupled to the spacing member, and may be conductively connected to the first circuit board 250.

The camera module according to the embodiment may include a lens module (or a lens) 400, an image sensor 810 disposed at a position corresponding to the lens, a driving unit for moving the image sensor 810, a first circuit board 250 disposed so as to be spaced apart from the lens, a second position sensor 240 disposed on the first circuit board 250, and a spacing member disposed on the first circuit board 250. In an example, the driving unit may include a magnet 23 and a second coil 230 facing the magnet 23, the spacing member may be disposed between the first circuit board 250 and the second coil 230 in order to space the second coil 230 and the second position sensor 240 apart from each other, and the image sensor 810 may be moved in a direction perpendicular to the optical-axis direction.

Alternatively, the image sensor unit 350 according to the embodiment may include a fixed unit, which includes a magnet 23, a moving unit, which includes a first circuit board 250 disposed so as to be spaced apart from the fixed unit, a holder 270 disposed on the first circuit board 250, a second coil 230 disposed on the holder 270 so as to face the magnet 23, and a second position sensor 240 disposed on the first circuit board 250 so as to face the magnet 23, and support members 220 and 280, which are coupled to the fixed unit and the moving unit.

The moving unit may be moved in a direction perpendicular to the optical-axis direction by interaction between the magnet 23 and the second coil 230. The second coil 230 may not overlap the second position sensor 240 in a direction perpendicular to the optical-axis direction.

One end of each of the support members 220 and 280 may be coupled to the second circuit board 800, and the other end of each of the support members 220 and 280 may be coupled to the first circuit board 250. That is, the support members 220 and 280 may connect the first circuit board 250 to the second circuit board 800.

The second coil 230 may have a hole 11A formed in the center thereof, and the second position sensor 240 may be disposed under the hole 11A in the second coil 230, and may overlap the hole 11A in the second coil in the optical-axis direction.

The holder 270 may have formed therein a through-hole corresponding to the second position sensor 240 in the optical-axis direction, and the second position sensor 240 may be disposed in the through-hole in the holder 270. In an example, the second position sensor 240 may overlap the holder 270 in a direction perpendicular to the optical axis.

The first circuit board 250 may include protruding portions 52A to 52D formed on the four corners thereof so as to protrude from the side surface thereof, and the holder 270 may have seating recesses 51A1 to 51D1 formed in the lower surface thereof to allow the protruding portions 52A to 52D of the first circuit board 250 to be disposed therein.

The second coil 230 may include first to fourth coil units 230-1 to 230-4 disposed on first to fourth corners of the holder 270.

In an example, the magnet 23 may include a first magnet 23A, which corresponds to, faces, or overlaps the first coil unit 230-1 in the optical-axis direction, a second magnet 23B, which corresponds to, faces, or overlaps the second coil unit 230-2 in the optical-axis direction, a third magnet 23C, which corresponds to, faces, or overlaps the third coil unit 230-3 in the optical-axis direction, and a fourth magnet 23D, which corresponds to, faces, or overlaps the fourth coil unit 230-4 in the optical-axis direction.

The second position sensor 240 may include a first sensor 240a, which is disposed under the first coil unit 230-1, a second sensor 240b, which is disposed under the second coil unit 230-2, and a third sensor 240c, which is disposed under the third coil unit 230-3.

In an example, each of the first to fourth coil units 230-1 to 230-4 may be individually driven. That is, the first to fourth coil units 230-1 to 230-4 may be independently driven in response to mutually different driving signals.

In another embodiment, each of the first to third coil units 230-1 to 230-3 may be individually driven, and the fourth coil unit may be driven together with any one of the first to third coil units 230-1 to 230-3. In an example, the first to third coil units 230-1 to 230-3 may be independently driven in response to mutually different driving signals, and the fourth coil unit 230-4 may be driven in response to the same driving signal as that applied to any one of the first to third coil units 230-1 to 230-3.

In an example, the image sensor unit 350 may include the second circuit board 800, the magnet 23, the holder 270, the first circuit board 250, the second coil 230, the second position sensor 240, and the image sensor 810. In addition, the image sensor unit 350 may further include the elastic connection member 280 and the support member 220.

The image sensor unit 350 may further include a housing 450 for accommodating at least a portion of the second circuit board 800.

The second circuit board 800 may serve to provide a signal to the image sensor unit 350 from the outside or to output a signal from the image sensor unit 350 to the outside.

The second circuit board 800 may alternatively be referred to as a fixed circuit board, a sub-circuit board, a sub-board, or a fixed board.

Referring to FIGS. 9 and 10, the second circuit board 800 may include a first region corresponding to the AF moving unit 100, a second region 802 in which a connector 840 is disposed, and a third region 803 interconnecting the first region 801 and the second region 802. The third region 803 may serve as an interposer interconnecting the first region 801 and the second region 802.

The connector 840 may be conductively connected to the second region 802 of the second circuit board 800, and may include a port in order to be conductively connected to an external device.

Each of the first region 801 and the second region 802 of the second circuit board 800 may include a flexible substrate and a rigid substrate, and the third region 803 thereof may include a flexible substrate, but the disclosure is not limited thereto. In another embodiment, at least one of the first to third regions 801 to 803 of the circuit board 800 may include at least one of a rigid substrate or a flexible substrate.

The first region 801 may alternatively be referred to as a first substrate, the second region 802 may alternatively be referred to as a second substrate, and the third region 803 may alternatively be referred to as a third substrate.

The second circuit board 800 may have formed therein a bore 800A corresponding to the bore in the bobbin 110 of the AF moving unit 100, the lens module 400, and/or the image sensor 810. In an example, the bore 800A in the second circuit board 800 may be formed in the first region 801.

Referring to FIGS. 10, 11, and 19A, at least a portion of the lens module 400 may be located under the second surface 44B of the second circuit board 800 through the bore 800A in the second circuit board 800.

The lens module 400 may be disposed on the first circuit board 250. In an example, the lens module 400 may be located on the filter 610 disposed on the filter holder 600.

In an example, the lower portion, the lower end, or the lower surface of the lens or the lens barrel of the lens module 400 may be located under the second surface 44B of the second circuit board 800 through the bore 800A in the second circuit board 800.

In addition, in an example, the lower portion, the lower end, or the lower surface of the lens or the lens barrel of the lens module 400 may be located on the first surface 60A of the first circuit board 250.

In addition, the lower portion, the lower end, or the lower surface of the lens or the lens barrel of the lens module 400 may be located above the bore 70 in the holder 270.

When viewed from above, the second circuit board 800 may have a polygonal shape (e.g. a quadrangular shape, a square shape, or a rectangular shape), but the disclosure is not limited thereto. In another embodiment, the second circuit board may have a circular shape. In addition, the bore 800A in the second circuit board 800 may have a polygonal shape (e.g. a quadrangular shape, a square shape, or a rectangular shape), but the disclosure is not limited thereto. In another embodiment, the bore in the second circuit board may have a circular shape.

The second circuit board 800 may include at least one pad corresponding to the support member 220. In an example, the at least one pad of the second circuit board 800 may include a plurality of pads 800B. Here, the pad 800B may alternatively be referred to as a "lead pattern," a "lead member," or a "hole."

The second circuit board 800 may have formed therein at least one hole corresponding to the support member 220. The hole may be formed through the second circuit board 800. In an example, the second circuit board 800 may have formed therein a plurality of through-holes corresponding to the plurality of support members.

In an example, each of the plurality of pads 800B may have a hole formed through the second circuit board 800 in the optical-axis (OA) direction.

In an example, each of the plurality of pads 800B may be formed so as to surround the hole in the circuit board 800, and may further include a lead pattern or a conductive layer.

The support member 220 may be soldered to the pad 800B through the hole in the circuit board 800, and may be conductively connected to the lead pattern disposed around the pad 800B.

In an example, the plurality of pads 800B may be disposed around the bore 800A in the second circuit board 800 so as to be spaced apart from each other at regular intervals. In an example, the plurality of pads 800B may be disposed in the region between the bore 800A in the second circuit board 800 and the sides of the second circuit board 800.

The second circuit board 800 may have at least one coupling hole 800C formed therein to be coupled to the coupling protrusion 45B of the housing 450. The coupling hole 800C may be a through-hole formed through the second circuit board 800 in the optical-axis direction, but the disclosure is not limited thereto. In another embodiment, the coupling hole may be of a recessed type.

In an example, the coupling hole 800C may be formed in each of corners of the second circuit board 800, which face each other in a diagonal direction, but the disclosure is not limited thereto. The coupling hole may be disposed adjacent to the side of the circuit board 800, or may be located between the side of the circuit board and the bore 800A.

The second circuit board 800 may include at least one terminal, for example a plurality of terminals 7A to 7F.

The plurality of terminals 7A to 7F may be formed on the first surface 44A (e.g. the upper surface) of the second circuit board 800. In an example, the plurality of terminals 7A to 7F may be disposed on one side of the second circuit board 800, which is adjacent to one edge of the second circuit board 800.

Each of the plurality of terminals 7A to 7F may be conductively connected to a corresponding one of the terminals B1 to B6 of the circuit board 190 by means of a conductive adhesive member or a solder.

In an example, the second circuit board 800 may include a terminal unit 80A, which is constituted by the plurality of terminals 7A to 7F, and the terminal unit 80A may protrude from one side of the second circuit board 800 in a direction perpendicular to the optical axis. In another embodiment, the terminal unit may not protrude from one side of the circuit board 800.

The image sensor unit 350 may further include a housing 450, in which the second circuit board 800 is disposed, seated, or accommodated.

The housing 450 may be coupled to at least a portion of the second circuit board 800. The housing 450 may accommodate the magnet 23, and may alternatively be referred to as a "magnet holder."

In an example, the second circuit board 800 may be disposed under the AF moving unit 100, and may be coupled to the AF moving unit. In an example, an adhesive member 310 may be disposed between the second circuit board 800 and the AF moving unit 100, and may couple the two components to each other.

In an example, the adhesive member 310 may be disposed between the first surface 44A of the second circuit board 800 and the lower portion, the lower surface, or the lower end of the housing 140 of the AF moving unit, and may couple the two components to each other.

In another embodiment, the housing 140 of the AF moving unit 100 may be coupled to the housing 450 of the image sensor unit 350. For example, the upper portion, the upper end, or the upper surface of the image sensor unit may be coupled to the lower portion, the lower end, or the lower surface of the housing 140 of the AF moving unit 100 by means of an adhesive member or a coupling structure.

The housing 450 may be disposed under the second circuit board 800. In an example, on the basis of the second circuit board 800, the AF moving unit 100 may be disposed on the second circuit board 800, and the housing 450 may be disposed under the second circuit board 800.

The housing 450 may have a shape corresponding to or coinciding with the first region 801 of the second circuit board 800. When viewed from above, the housing 450 may have a polygonal shape (e.g. a quadrangular shape, a square shape, or a rectangular shape), but the disclosure is not limited thereto. In another embodiment, the housing 450 may have a circular shape or an elliptical shape.

The housing 450 may have a bore 450A formed therein. At least a portion of the bore 450A in the housing 450 may correspond to or overlap the bore 800A in the second circuit board 800.

When viewed from above, the bore 450A in the housing 450 may have a polygonal shape (e.g. a quadrangular shape or an octagonal shape), a circular shape, or a cross shape, but the disclosure is not limited thereto. The bore 450A in the housing 450 may take the form of a through-hole formed through the housing 450 in the optical-axis direction.

The housing 450 may include at least one coupling protrusion 45B protruding from the upper surface of the body 42. In an example, the coupling protrusion 45B may protrude from the upper surface of the housing 450 toward the second surface 44B (e.g. the lower surface) of the second circuit board 800.

The housing 450 may include an escape region 41 corresponding to the plurality of pads 800B. The escape region 41 may be formed at a position corresponding to the support member 220, and may be an escape region for avoiding spatial interference between the housing 450 and the support member 220.

Referring to FIGS. 1 and 10, the second circuit board 800 may include terminals 7A to 7F corresponding to the terminals B1 to B6 of the circuit board 190 of the AF moving unit 100.

Each of the terminals 7A to 7F of the second circuit board 800 may be conductively connected to a corresponding one of the terminals B1 to B6 of the circuit board 190 of the AF moving unit 100. A driving signal or power may be applied to the first position sensor 170 through the second circuit board 800, and output of the first position sensor 170 may be output to the second circuit board 800. In addition, a driving signal or power may be applied to the first coil 120 through the second circuit board 800.

Referring to FIG. 11, the second circuit board 800 may include a connector 840, which is disposed in the second region 802. In an example, the connector 840 may be disposed on one surface (e.g. the lower surface or the upper surface) of the second region 802 of the second circuit board 800.

The housing 450 may include a seating portion 8A, in which the magnet 23 is accommodated, disposed, or seated. The seating portion 8A may be formed in the lower surface of the housing 450.

In an example, the seating portion 8A may be formed in the shape of a recess depressed in the lower surface of the housing 450, and may have a shape corresponding to the shape of the magnet 23.

In an example, the seating portion 8A may be formed in each of the corners of the housing 450, but the disclosure is not limited thereto. In another embodiment, the seating portion may be formed in the side of the housing 450.

In an example, the seating portion 8A may be formed in each of the four corners of the housing 450, but the disclosure is not limited thereto. In another embodiment, the number of seating portions formed in the housing 450 may correspond to the number of magnets 23.

The magnet and the seating portion in the housing 450 may be attached or coupled to each other by means of an adhesive member. In this case, a guide groove 9A for guiding an adhesive member may be formed in the seating portion 8A in the housing 450. The guide groove 9A may serve to allow the adhesive member to evenly spread in the seating portion 8A.

The magnet 23 may be disposed in the housing 450. In an example, the magnet 23 may be disposed on each of the corners of the housing 140, but the disclosure is not limited thereto. In another embodiment, the magnet 23 may be disposed on the side portion of the housing 450.

The magnet 23 may serve to provide a magnetic field for interaction with the second coil 230 for the purpose of optical image stabilization (OIS) operation for hand-tremor compensation.

In an example, the magnet 23 may include a plurality of magnets 23A to 23D. Each of the plurality of magnets 23A to 23D may be disposed on a corresponding one of the corners of the housing 450.

In an example, each of the plurality of magnets 23A to 23D may be a monopolar-magnetized magnet, which has one N pole and one S pole, but the disclosure is not limited thereto. In another embodiment, each of the magnets 23A to 23D may be a bipolar-magnetized magnet or a 4-pole magnet, which includes two N poles and two S poles.

In an example, when each of the magnets 23A to 23D is a bipolar-magnetized magnet, each of the magnets 23A to 23D may include a first magnet part, a second magnet part, and a partition wall disposed between the first magnet part and the second magnet part. Here, the partition wall may alternatively be referred to as a "non-magnetic partition wall."

In an example, each of the first magnet part and the second magnet part may include an N pole, an S pole, and an interface portion between the N pole and the S pole. The interface portion may be a portion that has substantially no magnetism and has a zone having almost no polarity, and may be a portion that is naturally formed in order to form a magnet composed of one N pole and one S pole.

The partition wall may be a portion that separates or isolates the first magnet part and the second magnet part from each other and has substantially no magnetism and thus almost no polarity. For example, the partition wall may be a non-magnetic material or air. The non-magnetic partition wall may be referred to as a "neutral zone" or a "neutral region."

The partition wall may be a portion artificially formed when the first magnet part and the second magnet part are magnetized, and the width of the partition wall may be larger than the width of the interface portion.

In an example, the partition wall of each of the magnets 23A to 23D may extend in a direction parallel to the second circuit board 800 or the first circuit board 250, but the disclosure is not limited thereto. In another embodiment, the partition wall may extend in a direction perpendicular to the second circuit board 800 or the first circuit board 250.

In an example, each of the four magnets 23A to 23D may be disposed on a corresponding one of the four corners of the housing 450. In an example, two magnets (e.g. 23A and 23B) disposed on two adjacent corners of the housing 450 may be disposed in directions perpendicular to each other, and two magnets (e.g. 23A and 23C, or 23B and 23D) disposed on two corners of the housing 450, which face each other in a diagonal direction, may be disposed in directions parallel to each other. However, the disclosure is not limited thereto.

In addition, in an example, the inner portions of the magnets 23A to 23D may have the same polarity as each other. In addition, the outer portions of the magnets 23A to 23D may have the same polarity as each other. Here, the inner portions may be portions that are closer to the optical axis than the outer portions, and the outer portions may be portions opposite the inner portions.

In an example, the inner portion of each of the magnets 23A to 23D may be formed as an N pole, and the outer portion thereof may be formed as an S pole. However, in a modified example, the inner portion of each of the magnets 23A to 23D may be formed as an S pole, and the outer portion thereof may be formed as an N pole.

The N-pole and the S-pole of each of the first and third magnet units 23A and 23C, which face each other in a first diagonal direction, may be disposed so as to face each other in a first horizontal direction (e.g. the X-axis direction). In addition, the N-pole and the S-pole of each of the second and fourth magnet units 23B and 23D, which face each other in a second diagonal direction, which is perpendicular to the first diagonal direction, may be disposed so as to face each other in a second horizontal direction (e.g. the Y-axis direction).

That is, the direction in which the N-pole and the S-pole of the first magnet unit 23A face each other may be the same as or parallel to the direction in which the N-pole and the S-pole of the third magnet unit 23C face each other. In addition, the direction in which the N-pole and the S-pole of the second magnet unit 23B face each other may be the same as or parallel to the direction in which the N-pole and the S-pole of the fourth magnet unit 23D face each other.

In an example, on the basis of a boundary line (or an interface) between the N-pole and the S-pole of each of the first to fourth magnet units 23A to 23D, the N-pole may be located at an inner position, and the S-pole may be located at an outer position. In another embodiment, on the basis of the boundary line between the N-pole and the S-pole of each of the first to fourth magnet units 23A to 23D, the S-pole may be located at an inner position, and the N-pole may be located at an outer position. The boundary line (or the interface) may be a portion that isolates the N-pole and the S-pole from each other and has substantially no magnetism and thus almost no polarity. When the magnet 23 is a bipolar-magnetized magnet or a 4-pole magnet, the boundary line may correspond to a partition wall. In this case, the partition wall may be a non-magnetic material or air, and may be referred to as a "neutral zone" or a "neutral region."

The holder 270 may be disposed below the second circuit board 800. The holder 270 may be disposed so as to be spaced apart from the second circuit board 800, and may be coupled to the first circuit board 250.

The holder 270 may accommodate or support the second coil 230. The holder 270 may serve to support the second coil 230 so that the second coil 230 is spaced apart from the circuit board 250.

In an example, the lower portion, the lower surface, or the lower end of the holder 270 may be coupled to the upper portion, the upper surface, or the upper end of the first circuit board 250.

Referring to FIGS. 13A and 13B, the lower surface 42B of the holder 270 may include a first surface 36A and a second surface 36B. The second surface 36B may be stepped with respect to the first surface 36A in the optical-axis direction. In an example, the second surface 36B may be located above (or higher than) the first surface 36A. In an example, the second surface 36B may be located closer to the upper surface 42A of the holder 270 than the first surface 36A. In an example, the distance between the upper surface 42A of the holder 270 and the second surface 36B may be shorter than the distance between the upper surface 42A of the holder 270 and the first surface 36A.

The holder 270 may include a third surface 36C interconnecting the first surface 36A and the second surface 36B. In an example, the first surface 36A and the second surface 36B may be parallel to each other, and the third surface 36C may be perpendicular to the first surface 36A and/or the second surface 36B, but the disclosure is not limited thereto. In another embodiment, the internal angle formed between the third surface 36C and the first surface 36A (or the second surface 36B) may be an acute angle or an obtuse angle.

The first surface 36A may be located near the edge of the lower surface 42B of the holder 270, and the second surface 36B may be located in the center region of the holder 270.

The holder 270 may have formed therein a bore 70 corresponding to one region of the upper surface of the circuit board 250. In an example, the bore 70 in the holder 270 may be a through-hole formed through the holder 270 in the optical-axis direction. In an example, the bore 70 in the holder 270 may correspond to, face, or overlap the image sensor 810 in the optical-axis direction.

When viewed from above, the bore 70 in the holder 270 may have a polygonal shape such as a quadrangular shape, a circular shape, or an elliptical shape, but the disclosure is not limited thereto. The bore in the holder may be formed in any of various other shapes.

In an example, the bore 70 in the holder 270 may have a shape or a size for exposing the image sensor 810 and some elements disposed on the first circuit board 250. In an example, the area of the bore 70 in the holder 270 may be smaller than that of the first surface 60A of the first circuit board 250.

In an example, the bore 70 may be formed in the second surface 36B of the lower surface 42B of the holder 270.

The holder 270 may have formed therein holes 41A, 41B, and 41C corresponding to the second position sensors 240. In an example, the holder 270 may have holes 41A, 41B, and 41C formed therein at positions respectively corresponding to the first to third sensors 240a, 240b, and 240c.

In an example, the holes 41A, 41B, and 41C may be disposed adjacent to the corners of the holder 270. The holder 270 may have therein a dummy hole 41D, which does not correspond to the second position sensors 240 and is formed at a position adjacent to the corner of the holder 270 that does not correspond to the second position sensors 240. The dummy hole 41D may be formed in order to balance the weight of the OIS moving unit during OIS operation. In another embodiment, the dummy hole 41D may not be formed.

The holes 41A, 41B, and 41C may be through-holes formed through the holder 270 in the optical-axis direction. In an example, the holes 41A, 41B, and 41C may be formed in the second surface 36B of the lower surface 42B of the holder 270, but the disclosure is not limited thereto. In another embodiment, the holes may be formed in the first surface of the lower surface of the holder 270. In another embodiment, the holes 41A, 41B, and 41C in the holder 270 may be omitted.

The holder 270 may have an injection hole 33A formed in the lower surface 42B thereof at a position corresponding to an injection hole in a mold, into which an injection material for forming the holder 270 is injected.

The first circuit board 250 may be disposed on the second surface 36B of the lower surface 42B of the holder 270. The first circuit board 250 may alternatively be referred to as a sensor board, a main board, a main circuit board, a sensor circuit board, or a moving circuit board.

In all of the embodiments, the first circuit board 250 may alternatively be referred to as a "second board" or a "second circuit board," and the second circuit board 800 may alternatively be referred to as a "first board" or a "first circuit board."

In the embodiment, the image sensor 810, the position sensors 240a and 240b, and the circuit elements (e.g. the capacitor and the controller 830) may be disposed on the first circuit board 250, which is provided as a single board.

In a conventional comparative example, a first circuit board may include two circuit boards, and the two circuit boards may be conductively connected to each other by means of a solder. In the comparative example, a position sensor and circuit elements may be disposed on any one of the two circuit boards, and an image sensor may be disposed on the remaining one of the two circuit boards.

In the comparative example, because the camera module includes three circuit boards including the second circuit board 800, workability and production yield may decrease, and a production cost may increase. In addition, when a sensor signal output from the image sensor is transmitted to the second circuit board 800, the sensor signal may be distorted due to resistance of solders conductively interconnecting the three circuit boards, and the degree of distortion may be large.

In contrast, since the embodiment shown in FIG. 1 includes two circuit boards 800 and 250, design thereof may be simplified, and workability and production yield may be improved. In addition, in the embodiment shown in FIG. 1, the number of solders interconnecting the circuit boards 800 and 250 is reduced compared to the comparative example. Therefore, when a sensor signal output from the image sensor 810 is transmitted to the second circuit board 800, distortion of the sensor signal may be prevented, or the degree of distortion may be insignificant.

The first surface 60A of the first circuit board 250 may be coupled or attached to the second surface 36B of the lower surface 42B of the holder 270 by means of an adhesive member.

In this case, the first surface 60A of the circuit board 250 may be a surface that faces the second circuit board 800 (or the AF moving unit 100) and on which the image sensor 810 is disposed. In addition, the second surface 60B of the circuit board 250 may be a surface opposite the first surface 60A of the circuit board 250.

The holder 270 may have seating recesses 51A to 51D formed in the lower surface 42B thereof so that at least a portion of the circuit board 250 is inserted into and disposed in the seating recesses.

The seating recesses 51A to 51D may be respectively formed in the four corners of the lower surface 42B of the holder 270, and may respectively correspond to the protruding portions 52A to 52D of the first circuit board 250.

In an example, the first surface 36A of the lower surface 42B of the holder 270 may surround the protruding portions 52A to 52D of the circuit board 250, and the side surfaces of the protruding portions 52A to 52D of the first circuit board 250 may face the third surface 36C of the holder 270. Adhesive members may be disposed between the protruding portions 52A to 52D of the first circuit board 250 and the seating recesses 51A to 51D in the holder 270, and the two components may be coupled to each other by means of the adhesive members.

The protruding portions 52A to 52D of the first circuit board 250 may serve to increase coupling force between the holder 270 and the first circuit board 250 and to prevent the circuit board 250 from rotating and warping.

The protruding portions 52A to 52D of the first circuit board 250 and the seating recesses 51A to 51D in the holder 270 may overlap each other in the optical-axis direction. In addition, each of the holes 41A, 41B, and 41C may overlap at least a portion of a corresponding one of the seating recesses 51A to 51C in the holder 270 in the optical-axis direction. In addition, each of the holes 41A, 41B, and 41C may overlap at least a portion of a corresponding one of the protruding portions 52A to 52C of the first circuit board 250 in the optical-axis direction.

The holder 270 may have at least one groove 272 depressed in the first surface 36A of the lower surface 42B thereof. In an example, the holder 270 may have formed therein a plurality of grooves (e.g. four grooves) corresponding to a plurality of sides (e.g. four sides) of the lower surface 42B thereof.

The groove 272 may include a bottom 72A, which is stepped with respect to the first surface 36A of the lower surface 42B of the holder 270 in the optical-axis (OA) direction, and a side wall 27B, which connects the bottom 72A to the first surface 36A.

In an example, the bottom 72A of the groove 272 may be located closer to the upper surface 42A of the holder 270 than to the first surface 36A of the lower surface 42B of the holder 270. In addition, the bottom 72A of the groove 272 may be located at a height between the first surface 36A and the second surface 36B of the lower surface 42B of the holder 270.

The holder 270 may have at least one hole 270A formed therein to allow the support member 220 to pass therethrough. In an example, the holder 270 may have formed therein a plurality of holes 270A corresponding to the plurality of support members 220. The holes 270A may serve to avoid spatial interference with the support members. In another embodiment, the holder may include an escape groove or an escape portion in place of the holes in order to avoid spatial interference with the support members.

In an example, the plurality of holes 270A may be disposed or arranged around the bore 70 in the holder 270 so as to be spaced apart from each other at regular intervals. In an example, the plurality of holes 270A may be disposed in the region between the bore 70 in the holder 270 and the sides of the holder 270.

For example, the holes 270A may be through-holes formed through the holder 270 in the optical-axis direction.

The plurality of holes 270A in the holder 270 may overlap the groove 272 in the holder 270 in the optical-axis direction. In an example, each of the plurality of holes 270A may have an opening that is open to the bottom 72A of the groove 272. The opening in each of the plurality of holes 270A, which is open to the bottom 72A, may be stepped with respect to the first surface 36A of the lower surface 42B of the holder 270 in the optical-axis direction.

In an example, the plurality of holes 270A may penetrate the bottom 72A of the groove 272 in the holder 270.

Here, the groove 272 in the holder 270 serves to facilitate elastic deformation of the elastic connection member 280 so that spatial interference with the holder 270 is avoided when the elastic connection member 280 is elastically deformed by OIS operation.

The holder 270 may include a protruding portion 275 formed on the lower surface 42B thereof. In an example, the protruding portion 275 may be formed on the first surface 36A of the lower surface 42B of the holder 270.

The protruding portion 275 of the holder 270 may protrude from the first surface 36A of the lower surface 42B of the holder 270 toward the bottom of the base 210.

The protruding portion 275 of the holder 270 may further protrude toward the bottom of the base 210 than the elastic connection member 280. Alternatively, in another example, the protruding portion 275 of the holder 270 may further protrude toward the bottom of the base 210 than a solder 902 coupling the elastic connection member 280 to the support member 220.

In an example, a first distance between the protruding portion 275 of the holder 270 and the bottom of the base 210 in the optical-axis direction may be shorter than a second distance between the elastic connection member 280 and the bottom of the base 210. In an example, the first distance may be shorter than a third distance between the solder 902 and the bottom of the base 210.

The protruding portion 275 may serve as a stopper for preventing the first surface 36A of the lower surface 42B of the holder 270, the elastic connection member 280, and/or the solder 902 from directly colliding with the bottom of the base 210 due to external impact.

In an example, the protruding portion 275 may be disposed on a corner of the lower surface 42B of the holder 270, but the disclosure is not limited thereto. In another embodiment, the protruding portion 275 may be located on a side of the lower surface 42B of the holder 270 or between the side and the bore 70.

The first circuit board 250 may be disposed under the second circuit board 800.

In an example, the first circuit board 250 may be disposed under the holder 270.

Although the first circuit board 250 is illustrated in FIG. 12A as being implemented as a single board on which the image sensor 810 is disposed, the disclosure is not limited thereto. In another embodiment, the first circuit board 250 may include a third board on which the image sensor is disposed and a fourth board conductively connected to the third board. The fourth board may be conductively connected to the second circuit board 800 via the support member 220 and the elastic connection member 280.

When viewed from above, the first circuit board 250 may have a shape, e.g. an outer circumferential shape, that coincides with or corresponds to that of the lower surface 42B of the holder 270, but the disclosure is not limited thereto.

The first circuit board 250 may include one or more protruding portions 52A to 52D protruding from the side surface 21A thereof.

In an example, the first circuit board 250 may include protruding portions 52A to 52D respectively formed on the four corners thereof.

In an example, referring to FIG. 13B, the first circuit board 250 may include first to fourth protruding portions 52A to 52D formed on the four corners thereof.

Each of the first to fourth protruding portions 52A to 52D may protrude from the side surface 21A of the first circuit board 250 in at least one of the +X-axis direction, the −X-axis direction, the +Y-axis direction, or the −Y-axis direction.

In an example, each of the first protruding portion 52A and the third protruding portion 52C may protrude from the side surface 21A of the first circuit board 250 in the X-axis direction and the Y-axis direction. Each of the second protruding portion 52B and the fourth protruding portion 52D may protrude in the Y-axis direction, and the two protruding portions may protrude in directions opposite each other.

The first circuit board 250 may include at least one terminal 262 corresponding to the support member 220 or a connection spring 281 of the elastic connection member 280.

In an example, the first circuit board 250 may include a plurality of terminals 262 disposed or arranged on the second surface 60B thereof so as to be spaced apart from each other. In an example, the terminals 262 may be disposed adjacent to the side surface 21A of the first circuit board 250. The number of terminals 262 is not limited to that shown in FIG. 14, and may be greater or less than that shown in FIG. 14.

In an example, the terminal 262 of the first circuit board 250 may be conductively connected to the support member 220. In an example, the terminal 262 of the first circuit board 250 may be conductively connected to the connection spring 281.

The first circuit board 250 may include terminals E1 to E8 in order to be conductively connected to the second coil 230. Here, the terminals E1 to E8 may alternatively be referred to as "pads" or "bonding portions." The terminals E1 to E8 of the first circuit board 250 may be disposed or arranged on the first surface 60A of the first circuit board 250.

The first circuit board 250 may be a printed circuit board or a flexible printed circuit board (FPCB).

The first circuit board 250 may have a seating area 260A on which the image sensor 810 is disposed. In an example, the seating area 260A may be provided on the first surface 60A (e.g. the upper surface) of the first circuit board 250. In an example, the bore 70 in the holder 270 may open or expose the image sensor 810 disposed in the seating area 260A.

The second coil 230 may be disposed on the holder 270.

In an example, the second coil 230 may be disposed on the upper surface 42A of the holder 270.

The second coil 230 may be disposed below the housing 450. The second coil 230 may be disposed below the magnet 23.

In an example, the second coil 230 may be disposed on the upper surface 42A of the holder 270 so as to correspond to, face, or overlap the magnet 23 disposed in the housing 450 in the optical-axis (OA) direction.

The second coil 230 may be coupled to the holder 270. In an example, the second coil 230 may be coupled to the upper surface 42A of the holder 270. At least one coupling protrusion 51 may be formed on the upper surface 42A of the holder 270 in order to be coupled to the second coil 230.

The coupling protrusion 51 may protrude from the upper surface 42A of the holder 270 toward the second circuit board 800. In an example, the coupling protrusion 51 may be formed adjacent to each of the holes 41A to 41D in the holder 270.

In an example, two coupling protrusions 51A and 51B may be disposed or arranged so as to correspond to each of the holes 41A, 41B, 41C, and 41D in the holder 270. One hole (e.g. 41A) may be formed between the two coupling protrusions 51A and 51B.

In an example, the second coil 230 may include a plurality of coil units 230-1 to 230-4. In an example, the second coil 230 may include four coil units, but the disclosure is not limited thereto.

In an example, the first and third coil units 230-1 and 230-3 may be coils for moving the OIS moving unit in the second direction (e.g. the x-axis direction), and the second and fourth coil units 230-2 and 230-4 may be coils for moving the OIS moving unit in the third direction (e.g. the y-axis direction).

The second coil 230 may have a center hole formed therein in order to be coupled to the coupling protrusion 51. In an example, each of the coil units 230-1 to 230-4 may have a center hole formed therein.

Each of the plurality of coil units 230-1 to 230-4 may face or overlap a corresponding one of the magnets 23A to 23D disposed in the housing 450 in the optical-axis (OA) direction.

Each of the coil units may take the form of a coil block having a closed curve shape or a ring shape, but the disclosure is not limited thereto. In an example, each of the coil units may be embodied as a fine pattern (FP) coil. In another embodiment, the coil units may be formed on a circuit member provided separately from the first circuit board 250.

In an example, each of the four coil units 230-1 to 230-4 may be disposed or arranged on a corresponding one of the four corners of the holder 270.

Each of the coil units 230-1 to 230-4 may be coupled to two corresponding coupling protrusions 51A and 51B of the holder 270. In an example, each of the coil units 230-1 to 230-4 may be directly wound around two corresponding coupling protrusions 51A and 51B of the holder 270.

The coil units 230-1 to 230-4 may correspond to or face the protruding portions 52A to 52D of the circuit board 250 in the optical-axis direction. In an example, at least a portion of each of the coil units 230-1 to 230-4 may overlap a corresponding one of the protruding portions 52A to 52D of the circuit board 250 in the optical-axis direction.

The second coil 230 may be conductively connected to the first circuit board 250, and power or a driving signal may be supplied to the second coil 230 through the first circuit board 250. The power or the driving signal supplied to the second coil 230 may be a DC signal, an AC signal, or a signal containing both DC and AC components, and may be of a current type or a voltage type.

In this case, current may be independently applied to at least three coil units among the four coil units.

In the first embodiment, the second coil 230 may be controlled through four individual channels, and in this case, the four coil units may be conductively separated from each other. Further, any one of a forward current and a reverse current may be selectively applied to each of the coil units. In this case, four pairs of lead wires, i.e. a total of eight lead wires, may be led out from the second coil 230.

In an example, any two coil units 230-1 and 230-3 facing each other diagonally may be formed or disposed so as to be elongated in the first-axis direction (e.g. the Y-axis direction), and the other two coil units 230-2 and 230-4 facing each other diagonally may be formed or disposed so as to be elongated in the second-axis direction (e.g. the X-axis direction). In this case, the first-axis direction and the second-axis direction may be perpendicular to each other.

The long side of the first coil unit 230-1 and the long side of the third coil unit 230-3 may be disposed parallel to each other. The long side of the second coil unit 230-2 and the long side of the fourth coil unit 230-4 may be disposed parallel to each other. The long side of the first coil unit 230-1 and the long side of the second coil unit 230-2 may not be parallel to each other. In this case, the long side of the first coil unit 230-1 and the long side of the second coil unit 230-2 may be disposed such that imaginary extension lines therefrom are perpendicular to each other. In an example, the disposition direction of the first coil unit 230-1 and the disposition direction of the second coil unit 230-2 may be perpendicular to each other.

In an example, referring to FIG. 12B, each of the first and third coil units 230-1 and 230-3 may be formed such that the length thereof in the longitudinal direction (e.g. the Y-axis direction) is longer than the length thereof in the transverse direction (e.g. the X-axis direction), and each of the second and fourth coil units 230-2 and 230-4 may be formed such that the length thereof in the transverse direction is longer than the length thereof in the longitudinal direction.

In an example, in the second embodiment, the second coil 230 may be controlled through three channels.

In an example, only the first to third coil units among the first to fourth coil units may be conductively separated from each other, and the fourth coil unit may be conductively connected to any one of the first to third coil units in series. In this case, three pairs of lead wires, i.e. a total of six lead wires, may be led out from the second coil 230.

In another embodiment, at least one of the four coil units may be driven separately from the others. In still another embodiment, each of the four coil units may be individually driven.

In an example, one end of the first coil unit 230-1 may be connected to the first terminal E1, the other end of the first coil unit 230-1 may be connected to the second terminal E2, and a first driving signal for driving the first coil unit 230-1 may be supplied to the first and second terminals E1 and E2. The first and second terminals E1 and E2 may be arranged so as to be spaced apart from each other in a direction parallel to the long side of the first coil unit 230-1 (e.g. the Y-axis direction).

One end of the second coil unit 230-2 may be connected to the third terminal E3, the other end of the second coil unit 230-2 may be connected to the fourth terminal E4, and a second driving signal for driving the second coil unit 230-2 may be supplied to the third and fourth terminals E3 and E4. The third and fourth terminals E3 and E4 may be arranged so as to be spaced apart from each other in a direction parallel to the long side of the second coil unit 230-2 (e.g. the X-axis direction).

One end of the third coil unit 230-3 may be connected to the fifth terminal E5, the other end of the third coil unit 230-3 may be connected to the sixth terminal E6, and a third driving signal for driving the third coil unit 230-3 may be supplied to the fifth and sixth terminals E5 and E6. The fifth and sixth terminals E5 and E6 may be arranged so as to be spaced apart from each other in a direction parallel to the long side of the third coil unit 230-3 (e.g. the Y-axis direction).

One end of the fourth coil unit 230-4 may be connected to the seventh terminal E7, the other end of the fourth coil unit 230-4 may be connected to the eighth terminal E8, and a fourth driving signal for driving the fourth coil unit 230-4 may be supplied to the seventh and eighth terminals E7 and E8. The seventh and eighth terminals E7 and E8 may be arranged so as to be spaced apart from each other in a direction parallel to the long side of the fourth coil unit 230-4 (e.g. the X-axis direction).

The first to eighth terminals E1 to E8 may be disposed in one region of the upper surface 60A of the first circuit board 250, which is located between the coil units 230-1 to 230-4 and the image sensor 810.

The bore 70 in the holder 270 may expose the terminals E1 to E8 of the first circuit board 250. The lower surfaces of the coil units 230-1 to 230-4 may be located higher than the terminals E1 to E8 of the first circuit board 250.

In an example, the terminals E1 to E8 of the first circuit board 250 may be located lower than the upper surface 60A of the holder 270.

In an embodiment, any two coil units (e.g. 230-3 and 230-4) facing each other diagonally may be connected to each other in series, and may be driven in response to one driving signal. In addition, the other two coil units (e.g. 230-1 and 230-2) facing each other diagonally may be conductively separated from each other, and may be individually driven in response to different driving signals.

In another embodiment, the four coil units 230-1 to 230-4 may be conductively separated from each other, and may be individually driven in response to different driving signals.

Each of the coil units 230-1 to 230-4 may have a cavity or a hole formed in the center thereof, and the two coupling protrusions 51A and 51B may be inserted into and coupled to the cavity 11A (refer to FIG. 12A) or the hole in each of the coil units 230-1 to 230-4.

In an example, at least a portion of each of the coil units 230-1 to 230-4 may overlap a corresponding one of the magnets 23A to 23D disposed in the housing 450.

The "OIS moving unit" including the image sensor 810 may be moved in the second and/or third direction, e.g. the x-axis and/or y-axis direction, due to interaction between the magnets 23A to 23D and the coil units 230-1 to 230-4 to which driving signals are supplied, whereby hand-tremor compensation may be performed. The OIS moving unit will be described later.

The second position sensor 240 may be disposed on, coupled to, or mounted on the first surface 60A (e.g. the upper surface) of the first circuit board 250. The second position sensor 240 may detect displacement of the OIS moving unit in a direction perpendicular to the optical axis OA, e.g. shift or tilt of the OIS moving unit in a direction perpendicular to the optical axis or rotation of the OIS moving unit about the optical axis.

The first position sensor 170 may alternatively be referred to as an "AF position sensor," and the second position sensor 240 may alternatively be referred to as an "OIS position sensor."

In an example, the first position sensor 240 may be disposed on the protruding portions 52A to 52C of the first circuit board 250.

The second position sensor 240 may be disposed under the second coil 230.

The second position sensor 240 may not overlap the second coil 230 in a direction perpendicular to the optical axis. In an example, the sensing element of the second position sensor 240 may not overlap the second coil 230 in a direction perpendicular to the optical axis. The sensing element may be a portion that senses a magnetic field.

In an example, the center of the second position sensor 240 may not overlap the second coil 230 in a direction perpendicular to the optical axis. In an example, the center of the second position sensor 240 may be a spatial center in the X-axis and Y-axis directions in the XY-coordinate plane perpendicular to the optical axis. Alternatively, the center of the second position sensor 240 may be a spatial center in the X-axis, Y-axis, and Z-axis directions.

In another embodiment, at least a portion of the second position sensor 240 may overlap the second coil 230 in a direction perpendicular to the optical axis. In an example, at least a portion of the upper region 2A (refer to FIG. 26) of the second position sensor 240 may overlap the second coil 230 in a direction perpendicular to the optical axis. The lower region 2B of the second position sensor 240 may overlap the second coil 230 in a direction perpendicular to the optical axis. The upper region 2A may be a region from a point corresponding to half the length of the second position sensor 240 to the upper surface of the second position sensor 240 in the optical-axis direction, and the lower region 2B may be the remaining region other than the upper region 2A, which is located under the upper region 2A.

In an example, the second position sensor 240 may overlap each of the holes 41A to 41C in the holder 270 in the optical-axis direction. In addition, in an example, the second position sensor 240 may overlap the cavity 11A or the hole in the second coil 230 in the optical-axis direction. In addition, in an example, at least a portion of each of the holes 41A to 41C in the holder 270 may overlap the cavity 11A or the hole in the second coil 230 in the optical-axis direction.

The second position sensor 240 may include one or more sensors 240a, 240b, and 240c. In an example, the second position sensor 230 may include three sensors 240a, 240b, and 240c.

Each of the first to third sensors 240a, 240b, and 240c may be implemented as a Hall sensor alone or a driver IC including a Hall sensor. The description of the first position sensor 170 may also be applied to the first to third sensors 240a, 240b, and 240c.

Each of the first to third sensors 240a, 240b, and 240c may be conductively connected to predetermined corresponding terminals among the terminals 262 of the first circuit board 250. In an example, a driving signal may be supplied to each of the first to third sensors 240a, 240b, and 240c through the terminals 262, and an output signal from each of the first to third sensors may be output to other predetermined terminals among the terminals 262.

In an example, six or four different terminals among the terminals 262 of the first circuit board 250 may be allocated to each of the first to third sensors 240a, 240b, and 240c.

In an example, when each of the first to third sensors 240a, 240b, and 240c is a Hall sensor, four terminals may be allocated to each of the first to third sensors 240a, 240b, and 240c. In an example, the four terminals may include two input terminals and two output terminals.

Alternatively, in another example, when each of the first to third sensors 240a, 240b, and 240c is a driver IC including a Hall sensor, six terminals may be allocated to each of the first to third sensors 240a, 240b, and 240c. The description of the position sensor 170 may also be applied to conductive connection between each of the first to third sensors 240a, 240b, and 240c and the terminals 262 of the first circuit board 250 and the relationship between a driving signal and an output from the position sensor.

In an example, since the four coil units 230-1 to 230-4 are capable of being controlled through three channels, each of the first to third sensors 240a, 240b, and 240c may be disposed inside a corresponding one of the three coil units 230-1 to 230-3, and the remaining one coil unit 230-4 may not be provided with a sensor.

In an example, each of the coil units 230-1 to 230-4 may have a shape of a ring having a cavity 11A (refer to FIG. 12A), a hole, or a bore formed therein. In an example, each of the first to third sensors 240a, 240b, and 240c may be disposed under the cavity 11A, the hole, or the bore in a corresponding one of the coil units 230-1 to 230-3.

In an example, each of the first to third sensors 240a, 240b, and 240c may be disposed in a corresponding one of the holes 41A to 41C in the holder 270.

In an example, each of the first to third sensors 240a, 240b, and 240c may not overlap a corresponding one of the coil units 230-1 to 230-3 in a direction perpendicular to the optical axis. The first to third sensors 240a, 240b, and 240c may overlap the holder 270 in a direction perpendicular to the optical axis.

In an example, the coil units 230-1 to 230-4 may be disposed on the upper surface 42A of the holder 270, and the first to third sensors 240a, 240b, and 240c may be disposed on the first surface 60A of the first circuit board 250. The upper surface 42A of the holder 270 may be located above the first surface 60A of the first circuit board 250.

In an example, the upper surface 42A of the holder 270 may have a height difference from the first surface 60A of the first circuit board 250 in the optical-axis direction.

In addition, in an example, the height difference between the upper surface 42A of the holder 270 and the first surface 60A of the first circuit board 250 in the optical-axis direction may be greater than the length of each of the first to third sensors 240a, 240b, and 240c in the optical-axis direction. In another embodiment, the height difference between the upper surface 42A of the holder 270 and the first surface 60A of the first circuit board 250 in the optical-axis direction may be equal to the length of each of the first to third sensors 240a, 240b, and 240c in the optical-axis direction.

All of movement of the image sensor 810 in the x-axis direction, movement thereof in the y-axis direction, and rotation thereof about the z-axis may be sensed by the three sensors 240a, 240b, and 240c.

In an example, one (e.g. 240a) of the three sensors 240a, 240b, and 240c may detect the movement amount and/or the displacement of the OIS moving unit in the x-axis direction.

In an example, another one (e.g. 240b) of the three sensors 240a, 240b, and 240c may detect the movement amount and/or the displacement of the OIS moving unit in the y-axis direction.

In addition, in an example, the remaining one (e.g. 240c) of the three sensors 240a, 240b, and 240c may detect the movement amount and/or the displacement of the OIS moving unit in the x-axis direction (or the movement amount and/or the displacement thereof in the y-axis direction). The rotational movement of the OIS moving unit about the z-axis may be detected using outputs from two or more sensors among the three sensors.

In another embodiment, the third sensor 240c may be a rotation detection sensor or a roll sensor for detecting rotation of the OIS moving unit about the optical axis (or with respect to the optical axis), e.g. a tunnel magnetoresistance (TMR) sensor.

In an example, each of the first to third sensors 240a, 240b, and 240c may be a displacement detection sensor, the output voltage of which changes depending on the positional relationship with a corresponding magnet unit.

In an example, the first sensor 240a may detect the intensity of the magnetic field of the first magnet unit 23A, and may output a first sensing signal (e.g. a first output voltage) based on a result of detection. In an example, the second sensor 240b may detect the intensity of the magnetic field of the second magnet unit 23B, and may output a second sensing signal (e.g. a second output voltage) based on a result of detection.

In an example, the third sensor 240c may detect the intensity of the magnetic field of the third magnet unit 23c, and may output a third sensing signal (e.g. a third output voltage) based on a result of detection.

The controller 830, 830-1, or 885 may acquire, detect, or calculate displacement of the OIS moving unit in the second direction, displacement of the OIS moving unit in the third direction, or a rolling angle (or a rotational angle) of the OIS moving unit using at least one of the first sensing voltage of the first sensor 240a, the second sensing voltage of the second sensor 240b, or the third sensing voltage of the third sensor 240c.

In an example, the rotational direction and the rotational angle of the OIS moving unit may be detected using the first sensing voltage of the first sensor 240a and the third sensing voltage of the third sensor 240c.

In an example, the controller 830, 830-1, or 885 may detect the movement amount and/or the displacement of the OIS moving unit in the x-axis direction using the first sensing voltage. In addition, in an example, the controller 830, 830-1, or 885 may detect the movement amount and/or the displacement of the OIS moving unit in the y-axis direction using the second sensing voltage. In addition, in an example, the controller 830, 830-1, or 885 may detect the rotation amount or the rotational angle (or the rolling angle or the degree of rotation) of the OIS moving unit using at least two of the first to third sensing voltages.

Alternatively, in an example, the controller 830, 830-1, or 885 may detect the movement amount and/or the displacement of the OIS moving unit in the x-axis direction using the first to third sensing voltages, may detect the movement amount and/or the displacement of the OIS moving unit in the y-axis direction using the first to third sensing voltages, and may detect the rotation amount or the rotational angle (or the rolling angle) of the OIS moving unit using the first and third sensing voltages.

Alternatively, in an example, the controller 830, 830-1, or 885 may detect the movement amount and/or the displacement of the OIS moving unit in the x-axis direction using a first equation using the first to third sensing voltages. For example, the first equation may be an equation including at least one of the first to third sensing voltages as a variable.

Alternatively, in an example, the controller 830, 830-1, or 885 may detect the movement amount and/or the displacement of the OIS moving unit in the Y-axis direction using a second equation using the first to third sensing voltages. For example, the second equation may be an equation including at least one of the first to third sensing voltages as a variable.

In addition, in an example, the controller 830, 830-1, or 885 may detect the rotation amount or the rotational angle (or the rolling angle) of the OIS moving unit using a third equation using the first to third sensing voltages. The third equation may be an equation including at least one of the first to third sensing voltages as a variable. For example, the third equation may be an equation including the first and third sensing voltages as variables.

The controller 830, 830-1, or 885 may receive, from the motion sensor 820, position information about the X-axis movement amount Gx, the Y-axis movement amount Gy, and the rotation amount Gr according to movement of the camera device 200 caused by shaking of the user's hand, and may move or rotate the OIS moving unit so as to compensate for the position information in order to perform hand-tremor compensation.

In the embodiment in which the motion sensor 820 is omitted, position information about the X-axis movement amount Gx, the Y-axis movement amount Gy, and the rotation amount Gr according to movement of the optical instrument 200A may be received from a motion sensor included in the optical instrument 200A.

Figure 36:
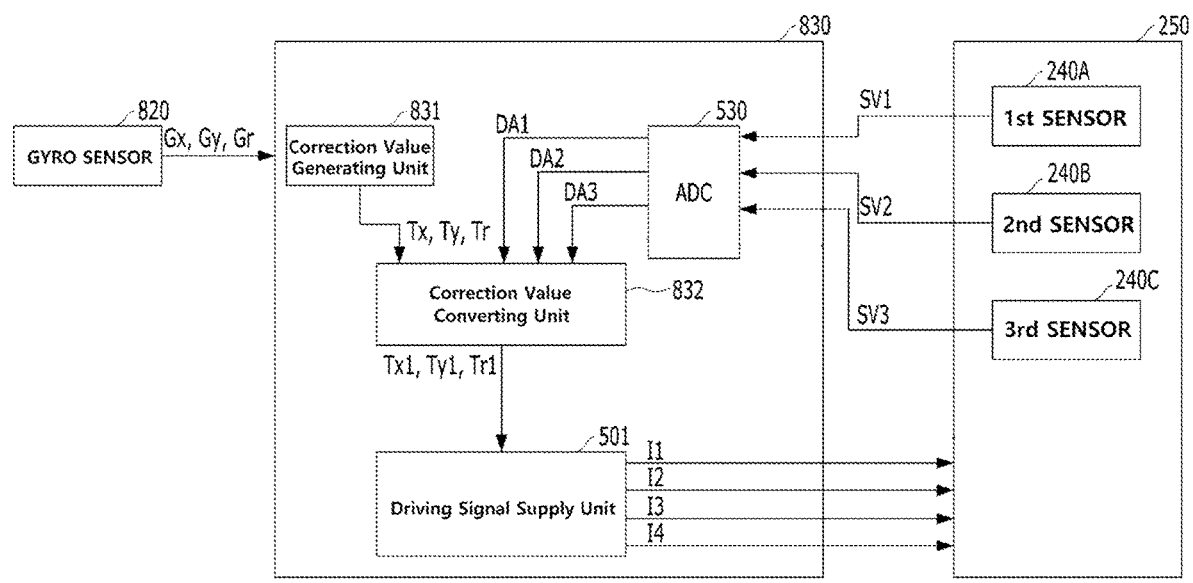
FIG. 36 is a configuration diagram of the controller according to an embodiment.

FIG. 36 is a configuration diagram of the controller 830 according to an embodiment. In FIG. 36, SV1 may be a first output voltage of the first sensor 240a according to the embodiment, SV2 may be a second output voltage of the second sensor 230b, and SV3 may be a third output voltage of the third sensor 240c.

Referring to FIG. 36, the controller 830 may control movement of the moving unit in the second direction, movement of the moving unit in the third direction, and/or rotation (rolling or tilting) of the moving unit using the first output voltage of the first sensor 240a, the second output voltage of the second sensor 240b, and the third output voltage of the third sensor 240c.

The controller 830 generates an x-axis correction value Tx for the x-axis movement amount, a y-axis correction value Ty for the y-axis movement amount, and a rotation correction value Tr for the rotation amount in order to perform hand-tremor compensation during movement of the camera device 200.

The controller 830 may generate an x-axis correction value Tx1, a y-axis correction value Ty1, and a rotation correction value Tr1 based on the first to third output voltages SV1 to SV3 and the correction values Tx, Ty, and Tr. The x-axis correction value may alternatively be referred to as a first target value (or an x-axis target value), the y-axis correction value may alternatively be referred to as a second target value (or a y-axis target value), and the rotation correction value may alternatively be referred to as a third target value (or a rotation target value).

In an example, the controller 830 may convert the correction values Tx, Ty, and Tr using the first to third output voltages SV1 to SV3, and may generate an x-axis target value Tx1, a y-axis target value Ty1, and a rotation target value Tr1 corresponding to results of conversion.

In an example, the controller 830 may convert the correction values Tx, Ty, and Tr using at least one of the first to third output voltages SV1 to SV3, and may generate an x-axis target value Tx1, a y-axis target value Ty1, and a rotation target value Tr1 corresponding to results of conversion.

In an example, the controller 830 may convert the rotation correction value Tr using at least one of the first to third output voltages SV1 to SV3, and may generate a rotation target value Tr1 corresponding to a result of conversion. In an example, the controller 830 may convert the x-axis correction value Tx using at least one of the first to third output voltages SV1 to SV3, and may generate an x-axis target value Tx1 corresponding to a result of conversion. In an example, the controller 830 may convert the y-axis correction value Ty using at least one of the first to third output voltages SV1 to SV3, and may generate a y-axis target value Ty1 corresponding to a result of conversion.

A very complicated algorithm may be necessary in order to add a roll function, and an OIS feedback driving system using a Hall sensor may be used in order to increase position accuracy.

Because the Hall sensor is characterized in that the output value thereof increases or decreases depending on the relationship with a magnet unit, OIS operation in the x-axis direction or the y-axis direction may be easily controlled using the relationship between the Hall sensor and the magnet unit. However, a control algorithm for OIS operation in the roll direction may be complicated.

In order to solve this problem, position information about the X-axis movement amount Gx, the Y-axis movement amount Gy, and the rotation amount Gr, received from the gyro sensor, may be used so that feedback OIS operation is independently controlled in each of the x-axis direction, the y-axis direction, and the roll direction, which are compensation axes.

In an example, the controller 830 may convert the rotation correction value Tr using the first output voltage SV1 and the third output voltage SV3, and may generate a rotation target value Tr1 corresponding to a result of conversion.

In an example, the controller 830 may convert the x-axis correction value Tx using the first to third output voltages SV1, SV2, and SV3, and may generate an x-axis target value Tx1 corresponding to a result of conversion. In an example, the controller 830 may convert the x-axis correction value Tx using the first and third sensing voltages SV1 and SV3, and may generate an x-axis target value Tx1 corresponding to a result of conversion.

In addition, in an example, the controller 830 may convert the y-axis correction value Ty using the first to third sensing voltages SV1, SV2, and SV3, and may generate a y-axis target value Ty1 corresponding to a result of conversion.

The controller 830 may control driving signals I1 to I4, which are to be supplied to the first to fourth coil units 230-1 to 230-4, based on the rotation target value Tr1, the x-axis target value Tx1, and the y-axis target value Ty1.

The controller 830 may include a correction value generating unit 831, an analog-to-digital converter 530, a correction value converting unit 832, and a driving signal supply unit 501.

The correction value generating unit 831 may receive, from the motion sensor (e.g. the gyro sensor 820), position information (or movement information) about the x-axis movement amount Gx, the y-axis movement amount Gy, and the rotation amount Gr in response to movement of the camera device 200.

The correction value generating unit 831 may generate, based on the position information Gx, Gy, and Gr of the camera device 200, an x-axis correction value Tx for the x-axis movement amount, a y-axis correction value Ty for the y-axis movement amount, and a rotation correction value Tr for the rotation amount in order to perform hand-tremor compensation during movement of the camera device 200. For example, the rotation amount may be an extent to which the camera device 200 rotates about the optical axis (e.g. an angle or an angular speed).

The analog-to-digital converter 530 may generate a first data value DA1 corresponding to the first output voltage SV1, a second data value DA2 corresponding to the second output voltage SV2, and a third data value DA3 corresponding to the third output voltage SV3.

The correction value converting unit 832 may generate an x-axis target value Tx1, a y-axis target value, and a rotation target value Tr1 based on the first to third data values DA1 to DA3, the x-axis correction value Tx, the y-axis correction value Ty, and the rotation correction value Tr.

In an example, the correction value converting unit 832 may convert the x-axis correction value Tx, the y-axis correction value Ty, and the rotation correction value Tr using the first to third data values DA1 to DA3, and may generate an x-axis target value Tx1, a y-axis target value Ty1, and a rotation target value Tr1 corresponding to results of conversion.

In an example, the correction value converting unit 832 may convert the rotation correction value Tr using at least one of the first to third data values DA1 to DA3, and may generate a rotation target value Tr1 corresponding to a result of conversion. In an example, the correction value converting unit 832 may convert the rotation correction value Tr using the first data value DA1 and the third data value DA3, and may generate a rotation target value Tr1 corresponding to a result of conversion.

In addition, in an example, the correction value converting unit 832 may convert the x-axis correction value Tx using at least one of the first to third data values DA1 to DA3, and may generate an x-axis target value Tx1 corresponding to a result of conversion.

In an example, the correction value converting unit 832 may convert the x-axis correction value Tx using the first to third data values DA1, DA2, and DA3, and may generate an x-axis target value Tx1 corresponding to a result of conversion. Alternatively, in an example, the correction value converting unit 832 may convert the x-axis correction value Tx using the first data value DA1 and the third data value DA3, and may generate an x-axis target value Tx1 corresponding to a result of conversion.

In addition, in an example, the correction value converting unit 832 may convert the y-axis correction value Ty using at least one of the first to third data values DA1 to DA3, and may generate a y-axis target value Ty1 corresponding to a result of conversion.

The driving signal supply unit 501 may control driving signals I1 to I4, which are to be supplied to the first to fourth coil units 230-1 to 230-4, based on the rotation target value Tr1, the x-axis target value Tx1, and the y-axis target value Ty1.

Referring to FIG. 12B, in an example, when a driving signal (e.g. a driving current) is applied to the first coil unit 230-1 and the third coil unit 230-3 and a driving signal (e.g. a driving current) is not applied to the second coil unit 230-2 or the fourth coil unit 230-4, the direction of first electromagnetic force resulting from interaction between the first coil unit 230-1 and the first magnet 23A and the direction of third electromagnetic force resulting from interaction between the third coil unit 230-3 and the third magnet 23C may be the same direction, e.g. the X-axis direction (e.g. the positive (+) X-axis direction or the negative (−) X-axis direction), and the OIS moving unit may be moved (shifted) in the X-axis direction (e.g. the positive (+) X-axis direction or the negative (−) X-axis direction).

In an example, when a driving signal (e.g. a driving current) is applied to the second coil unit 230-2 and the fourth coil unit 230-4 and a driving signal (e.g. a driving current) is not applied to the first coil unit 230-1 or the third coil unit 230-3, the direction of second electromagnetic force resulting from interaction between the second coil unit 230-2 and the second magnet 23B and the direction of fourth electromagnetic force resulting from interaction between the fourth coil unit 230-4 and the fourth magnet 23D may be the same direction, e.g. the Y-axis direction (e.g. the positive (+) Y-axis direction or the negative (−) Y-axis direction), and the OIS moving unit may be moved (shifted) in the Y-axis direction (e.g. the positive (+) Y-axis direction or the negative (−) Y-axis direction).

In addition, in an example, a driving signal may be supplied to each of the first to fourth coil units 230-1 to 230-4. When the direction of the first electromagnetic force and the direction of the third electromagnetic force are opposite each other, when the direction of the second electromagnetic force and the direction of the fourth electromagnetic force are opposite each other, and when the direction of rotation of the OIS moving unit by the first electromagnetic force and the third electromagnetic force and the direction of rotation of the OIS moving unit by the second electromagnetic force and the fourth electromagnetic force are the same as each other, the OIS moving unit may be rotated or rolled about the optical axis or the Z-axis.

In the case in which the second coil 230 is controlled through three channels, the OIS moving unit may be rolled by the first and third coil units 230-1 and 230-3 or the second and fourth coil units 230-2 and 230-4.

In the embodiment in FIGS. 12A and 12B, the second position sensor 240 may include three sensors 240a, 240c, and 240b.

In an example, the first sensor 240a may be disposed on a first corner of the first surface 60A of the first circuit board 250, the second sensor 240b may be disposed on a second corner of the first surface 60A of the first circuit board 250, and the third sensor 240c may be disposed on a third corner of the first surface 60A of the first circuit board 250. No position sensor may be disposed on a fourth corner of the first surface 60A of the first circuit board 250.

The first corner and the third corner of the first surface 60A of the first circuit board 250 may face each other in a diagonal direction, and the second corner and the fourth corner may face each other in a diagonal direction.

In an example, the first sensor 240a may be disposed on the first surface 60A (or the upper surface) of the first protruding portion 52A of the first circuit board 250, and may overlap the first protruding portion 52A in the optical-axis direction.

The second sensor 240b may be disposed on the first surface 60A (or the upper surface) of the second protruding portion 52B of the first circuit board 250, and may overlap the second protruding portion 52B in the optical-axis direction.

The third sensor 240c may be disposed on the first surface 60A (or the upper surface) of the third protruding portion 52C of the first circuit board 250, and may overlap the third protruding portion 52C in the optical-axis direction.

In an example, the first sensor 240a may not overlap the first coil unit 230-1 in the optical-axis (OA) direction, the second sensor 240b may not overlap the second coil unit 230-2 in the optical-axis (OA) direction, and the third sensor 240c may not overlap the third coil unit 230-3 in the optical-axis (OA) direction. However, the disclosure is not limited thereto. In another embodiment, the two components may at least partially overlap each other in the optical-axis direction.

The first sensor 240a may overlap the first magnet 23A in the optical-axis direction, the second sensor 240b may overlap the second magnet 23B in the optical-axis direction, and the third sensor 240c may overlap the third magnet 23C in the optical-axis direction.

The second position sensor 240 may include three sensors. However, in another embodiment, the second position sensor 240 may include two sensors. For example, in another embodiment, one of the first sensor 240a and the third sensor 240c may be omitted.

The image sensor unit 350 may include at least one of a motion sensor 820, a controller 830, a memory 512, or capacitors 81A and 81B.

The motion sensor 820, the controller 830, the memory 512, and the capacitors 81A and 81B may be disposed or mounted on one of the second circuit board 800 and the first circuit board 250.

In an example, the motion sensor 820, the memory 512, and the capacitor 81A may be disposed on the second surface 44B of the second circuit board 800.

The controller 830 and the capacitor 81B may be disposed on the first surface 60A of the first circuit board 250. In an example, the controller 830 may be disposed in the first area S1 of the first circuit board 250 (refer to FIG. 12A). The first area S1 may be an area located between the image sensor 810 and the first side surface or the first side of the first circuit board 250.

Wires or data lines for transmitting data of the image sensor 810 to the second circuit board 800 may be formed in the second area S2 of the first circuit board 250. The first area S1 may be an area located opposite the second area S2 with respect to the image sensor 810. The second area S2 may be an area located adjacent to the third region 803 of the second circuit board 800.

When a sensor signal output from the image sensor 810 is transmitted to the second circuit board 800, the sensor signal may be sensitively affected by noise generated in the wires or the data lines, and the operation and the performance of the image sensor 810 may be deteriorated due to the noise.

When the controller 830 is disposed in the second area S2 of the first circuit board 250, the sensor signal that is transmitted from the image sensor 810 to the second circuit board 800 through wires or data lines connected to the controller 830 may be affected by noise caused by the wires or the data lines, and thus distortion of the sensor signal may occur, which may cause deterioration in the operation and performance of the image sensor 810.

In another embodiment, the controller 830 or 830-1 may be disposed on the second circuit board 800. The controller 830 or 830-1 needs to be located far away from the image sensor 810 because the controller 830 or 830-1 is likely to malfunction or fail to operate due to heat generated from the image sensor 810.

In an example, the motion sensor 820 disposed on the second circuit board 800 may be conductively connected to the controller 830 disposed on the first circuit board 250 via the support member 220 and the elastic connection member 280.

The motion sensor 820 outputs information about a rotational angular speed in response to movement of the camera module 10. The motion sensor 820 may be implemented as a 2-axis, 3-axis, or 5-axis gyro sensor or an angular speed sensor.

The memory 512 may store first code values corresponding to displacement of the bobbin 110 in the optical-axis direction in order to perform AF feedback. In addition, the memory 512 may store second code values corresponding to displacement of the OIS moving unit in a direction perpendicular to the optical axis in order to perform OIS feedback. In addition, the memory 512 may store an algorithm or a program for operation of the controller 830. In another embodiment, the first code values and the second code values may be stored in a memory unit 760 of the optical instrument 200A.

For example, the memory 512 may be a non-volatile memory such as an electrically erasable programmable read-only memory (EEPROM), but the disclosure is not limited thereto.

The controller 830 may be conductively connected to the second position sensor 240.

The controller 830 may include a first controller 830A for individually driving two of the four coil units 230-1 to 230-4 and a second controller 830B for individually driving the remaining two of the four coil units 230-1 to 230-4.

The first controller 830A may be a first driver IC, and the second controller 830B may be a second driver IC. The first driver IC and the second driver IC may be implemented as separate chips.

Figure 30:
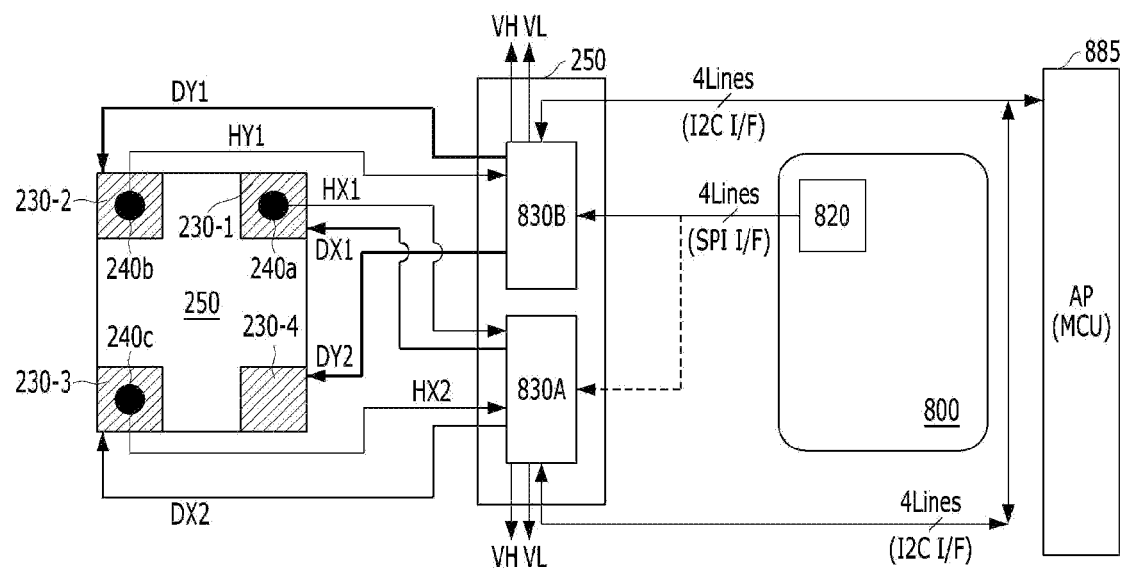
FIG. 30 is a schematic block diagram showing the connection relationship between first to fourth coil units, first to third sensors, a first controller, and a second controller.
Figure 31:
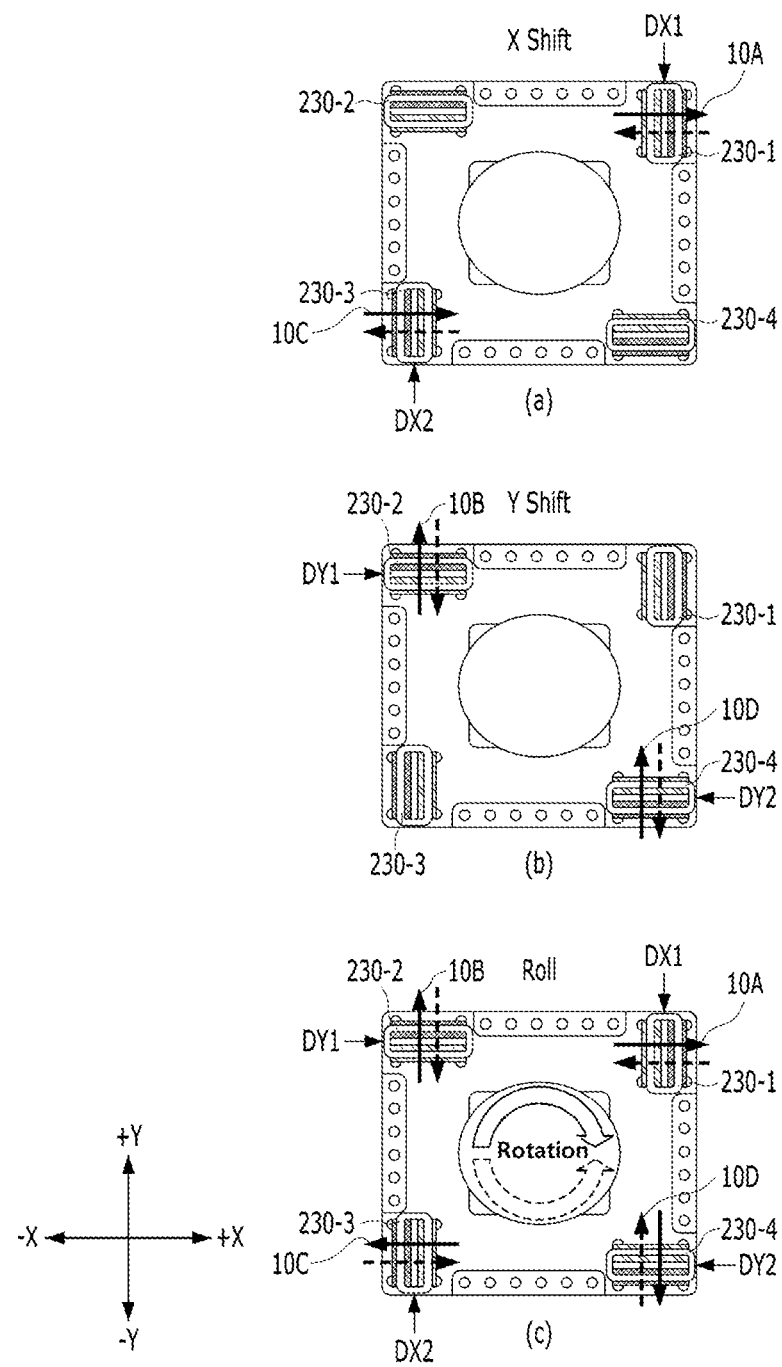
FIG. 31 shows 4-channel OIS operation by the first and second controllers.

FIG. 30 is a schematic block diagram showing the connection relationship between the first to fourth coil units 230-1 to 230-4, the first to third sensors 240a, 240b, and 240c, the first controller 830A, and the second controller 830B, and FIG. 31 shows 4-channel OIS operation by the first and second controllers 830A and 830B.

Referring to FIGS. 30 and 31, when viewed in the first direction or viewed from above, each of the first to fourth coil units 230-1 to 230-4 may include a first straight portion and a second straight portion, which face each other, a first curved portion, which connects one end of the first straight portion to one end of the second straight portion, and a second curved portion, which connects the other end of the first straight portion to the other end of the second straight portion, and may have a bore formed therein. When viewed in the first direction or viewed from above or below, the first coil unit 230-1 and the third coil unit 230-3 may not overlap each other in the second direction (e.g. the x-axis direction) and the third direction (e.g. the y-axis direction).

When viewed in the first direction or viewed from above or below, the first coil unit 230-1 and the third coil unit 230-3 may not overlap each other in the second direction (e.g. the x-axis direction) and the third direction (e.g. the y-axis direction).

In addition, when viewed in the first direction or viewed from above or below, the first coil unit 230-1 and the third coil unit 230-3 may overlap each other in a first diagonal direction.

In addition, when viewed in the first direction or viewed from above or below, the second coil unit 230-2 and the fourth coil unit 230-4 may not overlap each other in the second direction (e.g. the x-axis direction) and the third direction.

In addition, when viewed in the first direction or viewed from above or below, the second coil unit 230-2 and the fourth coil unit 230-4 may overlap each other in a second diagonal direction, which is perpendicular to the first diagonal direction.

The first controller 830A may be conductively connected to any two coil units among the first to fourth coil units 230-1 to 230-4, and may supply or apply a driving signal to each of the two coil units among the first to fourth coil units 230-1 to 230-4.

The second controller 830B may be conductively connected to the remaining two coil units among the first to fourth coil units 230-1 to 230-4, and may supply a driving signal to each of the remaining two coil units among the first to fourth coil units 230-1 to 230-4.

In an example, the first controller 830A may be conductively connected to the first coil unit 230-1, and may supply or apply a first driving signal DX1 to the first coil unit 230-1.

In addition, in an example, the first controller 830A may be conductively connected to the third coil unit 230-3, and may supply or apply a second driving signal DX2 to the third coil unit 230-3.

In an example, the second controller 830B may be conductively connected to the second coil unit 230-2, and may supply or apply a third driving signal DY1 to the second coil unit 230-2.

In addition, in an example, the second controller 830B may be conductively connected to the fourth coil unit 230-4, and may supply or apply a fourth driving signal DY2 to the fourth coil unit 230-4.

In an example, the first to fourth driving signals DX1, DX2, DY1, and DY2 may be individual or independent signals, and may be independently controlled. Each of the first to fourth driving signals DX1, DX2, DY1, and DY2 may be of a current type or a voltage type. In an example, the number of channels may be the number of OIS coil units, which are independently controlled for OIS operation, and the operation shown in FIG. 30, in which the four coil units 230-1 to 230-4 are independently and individually controlled, may be referred to as 4-channel OIS operation.

Referring to FIG. 31(a), in order to move the OIS moving unit in the x-axis direction, the first controller 830A may apply the first driving signal DX1 to the first coil unit 230-1 and may apply the second driving signal DX2 to the third coil unit 230-3. In this case, no driving signal may be applied to the second coil unit 230-2 or the fourth coil unit 230-4. Alternatively, in another embodiment, a driving signal may be supplied to each of the first to fourth coil units 230-1 to 230-4, and the first and second driving signals supplied to the first and third coil units 230-1 and 230-3 may be controlled to move the OIS moving unit in the x-axis direction.

The OIS moving unit may be moved or shifted in the x-axis direction (e.g. the positive (+) x-axis direction or the negative (−) x-axis direction) by first electromagnetic force 10A resulting from interaction between the first coil unit 230-1 and the first magnet 23A and third electromagnetic force 10C resulting from interaction between the third coil unit 230-3 and the third magnet 23C.

The first controller 830A may control the first and second driving signals DX1 and DX2 such that the direction of the first electromagnetic force resulting from interaction between the first coil unit 230-1 and the first magnet 23A and the direction of the third electromagnetic force resulting from interaction between the third coil unit 230-3 and the third magnet 23C are the same direction, e.g. the x-axis direction (e.g. the positive (+) X-axis direction or the negative (−) X-axis direction). Accordingly, the OIS moving unit may be moved or shifted in the x-axis direction (e.g. the positive (+) x-axis direction or the negative (−) x-axis direction).

In addition, in an example, in order to move the OIS moving unit in the x-axis direction, the first controller 830A may drive the first and third coil units 230-1 and 230-3 such that the direction of current of the first driving signal DX1 applied to the first coil unit 230-1 is the same as the direction of current of the second driving signal DX2 applied to the third coil unit 230-3.

In addition, referring to FIG. 31(b), in order to move the OIS moving unit in the y-axis direction, the second controller 830B may apply the third driving signal DY1 to the second coil unit 230-2 and may apply the fourth driving signal DY2 to the fourth coil unit 230-4. In this case, no driving signal may be applied to the first coil unit 230-1 or the third coil unit 230-3. Alternatively, in another embodiment, a driving signal may be supplied to each of the first to fourth coil units 230-1 to 230-4, and the third and fourth driving signals supplied to the second and fourth coil units 230-2 and 230-4 may be controlled to move the OIS moving unit in the y-axis direction.

The OIS moving unit may be moved or shifted in the y-axis direction (e.g. the positive (+) y-axis direction or the negative (−) y-axis direction) by second electromagnetic force resulting from interaction between the second coil unit 230-2 and the second magnet 23B and fourth electromagnetic force resulting from interaction between the fourth coil unit 230-4 and the fourth magnet 23D.

The second controller 830B may control the third and fourth driving signals DY1 and DY2 such that the direction of the second electromagnetic force resulting from interaction between the second coil unit 230-2 and the second magnet 23B and the direction of the fourth electromagnetic force resulting from interaction between the fourth coil unit 230-4 and the fourth magnet 23D are the same direction, e.g. the Y-axis direction (e.g. the positive (+) y-axis direction or the negative (−) y-axis direction). Accordingly, the OIS moving unit may be moved or shifted in the y-axis direction (e.g. the positive (+) y-axis direction or the negative (−) y-axis direction).

In addition, in an example, in order to move the OIS moving unit in the y-axis direction, the second controller 830B may drive the second and fourth coil units 230-2 and 230-4 such that the direction of current of the third driving signal DY1 applied to the second coil unit 230-2 is the same as the direction of current of the fourth driving signal DY2 applied to the fourth coil unit 230-4.

In addition, referring to FIG. 31(c), the OIS moving unit may be rotated, tilted, or rolled about the optical axis or with respect to the optical axis by the first electromagnetic force 10A resulting from interaction between the first coil unit 230-1 and the first magnet unit 23A, the second electromagnetic force 10B resulting from interaction between the second coil unit 230-2 and the second magnet unit 23B, the third electromagnetic force 100 resulting from interaction between the third coil unit 230-3 and the third magnet unit 23C, and the fourth electromagnetic force 10D resulting from interaction between the fourth coil unit 230-4 and the fourth magnet unit 23D.

In order to realize rolling or rotational operation of the OIS moving unit, the first controller 830A may apply the first and second driving signals DX1 and DX2 to the first and third coil units 230-1 and 230-3, and the second controller 830B may apply the third and fourth driving signals DY1 and DY2 to the second and fourth coil units 230-2 and 230-4.

The first controller 830A may control the first and second driving signals DX1 and DX2 such that the direction of the first electromagnetic force 10A and the direction of the third electromagnetic force 10C are opposite each other, and the second controller 830B may control the third and fourth driving signals DY1 and DY2 such that the direction of the second electromagnetic force 10B and the direction of the fourth electromagnetic force 10D are opposite each other. In addition, the first to fourth driving signals DX1, DX2, DY1, and DY2 may be controlled by the first and second controllers 830A and 830B such that the direction of rotation of the OIS moving unit by the first electromagnetic force 10A and the third electromagnetic force 10C and the direction of rotation of the OIS moving unit by the second electromagnetic force 10B and the fourth electromagnetic force 10D are the same as each other. Accordingly, the OIS moving unit may be rotated or rolled about (or with respect to) the optical axis (OA) or the Z-axis.

In addition, in an example, in order to realize rotational operation of the OIS moving unit, the first controller 830A may drive the first and third coil units 230-1 and 230-3 such that the direction of current of the first driving signal DX1 and the direction of current of the second driving signal DX2 are opposite each other, and the second controller 830B may drive the second and fourth coil units 230-2 and 230-4 such that the direction of current of the third driving signal DY1 and the direction of current of the fourth driving signal DY2 are opposite each other. In this case, the direction of current of each of the first to fourth driving signals DX1, DX2, DY1, and DY2 may be controlled by the first and second controllers 830A and 830B such that the direction of rotation of the OIS moving unit by the first driving signal DX1 and the second driving signal DX2 and the direction of rotation of the OIS moving unit by the second driving signal DY1 and the fourth driving signal DY2 are the same as each other.

Figure 32A:
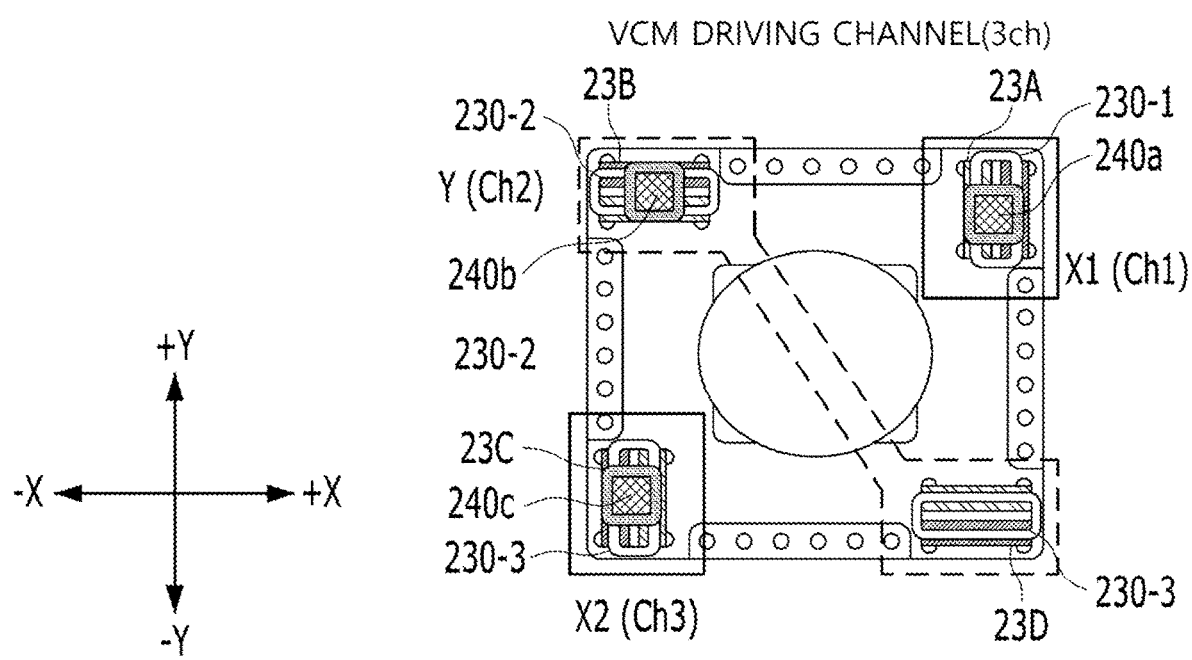
FIG. 32A shows the connection relationship of the OIS coil for 3-channel OIS operation according to another embodiment.
Figure 32B:
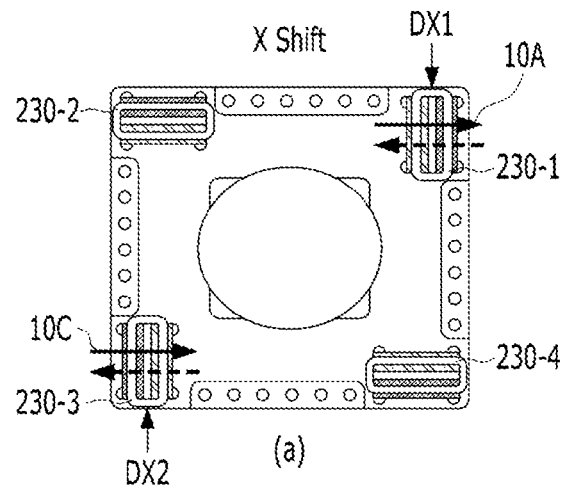
FIG. 32B shows the 3-channel OIS operation shown in FIG. 32A.
Figure 32B:
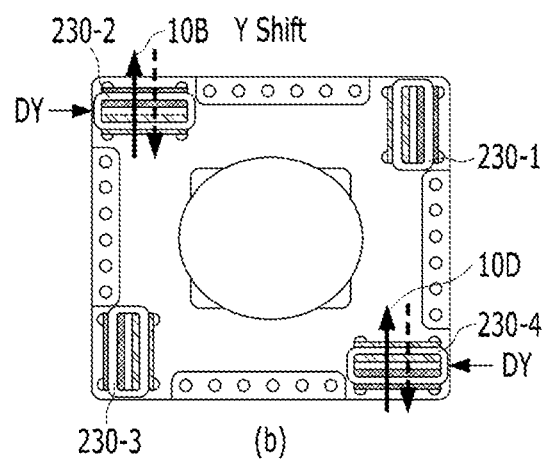
Figure 32B:
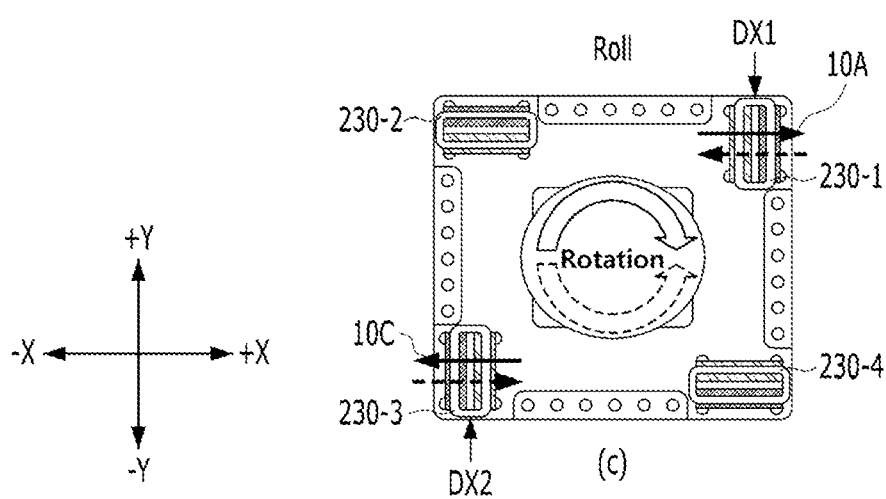

FIG. 32A shows the connection relationship of the OIS coil for 3-channel OIS operation according to another embodiment, and FIG. 32B shows the 3-channel OIS operation shown in FIG. 32A.

The following description will be given with reference to FIGS. 32A and 32B.

An independent driving signal may be supplied to each of the first coil unit 230-1 and the third coil unit 230-3. In addition, the second coil unit 230-2 and the fourth coil unit 230-4 may be connected to each other in series, and the two coil units 230-2 and 230-4 may be driven in response to one driving signal.

Referring to FIG. 32B(a), the first driving signal DX1 may be applied to the first coil unit 230-1, and the second driving signal may be applied to the third coil unit 230-3. Accordingly, as described with reference to FIG. 31(a), the OIS moving unit may be moved or shifted in the x-axis direction by the first electromagnetic force 10A and the third electromagnetic force 10C.

Referring to FIG. 32B(b), one driving signal DY may be applied to the second and fourth coil units 230-2 and 230-4, the direction of the second electromagnetic force 10B and the direction of the fourth electromagnetic force 10D may be the same direction (e.g. the y-axis direction), and the OIS moving unit may be moved or shifted in the y-axis direction.

Referring to FIG. 32B(c), the first driving signal DX1 may be applied to the first coil unit 230-1, and the second driving signal DX2 may be supplied to the third coil unit 230-3.

The direction of the first electromagnetic force 10A and the direction of the third electromagnetic force 10C may be opposite each other due to the first and second driving signals DX1 and DX2, and the OIS moving unit may be rotated or rolled about (or with respect to) the optical axis OA or the z-axis.

In order to realize rolling, the second coil unit and the fourth coil unit need to be independently and individually driven such that the direction of the second electromagnetic force 10B and the direction of the fourth electromagnetic force 10D are opposite each other. However, unlike what is shown in FIG. 31C, in the embodiment in FIGS. 31A and 32B, since the second and fourth coil units 230-2 and 230-4 are connected to each other in series, a driving signal for rolling is not supplied thereto.

The intensity of electromagnetic force for rolling in FIG. 32B(c) may be less than the intensity of electromagnetic force for rolling in FIG. 31. Therefore, the OIS correction angle resulting from rolling operation in the embodiment in FIG. 31 may be larger than the OIS correction angle resulting from rolling operation in FIG. 32B(c). For example, the OIS correction angle resulting from rolling operation in the embodiment in FIG. 31 may be equal to or greater than two times the OIS correction angle resulting from rolling operation in FIG. 32B(c). That is, the embodiment may increase the OIS correction angle resulting from rolling operation.

In addition, in an example, in the embodiment in FIGS. 32A and 32B, three channels may be driven by one driver IC. On the other hand, in the embodiment in FIG. 31, each of the two driver ICs 830A and 830B may drive two channels.

When performing rolling operation, the embodiment in FIGS. 32A and 32B needs to increase the amount of current of the driving signal applied to the first and third coil units 230-1 and 230-3 in order to obtain the same correction angle or the same rotational force as that in the embodiment in FIG. 31, and thus the amount of power consumed may increase. That is, the embodiment may reduce power consumption compared to the comparative example.

Figure 32C:
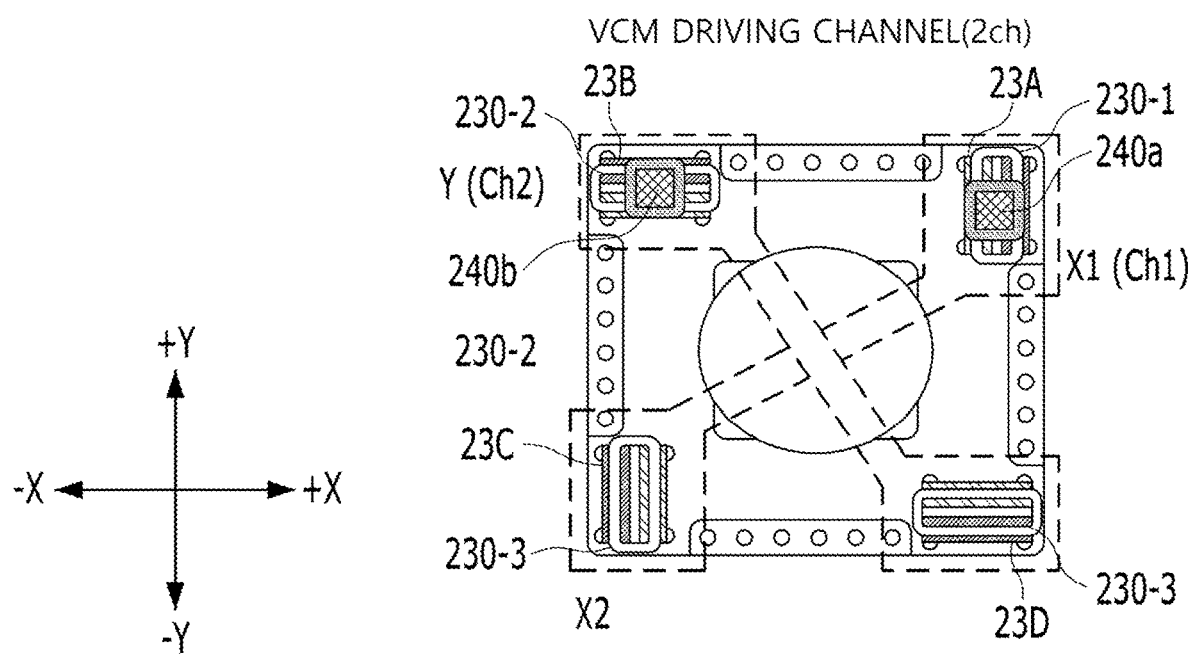
FIG. 32C shows an embodiment of 2-channel operation.

FIG. 32C shows an embodiment of 2-channel OIS operation.

Referring to FIG. 32C, the embodiment of 2-channel OIS operation may be a modified example of FIG. 32A. In an example, the second coil unit 230-2 and the fourth coil unit 230-4 may be connected to each other in series, and the first driving signal may be applied to both ends of each of the second and fourth coil units 230-2 and 230-4 connected to each other in series. The OIS moving unit may be moved or shifted in the y-axis direction by the second electromagnetic force and the fourth electromagnetic force in FIG. 32B(b) generated in response to the first driving signal.

In addition, in the embodiment of 2-channel OIS operation, the first coil unit 230-1 and the third coil unit 230-3 may be connected to each other in series, and the second driving signal, which is independent of the first driving signal, may be applied to both ends of each of the first and third coil units 230-1 and 230-3 connected to each other in series. The OIS moving unit may be moved or shifted in the x-axis direction by the first electromagnetic force and the third electromagnetic force in FIG. 32B(a) generated in response to the second driving signal.

In addition, in the embodiment of 2-channel OIS operation, the third sensor 240c may be omitted. In an example, the controller 830, 830-1, or 885 may detect the movement amount and/or displacement of the OIS moving unit in the x-axis direction using the first sensing voltage of the first sensor 240a. In addition, in an example, the controller 830, 830-1, or 885 may detect the movement amount and/or displacement of the OIS moving unit in the y-axis direction using the second sensing voltage of the second sensor 240b.

Referring to FIG. 30, the first controller 830A may be conductively connected to two sensors (e.g. 240a and 240c) among the first to third sensors 240a, 240b, and 240c. The second controller 830B may be conductively connected to the remaining one sensor (e.g. 240b) among the first to third sensors 240a, 240b, and 240c. For example, each of the first to third sensors 240a, 240b, and 240c in FIG. 30 may be a Hall sensor.

In an example, sensors corresponding to coil units to which the first controller 830A supplies driving signals may be conductively connected to the first controller, and sensors corresponding to coil units to which the second controller 830B supplies driving signals may be conductively connected to the second controller.

In an example, the first controller 830A may supply or apply a driving signal (or power, VH, or VL) to each of the first sensor 240a and the third sensor 240c. For example, the driving signal may be a driving current or a driving voltage. For example, the driving voltage may include a first voltage VL and a second voltage VH higher than the first voltage VL.

In an example, the first controller 830A may receive a first output signal HX1 transmitted or output from the first sensor 240a.

In addition, in an example, the second controller 830B may supply or apply a driving signal (or power, VH, or VL) to the second sensor 240b.

In addition, in an example, the second controller 830B may receive a second output signal HY1 transmitted or output from the second sensor 240b.

In an example, the first controller 830A may receive a third output signal HX2 transmitted or output from the third sensor 240c.

The first controller 830A and the second controller 830B may transmit and receive data to and from an external device 885 (or an external element). In this case, the external device 885 (or the external element) may be a device or an element that is not included in the camera module 10 according to the embodiment. For example, the external device 885 (or the external element) may be a controller 780 of the optical instrument 200A or another access point. For example, the external device 885 may be a microcontroller unit (MCU) or an application processor.

For example, the first and second controllers 830A and 830B may transmit and receive data to and from the external device 885 using data communication using a protocol, e.g. inter-integrated circuit (I2C) communication or serial peripheral interface (SPI) communication.

The motion sensor 820 may be conductively connected to at least one of the first controller 830A or the second controller 830B. For example, the motion sensor 820 may transmit position information GI to at least one of the first controller 830A or the second controller 830B using data communication using a protocol (e.g. SPI communication).

Upon receiving the position information GI, the first controller 830A and/or the second controller 830B may transmit data related to the position information GI to the external device 885 using I2C communication or SPI communication.

Figure 33:
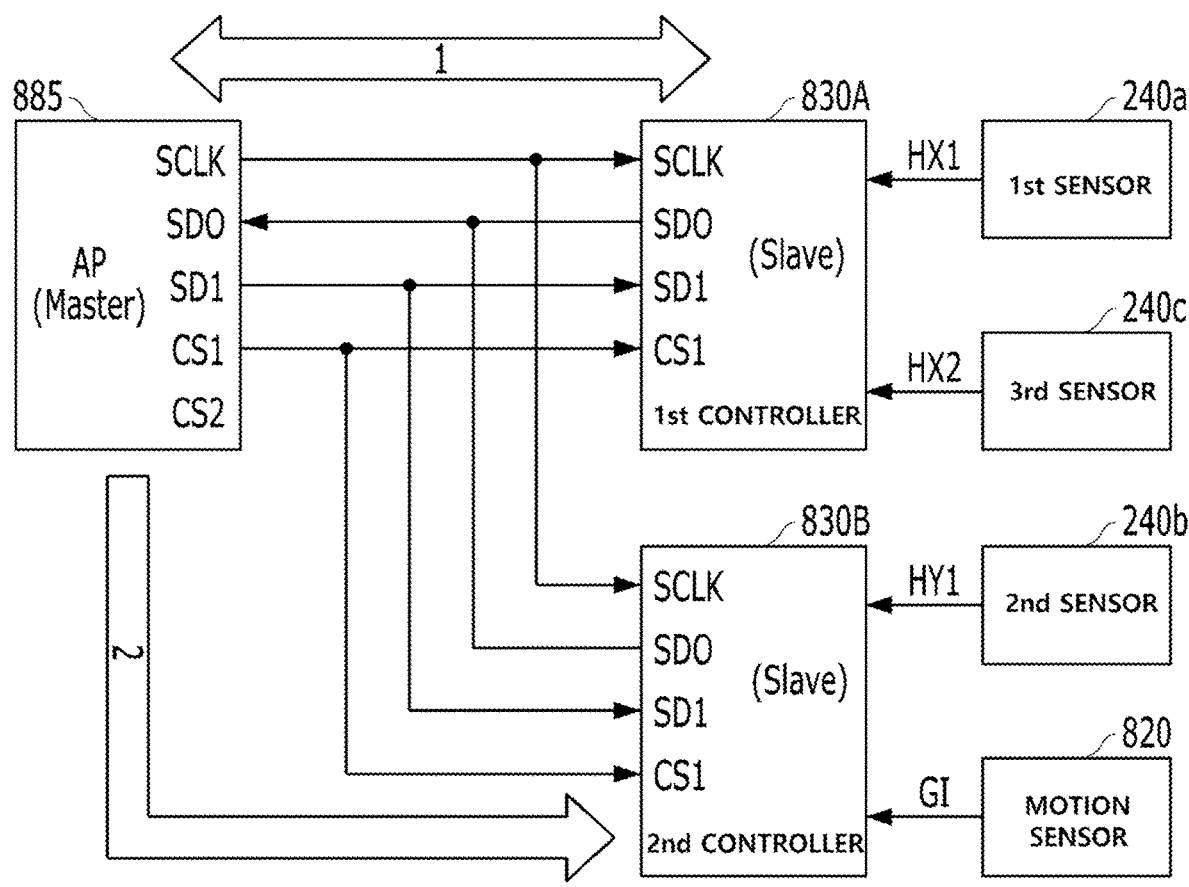
FIG. 33 shows an embodiment of data communication between the first and second controllers and an external device.

FIG. 33 shows an embodiment of data communication between the first and second controllers 830A and 830B and the external device 885. In FIG. 33, SPI communication may be used.

Referring to FIG. 33, the first controller 830A may receive the output HX1 of the first sensor 240a and the output HX2 of the third sensor 240c, and the second controller 830B may receive the output HY1 of the second sensor 240c.

For example, the first controller 830A and the second controller 830B may perform data communication with the external device 885 using SPI communication, and may transmit data related to the output HX1 of the first sensor 240a, the output HY1 of the second sensor 240b, and the output HX2 of the third sensor 240c to the external device 885.

For example, the external device 885 may be a master, and each of the first and second controllers 830A and 830B may be a slave. "SCLK" may be a clock signal for SPI communication, "SD0" may represent master-in slave-out (MISO), and "SD1" may represent master-out slave-in (MOSI). "CS1" may be a signal for slave selection.

The external device 885 may optionally select any one of the first controller 830A and the second controller 830B in response to CS1.

In an example, when CS1 has a first level, the external device 885 may select the first controller 830A from among the first controller 830A and the second controller 830B, and may perform data communication with the selected first controller 830A.

In addition, in an example, when CS1 has a second level, the external device 885 may select the second controller 830B from among the first controller 830A and the second controller 830B, and may perform data communication with the selected second controller 830B. The first level and the second level may be different from each other. For example, the first level may be greater or less than the second level.

One slave selection signal CS1 may be used, but, in another embodiment, in order to select a slave, a first selection signal CS1 may be used between the external device 885 and the first controller 830A, and a second selection signal CS2 may be used between the external device 885 and the second controller 830B.

In an example, the motion sensor 820 may transmit the position information GI to the second controller 830B using SPI communication, and the second controller 830B may transmit the position information GI to the external device 885 using SPI communication.

Figure 34A:
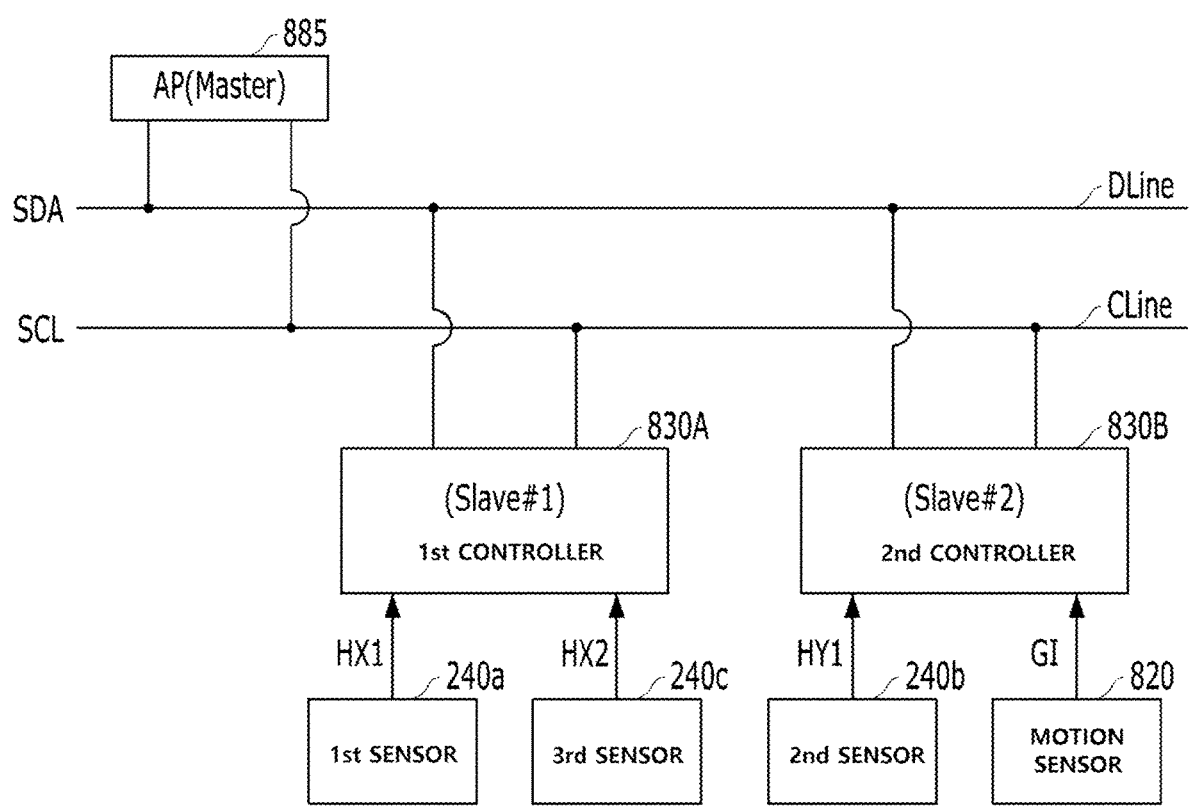
FIG. 34A shows another embodiment of data communication between the first and second controllers and the external device.

FIG. 34A shows another embodiment of data communication between the first and second controllers 830A and 830B and the external device 885. In FIG. 34A, inter-integrated circuit (I2C) communication may be used, which is referred to as a two-wire interface (TWI). "SCL" represents a clock signal for synchronization of communication, and "SDA" represents serial data.

Referring to FIG. 34A, the external device 885 may be a master, and each of the first and second controllers 830A and 830B may be a slave. The master 885 and the slaves 830A and 830B may be connected to a clock line CLine and a data line DLine, and may share the clock line CLine and the data line DLine.

The external device 885 may output a clock signal SCL for synchronization to the clock line CLine, and each of the first and second controllers 830A and 830B may be synchronized with the clock signal SCL, and may output or receive data through the data line DLine.

The slaves may have mutually different addresses for identification, and the master may designate the address of each of the slaves to identify the slave, and may transmit and receive data to and from the identified slave. The address may be included in the data SDA.

In an example, the external device 885 may designate the address of the first controller 830A to receive the output HX1 of the first sensor 240a and the output HX2 of the third sensor 240c from the first controller 830A through the data line DLine.

In addition, in an example, the external device 885 may designate the address of the second controller 830B to receive the output HY1 of the second sensor 240b and the output GI of the motion sensor 820 from the second controller 830B through the data line DLine.

Figure 34B:
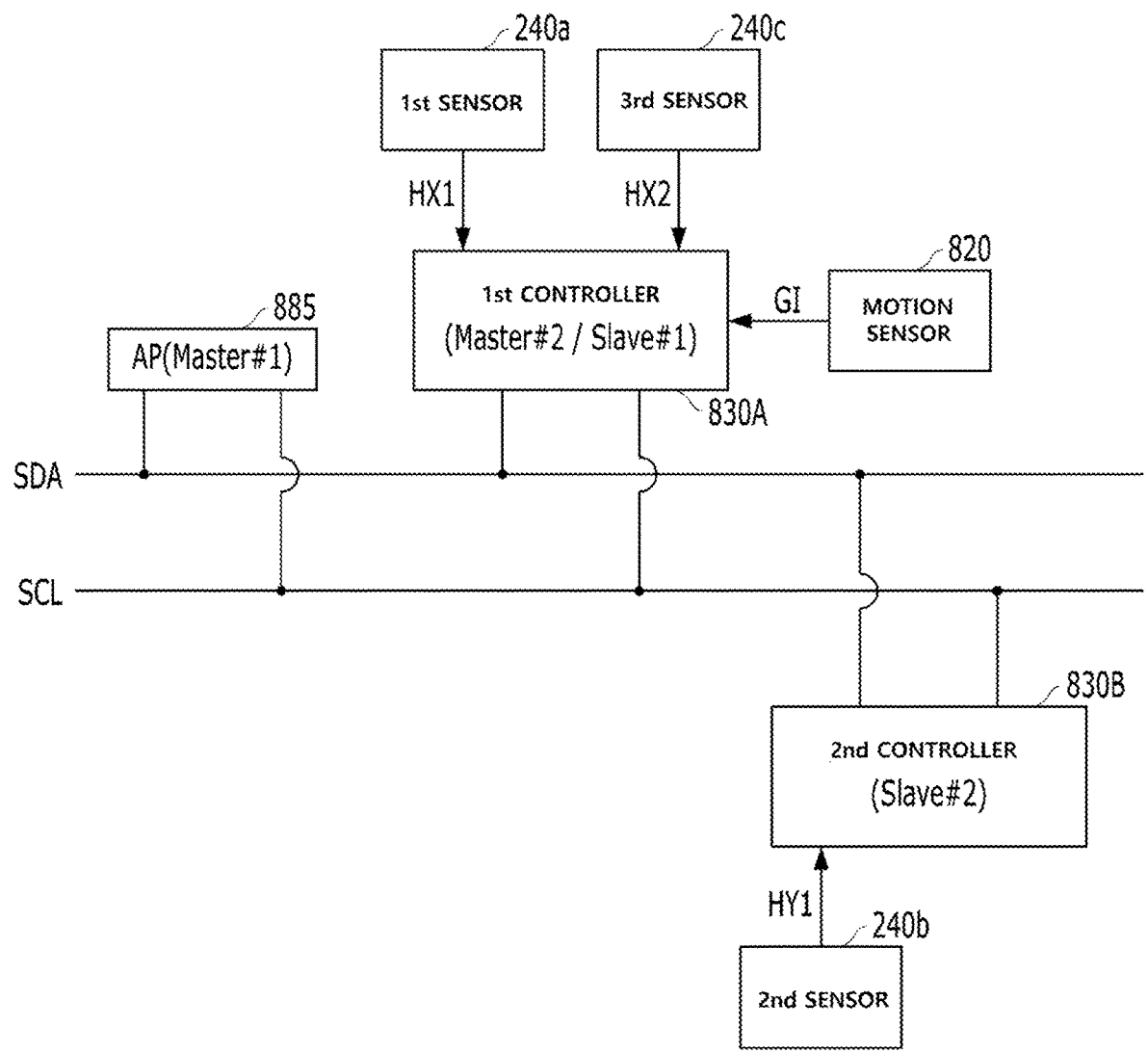
FIG. 34B shows still another embodiment of data communication between the first and second controllers and the external device in FIG. 34A.

FIG. 34B shows still another embodiment of data communication between the first and second controllers 830A and 830B and the external device 885 in FIG. 34A.

FIG. 34B is a modified example of FIG. 34A. The external device 885 may be a master, and the first controller 830A may be a slave in the relationship with the external device 885, and may be a master in the relationship with the second controller 830B. The second controller 830B may be a slave.

Referring to FIG. 34B, data communication between the external device 885 and the first controller 830A may be the same as data communication between the master and the slave described in FIG. 34A.

The external device 885 may return ownership of the data line Dline for data communication with the first controller 830A, and the first controller 830A may acquire the ownership for using the data line Dline. The first controller 830A having the ownership may designate the address of the second controller 830B to receive the output HY1 of the second sensor 240b and the output GI of the motion sensor 820 from the second controller 830B.

In addition, after the first controller 830A returns the ownership for using the data line Dline, the external device 885 may acquire the ownership for using the data line Dline, and may receive the output HY1 of the second sensor 240b and the output GI of the motion sensor 820 from the first controller 830A.

In addition, the controller 780 of the optical instrument 200A may output a control signal for controlling the driving signal supplied to the second coil 230 using the output signals HX1, HX2, and HY1 transmitted from the second position sensor 240 and the second code values stored in the memory 512, and may transmit the control signal to the first and second controllers of the camera module 10, whereby feedback OIS operation may be performed. In addition, in order to perform feedback OIS operation, the optical instrument 200A may use the position information GI received from the motion sensor 820.

In FIG. 34B, the motion sensor 820 transmits the position information GI to the first controller 830A. However, in another embodiment, the motion sensor 820 may transmit the position information GI to the second controller 830B. In this case, the second controller 830B may transmit the position information GI to the first controller 830A.

In still another embodiment, in the relationship between the first controller 830A and the second controller 830B, the second controller 830B may be a master, and the first controller 830A may be a slave.

Figure 35A:
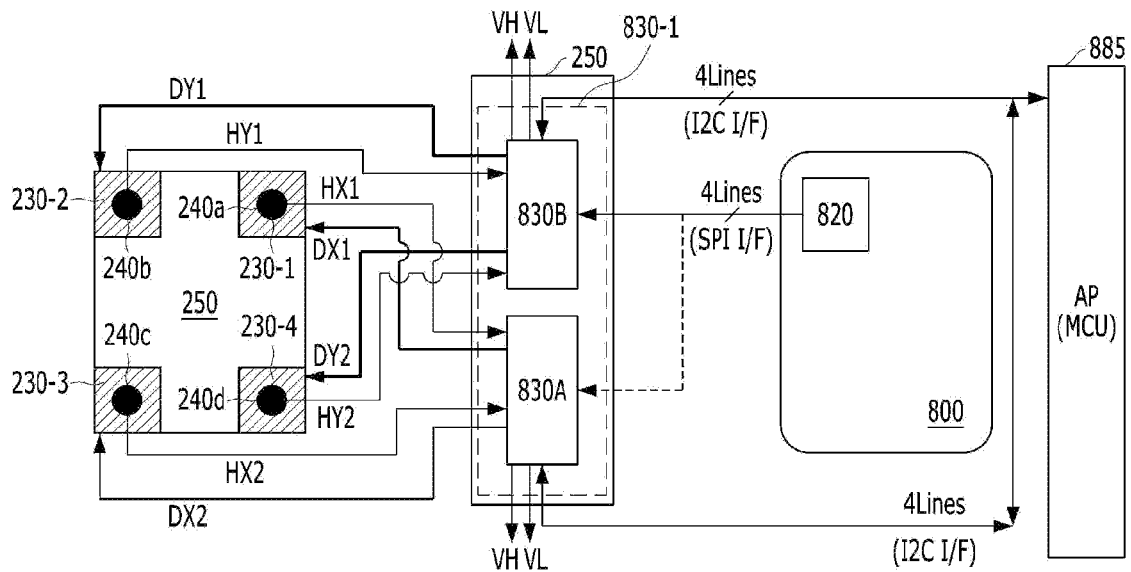
FIG. 35A shows a second position sensor and a controller according to another embodiment.

FIG. 35A shows a second position sensor and a controller 830-1 according to another embodiment.

Referring to FIG. 35A, the second position sensor in FIG. 35A may include the first to third sensors 240a, 240b, and 240c in FIG. 30 and a fourth sensor 240d.

The fourth sensor 240d may correspond to the fourth coil unit 230-4, and may output an output HY2 corresponding to a result of detection of the intensity of the magnetic field of the fourth magnet 23D.

The second controller 830B may supply a driving signal to the fourth sensor 240d, and the output HY2 of the fourth sensor 240d may be received by the second controller 830B. As described with reference to FIGS. 33, 34A, and 34B, the second controller 830B may transmit the output HY2 of the fourth sensor 240d to the external device 885.

The first controller 830A and the second controller 830B shown in each of FIGS. 30 and 35A are implemented as driver ICs implemented as separate chips. However, in another embodiment, the first controller 830A and the second controller 830B shown in each of FIGS. 30 and 35 may be implemented as a driver IC implemented as a single chip.

Figure 35B:
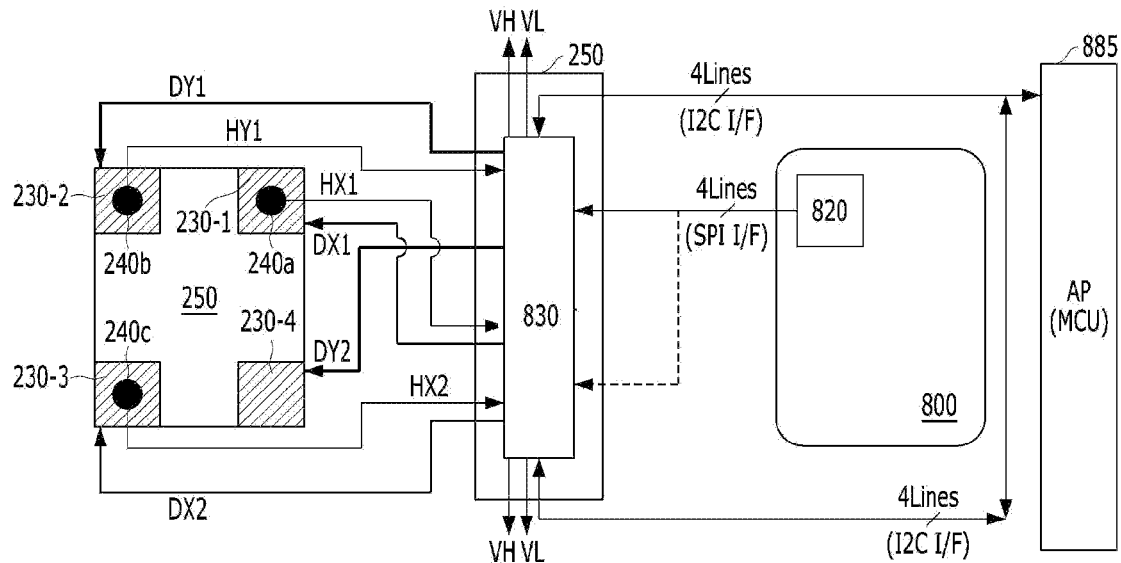
FIG. 35B shows a modified example of FIG. 30.

FIG. 35B shows a modified example of FIG. 30.

Referring to FIG. 35B, the first controller 830A and the second controller 830B in FIG. 30 may be implemented as a controller 830, which is a single chip. The description of the first controller 830A and the second controller 830B in FIG. 30 may also be applied to the controller 830.

Referring to FIG. 14, the first circuit board 250 may include a terminal 262 conductively connected to the elastic connection member 280. The second terminal 262 may alternatively be referred to as a "second terminal portion" or a "second terminal unit."

In an example, the terminal 262 of the first circuit board 250 may be coupled to the elastic connection member 280 by means of a solder or a conductive adhesive member. In an example, the terminal 262 may be provided in plural.

In an example, the second terminal 262 of the first circuit board 250 may be disposed on the second surface 60B (e.g. the lower surface) of the first circuit board 250, and may correspond to or face the connection spring 281 of the elastic connection member 280 in the optical-axis direction.

The second terminal 262 of the first circuit board 250 may overlap at least a portion of the corresponding connection spring 281 in the optical-axis direction. The first circuit board 250 may be a printed circuit board or an FPCB, but the disclosure is not limited thereto.

The first circuit board 250 may be disposed between the holder 270 and the elastic connection member 280.

The elastic connection member 280 is coupled to the holder 270. The elastic connection member 280 enables the OIS moving unit not only to move but also to transmit an electrical signal. That is, the elastic connection member 280 may conductively connect the support member 220 to the terminal 262 of the first circuit board 250.

In an example, the elastic connection member 280 may be disposed under the holder 270.

In an example, the elastic connection member 280 may be coupled to the lower surface 42B of the holder 270 by means of an adhesive member or the like. In an example, the elastic connection member 280 may be coupled to the first surface 36A of the lower surface 42B of the holder 270.

The elastic connection member 280 may conductively connect the support member 220 to the first circuit board 250. The elastic connection member 280 may include an elastically deformable portion, which is formed to be elastically deformable, and the elastically deformable portion of the elastic connection member 280 may be coupled to the support member 220.

The elastic connection member 280 may include a connection spring 281 corresponding to the support member 220.

In an example, the elastic connection member 280 may include a plurality of connection springs 281. The plurality of connection springs 281 may correspond to the support members 220.

The plurality of connection springs 281 may be disposed so as to be conductively separated from each other or to be spaced apart from each other.

The connection spring 281 may be made of a conductive material, for example metal such as copper or a copper alloy.

For example, the connection spring 281 may be formed of at least one metal material selected from gold (Au), silver (Ag), platinum (Pt), titanium (Ti), tin (Sn), copper (Cu), and zinc (Zn). In addition, the elastic connection member 280 may be formed of a paste or a solder paste including at least one metal material selected from gold (Au), silver (Ag), platinum (Pt), titanium (Ti), tin (Sn), copper (Cu), and zinc (Zn), which have excellent bonding properties.

For example, the connection spring 281 may be formed of a metal material having tensile strength of 1000 MPa or greater. For example, the connection spring 281 may be formed of a binary or ternary alloy containing copper.

Referring to FIGS. 15 to 18, the connection spring 281 may include a first coupling portion 31 coupled to the terminal 262 of the first circuit board 250, a second coupling portion 32 coupled to the support member 220, and a connection portion 33 connecting the first coupling portion 31 to the second coupling portion 32.

The first coupling portion 31 of the connection spring 281 may be supported by the holder 270. In an example, the first coupling portion 31 may be disposed on the first surface 36A of the lower surface 42B of the holder 270, and may be supported by the lower surface 42B of the holder 270.

In an example, the first coupling portion 31 may be disposed on the first surface 36A of the lower surface 42B of the holder 270, which is adjacent to the at least one groove 272 in the holder 270.

In an example, the first coupling portion 31 may include a first portion 31a, which is supported by the holder 270 and is connected to the connection portion 33, and a second portion 31b, which is connected to the first portion 31a and is coupled to the terminal 262 of the first circuit board 250.

In an example, the first portion 31a of the first coupling portion 31 may overlap the first surface 36A of the lower surface 42B of the holder 270 in the optical-axis direction, and may be coupled to the first surface 36A.

The second portion 31b of the first coupling portion 31 may not overlap the lower surface 42B of the holder 270 in the optical-axis direction. At least part of the second portion 31b of the first coupling portion 31 may overlap the terminal 262 of the first circuit board 250 in the optical-axis direction.

In an example, the second portion 31b may protrude from the inner surface of the holder 270 toward the terminal 262 of the first circuit board 250.

In addition, in an example, the second portion 31b of the first coupling portion 31 may be located opposite a portion 19A at which the first coupling portion 31 and the connection portion 33 meet each other.

The first portion 31a of the first coupling portion 31 may have a larger width than the other portions 32b and 33 in order to increase bonding force between the insulation member 285 and the holder 270.

In an example, the width W1 of the first portion 31a of the first coupling portion 31 may be larger than the width W2 of the second portion 31b. Alternatively, the area of the first portion 31a of the first coupling portion 31 may be larger than the area of the second portion 31b. The reason why the width W1 (or the area) of the first portion 31a is formed to be relatively large is to increase the area of the first portion 31a, which is supported by the holder 270, thereby ensuring stable support of the first portion 31a by the holder 270.

Here, the widths W1 and W2 may be lengths in a direction perpendicular to a direction from the first coupling portion 31 toward the terminal 262 of the first circuit board 250.

In another embodiment, the width of the first portion 31a may be equal to or smaller than that of the second portion 31b.

The second coupling portion 32 may be coupled to one end (e.g. the lower end) of the support member 220 by means of a solder 902 or a conductive adhesive member.

In an example, the second coupling portion 32 may be disposed so as to overlap the hole 270A in the holder 270 in the optical-axis direction.

The second coupling portion 32 may have a hole 32A formed therein to allow the support member 220 to extend or pass therethrough.

One end of the support member 220, which extends or passes through the hole 32A in the second coupling portion 32, may be directly coupled to the second coupling portion 32 by means of a conductive adhesive member or a solder 902, and the second coupling portion 32 and the support member 220 may be conductively connected to each other.

In an example, the second coupling portion 32 may include the hole 32A and a region around the hole 32A, which is a region on which the solder 902 is disposed for coupling to the support member 220. Although the second coupling portion 32 is illustrated in FIG. 16 as having a circular shape, the disclosure is not limited thereto. In another embodiment, the second coupling portion 32 may have a polygonal shape (or a quadrangular shape) or an elliptical shape.

In an example, the diameter K of the second coupling portion 32 may be less than the width W1 of the first portion 31a of the first coupling portion 31. In another embodiment, the diameter K of the second coupling portion 32 may be equal to or greater than the width W1 of the first portion 31a of the first coupling portion 31.

The connection portion 33 may connect the first portion 31a of the first coupling portion 31 and the second coupling portion 32 to each other, and may include at least one straight portion and at least one curved portion.

In an example, the curved portion may have a shape that extends from the straight portion in a direction perpendicular to the optical axis so as to be bent to the right or the left. In an example, the connection portion 33 may include a spiral shape, but the disclosure is not limited thereto.

In an example, the connection portion 33 may include a bent portion that circles in the clockwise or counterclockwise direction. That is, the connection portion 33 may be bent in a direction corresponding to the rotational direction of the image sensor about the z-axis. Accordingly, the connection portion 33 may minimize damage to the connection spring 281 when the image sensor rotates about the z-axis, thereby preventing the connection spring 281 from cracking and preventing the connection spring 281 from being separated from the insulation member 285.

In an example, the connection portion 33 may include a first straight portion 33-1 coupled to the first coupling portion 31, a first curved portion 34-1 bent and extending from the first straight portion 33-1 in a first lateral direction, a second straight portion 33-2 connected to the first curved portion 34-1, a second curved portion 34-2 bent and extending from the second straight portion 33-2 in a second lateral direction, a third straight portion 33-3 connected to the second curved portion 34-2, a third curved portion 34-3 bent and extending from the third straight portion 33-3 in a third lateral direction, a fourth straight portion 33-4 connected to the third curved portion 34-3, a fourth curved portion 34-4 bent and extending from the fourth straight portion 33-4 in a fourth lateral direction, and a fifth straight portion 33-5 connecting the fourth curved portion 34-4 to the second coupling portion 32. For example, each of the first to fourth lateral directions may be a leftward direction, but the disclosure is not limited thereto. At least one of the first to fourth lateral directions may be a rightward direction.

At least one of the curved portions 34-1 to 34-4 of the connection portion 33 may have a round shape.

Further, the line widths of the straight portions 33-1 to 33-5 may be different from those of the curved portions 34-1 to 34-4. For example, because stress is concentrated on the curved portions, the line widths of the curved portions 34-1 to 34-4 may be larger than those of the straight portions 33-1 to 33-5 in order to prevent the connection portion 33 from being damaged due to stress applied to the connection portion 33.

The portions constituting the connection spring 281 may have mutually different line widths.

The connection portion 33 may have a smaller line width than the first portion 33 of the first coupling portion 31 so as to be elastic.

The width W3 of the connection portion 33 may be less than the width W1 of the first portion 31a of the first coupling portion 31, the width W2 of the second portion 31b, and the diameter K of the second coupling portion 32. Accordingly, the connection spring 281 may elastically support the OIS moving unit, and may facilitate movement of the OIS moving unit in a direction perpendicular to the optical axis.

For example, the connection portion 33 may have a line width of 20 μm to 1000 μm.

For example, when the line width of the connection portion 33 is smaller than 20 μm, the overall rigidity of the connection spring 281 may be reduced, and thus the reliability of the connection spring 281 may be lowered. Further, when the line width of the connection portion 33 is larger than 1000 μm, the elastic force of the connection spring 281 may be reduced, which may increase an operation voltage for driving the second coil 230 for shifting the OIS moving unit and may increase power consumption.

In another embodiment, the width of the connection portion 33 may be equal to or greater than the diameter of the second coupling portion 32.

The thickness t1 of the first coupling portion 31, the thickness t2 of the connection portion 33, and the thickness of the second coupling portion 32 may be equal to each other. In another embodiment, at least one of the thickness t1 of the first coupling portion 31, the thickness t2 of the connection portion 33, or the thickness of the second coupling portion 32 may be different from the others. In an example, the thickness t2 of the connection portion 33 may be smaller than the thickness of the first coupling portion 31 and the thickness of the second coupling portion 32.

The second coupling portion 32 and the connection portion 33 may overlap the groove 272 in the holder 270 in the optical-axis direction. In an example, the second coupling portion 32 and the connection portion 33 may be disposed in the groove 272 in the holder 270. In an example, the second coupling portion 32 and/or the connection portion 33 may be spaced apart from the holder 270.

Referring to FIGS. 15 and 16, the elastic connection member 280 may include a plurality of connection springs, and the plurality of connection springs may be divided into a plurality of groups. For example, the plurality of groups may alternatively be referred to as "a plurality of connection portions," "a plurality of elastic portions," or "a plurality of elastic connection members."

In an example, the elastic connection member 280 may include four groups 1A, 2A, 3A, and 4A corresponding to the four lateral portions (side surfaces) of the first circuit board 250 or the four lateral portions (side surfaces) of the holder 270.

The plurality of groups 1A, 2A, 3A, and 4A may respectively include a plurality of connection springs 1-1 to 1-9, 2-1 to 2-9, 3-1 to 3-9, and 4-1 to 4-9.

In addition, the terminals 262 of the first circuit board 250 may be divided into a plurality of groups corresponding to the groups 1A, 2A, 3A, and 4A of the elastic connection member 280. The plurality of groups of the first circuit board 250 may respectively include a plurality of terminals P1 to P9, S1 to S9, R1 to R9, and Q1 to Q9.

In an example, each of the plurality of terminals P1 to P9, S1 to S9, R1 to R9, and Q1 to Q9 of the first circuit board 250 may be coupled to a corresponding one of the plurality of connection springs 1-1 to 1-9, 2-1 to 2-9, 3-1 to 3-9, and 4-1 to 4-9 by means of a solder.

In an example, the number of connection springs included in one of the plurality of groups 1A, 2A, 3A, and 4A may be equal to the number of connection springs included in the other groups.

Alternatively, in another embodiment, the number of connection springs included in one of two groups located opposite each other may be equal to the number of connection springs included in the other group.

In still another embodiment, the number of connection springs included in one of two neighboring groups of the elastic connection member 280 may be different from the number of connection springs included in the other group. In another embodiment, the number of connection springs included in at least one of the plurality of groups 1A, 2A, 3A, and 4A may be different from the number of connection springs included in the other groups.

In an example, the groups 1A, 2A, 3A, and 4A of the elastic connection member 280 may be disposed so as to be rotationally symmetric to each other by 180 degrees about a center point 403 in order to support the OIS moving unit in a balanced and elastic manner during OIS operation.

In another embodiment, the groups 1A, 2A, 3A, and 4A of the elastic connection member 280 may be disposed so as to be rotationally symmetric to each other by 90 degrees about the center point 403.

In an example, the holder 270 may include four corners 30A to 30D, the first and third groups 1A and 3A may be disposed opposite each other in the transverse direction, and the second and fourth groups 2A and 4A may be disposed opposite each other in the longitudinal direction. The transverse direction and the longitudinal direction may be directions perpendicular to each other.

The first group 1A may be disposed in a first area of the second surface 70B of the holder 270, which is located between the first corner 30A and the second corner 30B of the holder 270, the second group 2A may be disposed in a second area of the second surface 70B of the holder 270, which is located between the second corner 30B and the third corner 30C of the holder 270, the third group 3A may be disposed in a third area of the second surface 70B of the holder 270, which is located between the third corner 30C and the fourth corner 30D of the holder 270, and the fourth group 4A may be disposed in a fourth area of the second surface 70B of the holder 270, which is located between the fourth corner 30D and the first corner 30A of the holder 270.

The first corner 30A and the third corner 30C of the holder 270 may be located opposite each other in a first diagonal direction, and the second corner 30B and the fourth corner 30D of the holder 270 may be located opposite each other in a second diagonal direction. The first diagonal direction and the second diagonal direction may be perpendicular to each other.

The centers of the first and third groups 1A and 3A may be disposed so as to be biased in directions opposite each other with respect to a first center line 401, and the centers of the second and fourth groups 2A and 4A may be disposed so as to be biased in directions opposite each other with respect to a second center line 402.

Here, the center of each group may be a spatial center of the entire length of each group in the direction in which the connection springs included in each group are arranged. Here, the entire length may be a spacing distance between the first connection spring and the last connection spring of each group.

In an example, the first center line 401 may be a straight line that passes through the center point 403 and is parallel to a direction from the first area of the holder 270, in which the first group 1A is disposed, toward the third area of the holder 270, in which the third group is disposed. Alternatively, the first center line 401 may be a straight line that passes through the center point 403 and is parallel to the first outer side surface of the holder 270.

In an example, the second center line 402 may be a straight line that passes through the center point 403 and is parallel to a direction from the second area of the holder 270, in which the second group 2A is disposed, toward the fourth area of the holder 270, in which the fourth group is disposed. Alternatively, the second center line 402 may be a straight line that passes through the center point 403 and is perpendicular to the first outer side surface of the holder 270.

In an example, the center point 403 may be a center of the bore 70 in the holder 270, a center of the first circuit board 250, or a spatial center of the elastic connection member.

In an example, the number of connection springs of the first group 1A (or the third group 3A), which are disposed on one side (e.g. the right side) with respect to the first center line 401 and the number of connection springs of the first group 1A (or the third group 3A), which are disposed on the opposite side (e.g. the left side) with respect to the first center line 401 may be different from each other.

In an example, the number of connection springs of the second group 2A (or the fourth group 4A), which are disposed on one side (e.g. the right side) with respect to the second center line 402 and the number of connection springs of the second group 2A (or the fourth group 4A), which are disposed on the opposite side (e.g. the left side) with respect to the second center line 402 may be different from each other.

Referring to FIG. 16, the elastic connection member 280 may further include an insulation member 285. The insulation member 285 may alternatively be referred to as an "insulation layer." For example, the insulation member 285 may include polyimide.

The insulation member 285 may surround at least a portion of the connection spring 281. In an example, the insulation member 285 may surround at least a portion of the first portion 31a of the connection spring 281. In an example, the upper surface of the first portion 31a of the connection spring 281 may be coupled to the first surface 36A of the lower surface 42B of the holder 270, and the insulation member 285 may cover the lower surface of the first portion 31a of the connection spring 281.

Adhesive members may be interposed or disposed between the insulation member 285 and the connection spring and between the insulation member 285 and dummy members 28-1 to 28-4 in order to bond the components to each other.

In an example, the second portion 31b of the first coupling portion 31, the second coupling portion 32, and the connection portion 33 of the connection spring 281 may be exposed from the insulation member 285.

The insulation member 285 may connect the connection springs 1-1 to 1-9, 2-1 to 2-9, 3-1 to 3-9, and 4-1 to 4-9 of the groups 1A to 4A to each other.

The insulation member 285 may support the connection springs 1-1 to 1-9, 2-1 to 2-9, 3-1 to 3-9, and 4-1 to 4-9 of the elastic connection member 280, and may be coupled or attached to the first surface 36A of the lower surface 42B of the holder 270.

The elastic connection member 280 may further include one or more dummy members 28-1 to 28-4 (or dummy patterns).

In an example, the dummy members 28-1 to 28-4 may be spaced apart from the connection springs 1-1 to 1-9, 2-1 to 2-9, 3-1 to 3-9, and 4-1 to 4-9, and may be disposed on the lower surface 42B of the holder 270.

The insulation member 285 may surround or cover at least a portion of the dummy members 28-1 to 28-4. Accordingly, the shape of the insulation member 285 may be firmly maintained, and bonding force between the insulation member 285 and the holder 270 may be increased.

The dummy members 28-1 to 28-4 may alternatively be referred to as "reinforcing portions" or "reinforcing patterns" because they increase the rigidity of the elastic connection member 280.

Each of the dummy members 28-1 to 28-4 may be coupled to the lower surface 42B of the holder 270 by means of an adhesive, and may have formed therein at least one through-hole 28A or recess in order to increase the force with which the same is coupled to the holder 270.

The dummy members 28-1 to 28-4 are not conductively connected to the connection springs 1-1 to 1-9, 2-1 to 2-9, 3-1 to 3-9, and 4-1 to 4-9. Alternatively, the dummy members 28-1 to 28-4 may not be conductively connected to each other, but the disclosure is not limited thereto. In another embodiment, the dummy members may be connected to each other.

In an example, the insulation member 285 may have a bore or a cavity formed therein. In an example, when viewed from above, the insulation member 285 may have a polygonal shape as a whole, e.g. a quadrangular ring shape, but the disclosure is not limited thereto.

In an example, the elastic connection member 280 may include four dummy members 28-1 to 28-4, but the number of dummy members is not limited thereto, and may be one or more in another embodiment.

In an example, each of the dummy members 28-1 to 28-4 may be disposed between two neighboring groups 1A and 2A, 2A and 3A, 3A and 4A, or 4A and 1A of the elastic connection member 280.

In an example, the elastic connection member 280 may include a dummy member 28-3 disposed on the first corner or the first corner area of the insulation member 285, which is located between the first group 1A and the second group 2A, a dummy member 28-2 disposed on the second corner or the second corner area of the insulation member 285, which is located between the second group 2A and the third group 3A, a dummy member 28-1 disposed on the third corner or the third corner area of the insulation member 285, which is located between the third group 3A and the fourth group 4A, and a dummy member 28-4 disposed on the fourth corner or the fourth corner area of the insulation member 285, which is located between the fourth group 4A and the first group 1A.

Each of the dummy members 28-1 to 28-4 may include an escape portion 27A in order to avoid spatial interference with the protruding portion 275 of the holder 270. The escape portion 27A may be of a recess or hole type, but the disclosure is not limited thereto.

Referring to FIG. 16, in an example, the insulation member 285 may include a body 85A, which is disposed on the first portion 31a of the first coupling portion 31 of each of the connection springs 1-1 to 1-9, 2-1 to 2-9, 3-1 to 3-9, and 4-1 to 4-9, a portion of the lower surface 43B of the holder 270, and a portion of each of the dummy members 28-1 to 28-4, and an extension portion 85B, which extends from the body 85A to another portion of each of the dummy members 28-1 and 28-4.

In an example, the body 85A of the insulation member 285 may be disposed on the first surface 36A of the lower surface 42B of the holder 270, which is adjacent to the bore 70 in the holder 270, and may have a closed-curve-type ring shape. For example, the body 85A may have a quadrangular ring shape, but the disclosure is not limited thereto. In another embodiment, the body may have a circular or polygonal ring shape.

In an example, the body 85A may have formed therein a bore or a cavity corresponding to, overlapping, or aligned with the bore 800A in the second circuit board 800 and the bore in the holder 270 in the optical-axis direction.

The extension portion 85B may have a straight line shape, but the disclosure is not limited thereto. In another embodiment, the extension portion may include at least one of a straight portion or a curved portion. In an example, the extension portion 85B may be provided in plural, and the plurality of extension portions may be spaced apart from each other. In an example, the extension portion 85B may extend from the body 85A toward the outer side surface of the holder 270. In an example, the extension portion 85B may be disposed so as to surround the groove 272 in the holder 270.

The extension portion 85B may function to increase an area of contact with each of the dummy members 28-1 to 28-4, thereby further increasing the rigidity of the elastic connection member 280.

The support member 220 conductively connects the second circuit board 800 to the elastic connection member 280.

The support member 200 may include a plurality of groups corresponding to the groups 1A, 2A, 3A, and 4A of the elastic connection member 280. Each of the plurality of groups of the support member may include a plurality of support members (or wires).

In an example, the support member 200 may include a plurality of support members corresponding to the plurality of connection springs. The support member may alternatively be referred to as a "wire."

One end of the support member 220 may be coupled to the second circuit board 800, and the other end of the support member 220 may be coupled to the second coupling portion 32 of the connection spring 281.

In an example, one end of the support member 220 may extend or pass through the hole 800B in the second circuit board 800, and may be coupled to the first surface 44A (e.g. the upper surface) of the second circuit board 800 by means of a first solder 901. In an example, one end of the support member 220 may be coupled to the terminal 800B of the second circuit board 800 so as to be conductively connected thereto.

The other end of the support member 220 may extend or pass through the hole 32A in the second coupling portion 32 of the connection spring 281, and may be coupled to the lower portion or the lower surface of the second coupling portion 32 by means of a second solder 902.

The support member 220 may extend or pass through the escape region 41 of the housing 450 and the hole 270A in the holder 270, and may avoid spatial interference with the housing 450 and the holder 270.

The support member 220 may be implemented as a conductive and elastically supportable member, e.g. a suspension wire, a leaf spring, or a coil spring.

The image sensor unit 350 may further include a filter 610. In addition, the image sensor unit 350 may further include a filter holder 600, in which the filter 610 is disposed, seated, or accommodated. The filter holder 600 may alternatively be referred to as a "sensor base."

The filter 610 may serve to block introduction of light within a specific frequency band, among the light that has passed through the lens barrel 400, into the image sensor 810.

The filter 610 may be, for example, an infrared cut filter, but the disclosure is not limited thereto. In an example, the filter 610 may be disposed parallel to the xy-plane, which is perpendicular to the optical axis OA.

The filter 610 may be disposed below the lens module 400.

The filter holder 600 may be disposed below the AF moving unit 100. In an example, the filter holder 600 may be disposed on the first circuit board 250.

The filter holder 600 may be coupled to one region of the first surface 60A of the first circuit board 250 around the image sensor 810, and may be exposed through the bore 800A in the second circuit board 800 and the bore 70 in the holder 270. In an example, the filter holder 600 may be visible through the bore 800A in the second circuit board 800 and the bore 70 in the holder 270.

In an example, the filter holder 600 may be coupled to one region of the first surface 60A (e.g. the upper surface) around the seating area 260A of the first circuit board 250. Although the seating area 260A is illustrated in FIG. 12A as being coplanar with the first surface 60A of the first circuit board 250, the disclosure is not limited thereto. In another embodiment, the seating area 260A may be a recess or a protruding portion.

In another embodiment, the filter holder may be coupled to the holder 270, or may be coupled to the AF moving unit 100.

The bore 70 in the holder 270 may expose the filter holder 600 disposed on the first circuit board 250 and the filter 610 disposed in the filter holder 600.

The filter holder 600 may have a bore 61A formed in a portion thereof, on which the filter 610 is mounted or disposed, in order to allow the light passing through the filter 610 to be introduced into the image sensor 810. The bore 61A in the filter holder 600 may be a through-hole formed through the filter holder 600 in the optical-axis direction. In an example, the bore 61A in the filter holder 600 may be formed through the center of the filter holder 600, and may be disposed so as to correspond to or face the image sensor 810.

The filter holder 600 may include a seating portion 500, which is depressed in the upper surface thereof to allow the filter 610 to be seated therein. The filter 610 may be disposed, seated, or mounted in the seating portion 500. The seating portion 500 may be formed so as to surround the bore 61A. In another embodiment, the seating portion of the filter holder may take the form of a protruding portion protruding from the upper surface of the filter.

The image sensor unit 350 may further include an adhesive member 612 disposed between the filter 610 and the seating portion 500, and the filter 610 may be coupled or attached to the filter holder 600 by means of the adhesive member 612.

The image sensor unit 350 may further include an adhesive member 61 disposed between the filter holder 600 and the first circuit board 250, and the filter holder 600 may be coupled or attached to a fourth circuit board 260 by means of the adhesive member 61.

For example, each of the adhesive members 612 and 61 may be an epoxy, a thermosetting adhesive, or an ultraviolet-curable adhesive.

The camera module 10 may further include at least one of a cover member 300, a base 210, or a bottom cover 219 in order to accommodate the above-described AF moving unit 100 and the image sensor unit 350, to protect the AF moving unit 100 and the image sensor unit 350 from external impact, and to prevent external foreign substances from being introduced thereinto.

The cover member 300 may be formed in the shape of a box having an open lower portion and including an upper plate 301 and side plates 302, and the side plates 302 of the cover member 300 may be coupled to the outer side surface of the housing 140 of the AF moving unit 100. In another embodiment, the lower portions of the side plates of the cover member 300 may be coupled to the base.

The upper plate 301 of the cover member 300 may have a polygonal shape, e.g. a quadrangular shape or an octagonal shape. The cover member 300 may have a bore 303 formed in the upper plate 301 thereof to expose a lens (not shown) coupled to the bobbin 110 to external light. A recess 304 for exposing or opening the terminal portion of the circuit board 910 may be formed in any one of the side plates 302 of the cover member 300.

The base 210 may be disposed below the holder 270. The base 210 may have a shape coinciding with or corresponding to the shape of the cover member 300, the housing 450, or the holder 270, for example a quadrangular shape.

In an example, the base 210 may include a lower plate 210A disposed below the holder 270 and a side plate 2108 extending from the lower plate 210A toward the second circuit board 800. The base 210 may have a bore 210C formed in the lower plate 210A thereof.

The bore 210C in the base 210 may be a through-hole formed through the base 210 in the optical-axis direction. In another embodiment, the base may not have a bore.

In an example, the side plate 2108 of the base 210 may be coupled to the housing 450. In another embodiment, the side plate 2108 of the base 210 may be coupled to the side plate of the cover member 300.

The bottom cover 219 may be disposed under the base 210, and may close the bore 210C in the base 210. In another embodiment, the bottom cover 219 may be omitted.

A fixed unit of the image sensor unit 350 (hereinafter referred to as an "OIS fixed unit") and a moving unit of the image sensor unit 350 (hereinafter referred to as an "OIS moving unit") according to the embodiment will be described based on OIS operation.

The image sensor unit 350 may include an OIS fixed unit, an OIS moving unit (or movable unit), and elastic support members 220 and 280 coupled to the two units in order to connect the two units to each other. The OIS moving unit may move relative to the OIS fixed unit in a direction perpendicular to the optical axis OA. The elastic support members 220 and 280 may alternatively be referred to as "support members" or "elastic members."

The OIS moving unit, which is disposed below the OIS fixed unit, may be located at a position spaced apart from the OIS fixed unit by a predetermined distance due to the elastic support members 220 and 280. That is, the OIS moving unit may move relative to the OIS fixed unit due to electromagnetic force generated by the magnet 23 and the coil 230 in the state of being suspended (flown) from the lower portion of the OIS fixed unit by the support member 220 and the elastic connection member 280.

One end of each of the elastic support members 220 and 280 (e.g. one end of the support member 220) may be coupled to the second circuit board 800, and the other end of each of the elastic support members 220 and 280 (e.g. the first portion 31 of the connection spring 281) may be coupled to the first circuit board 250.

The second circuit board 800 and the first circuit board 250 may be conductively connected to each other via the elastic support members 220 and 280.

The OIS moving unit may be moved relative to the OIS fixed unit in a direction perpendicular to the optical axis by electromagnetic force resulting from interaction between the second coil 230 and the magnet 23.

In an example, the image sensor 810 may be shifted or tilted in a direction perpendicular to the optical axis OA, or may be rotated about the optical axis by interaction between the magnet 23 and the coil 230. For example, the optical-axis direction may be a direction perpendicular to one surface of the image sensor 810. For example, one surface of the image sensor 810 may be the upper surface of the image sensor 810. Alternatively, one surface of the image sensor 810 may be a surface that corresponds to or faces the lower surface of the lens module 400 or the filter 610. For example, one surface of the image sensor 810 may be an active area.

The OIS moving unit may be elastically supported by the support member 220 and the elastic connection member 280, and may be moved in a direction perpendicular to the optical axis.

The OIS fixed unit may include the second circuit board 800, the housing 450, and the magnet 23. In addition, the OIS fixed unit may include at least one of the base 210, the cover member 300, or the bottom cover 219. In addition, the OIS fixed unit may include elements coupled to the second circuit board 800, e.g. the motion sensor 820 and the capacitor 81A.

The "OIS moving unit" may include the first circuit board 250, the holder 270, the second coil 230, and the image sensor 810.

In addition, the OIS moving unit may include elements coupled to the first circuit board 250, e.g. the second position sensor 240, the controller 830, the memory 512, and the capacitor 81B. In addition, the OIS moving unit may include the filter holder 600 and the filter 610.

In an example, the OIS moving unit may include the first circuit board 250 coupled to the elastic connection member 280, the holder 270 coupled to the first circuit board 250, and the image sensor 810 disposed on the first circuit board 250, and may be elastically supported by the support member 220 and the elastic connection member 280.

The magnet 23 may be disposed in the OIS fixed unit, and the second coil 230 may be disposed in the OIS moving unit. The OIS moving unit may be moved or tilted relative to the OIS fixed unit by electromagnetic force resulting from interaction between the magnet 23 and the second coil 230.

Referring to FIG. 19A, the OIS moving unit may be spaced apart from the OIS fixed unit so that the OIS moving unit is moved or tilted relative to the OIS fixed unit by electromagnetic force resulting from interaction between the magnet 23 and the second coil 230.

In an example, the holder 270, the first circuit board 250, and the image sensor 800 may be spaced apart from the second circuit board 800, the housing 450, and the base 210.

In an example, when the OIS moving unit is located at the initial position, the outer side surface of the holder 270 may be spaced apart from the inner side surface of the base 210 by a predetermined distance d1.

In addition, in an example, when the OIS moving unit is located at the initial position, the lower surface of the holder 270 and the lower surface of the first circuit board 250 may be spaced apart from the front surface (or the upper surface) of the base 210 by a predetermined distance H1. In addition, in an example, when the OIS moving unit is located at the initial position, the lower surface of the holder 270 and the lower surface of the first circuit board 250 may be spaced apart from the front surface (or the upper surface) of the bottom cover 219.

In addition, in an example, when the OIS moving unit is located at the initial position, the solder 902 may be spaced apart from the front surface (or the upper surface) of the base 210 by a predetermined distance H2. The solder 902 may be spaced apart from the front surface (or the upper surface) of the bottom cover 219 by a predetermined distance.

The initial position of the OIS moving unit may be the original position of the OIS moving unit in the state in which no power or driving signal is applied to the second coil 230 or the position at which the OIS moving unit is located as the result of the support member 220 and the elastic connection member 280 being elastically deformed due only to the weight of the OIS moving unit.

In addition, the initial position of the OIS moving unit may be the position at which the OIS moving unit is located when gravity acts in a direction from the second circuit board 800 toward the first circuit board 250 or when gravity acts in the opposite direction.

The image sensor 810 may be any one of a charge coupled device (CCD), a metal oxide semiconductor (MOS), a CPD image sensor, and a CID image sensor, but the disclosure is not limited thereto.

In the embodiment, the first circuit board 250 is implemented as a single board, but the disclosure is not limited thereto. In another embodiment, the first circuit board may include a third board and a fourth board. The third board and the fourth board may include separate terminals in order to be conductively connected to each other, and the first coupling portion 31 of the elastic connection member 280 may be conductively connected to one of the third board and the fourth board.

Figure 22:
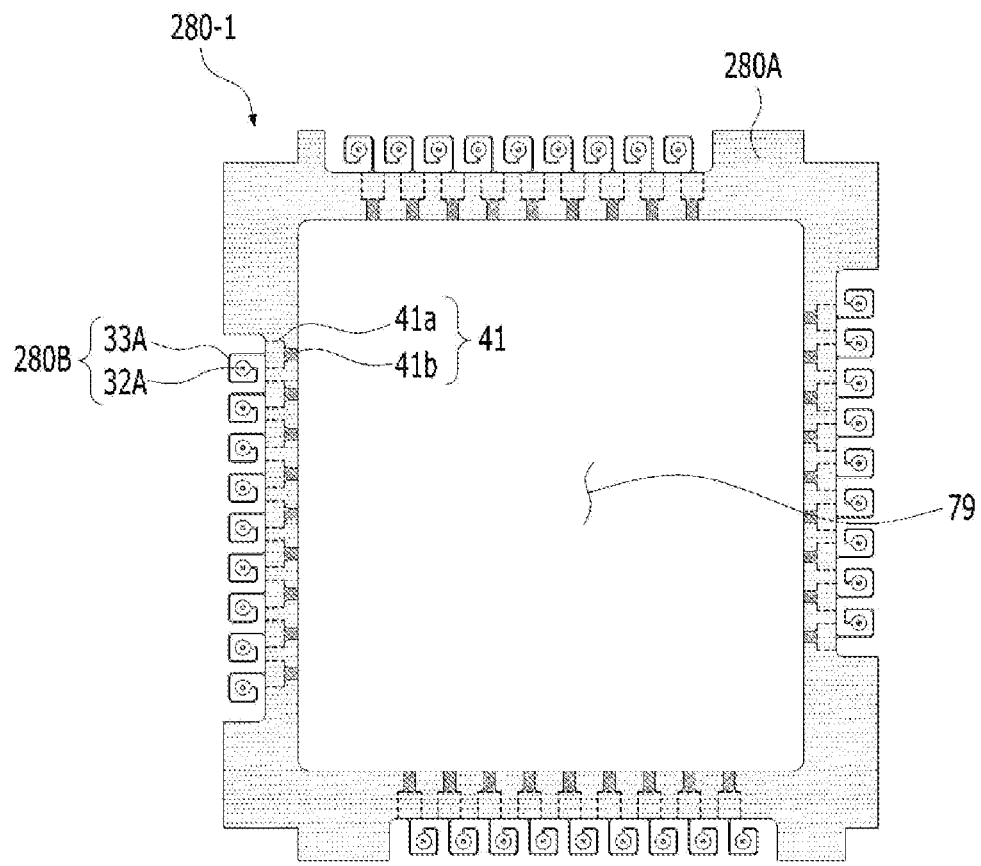
FIG. 22 shows an elastic connection member according to another embodiment.

FIG. 22 shows an elastic connection member 280-1 according to another embodiment.

Referring to FIG. 22, the elastic connection member 280-1 may include a board portion 280A and an elastic portion 280B. The board portion 280A may alternatively be referred to as a "board member," a "circuit board," a "board," or a "circuit member."

The board portion 280A may include a plurality of terminals 41 corresponding to the terminals 262 of the first circuit board 250.

The board portion 280A may have formed therein a bore 79 corresponding to the bore 70 in the holder 270. The bore 79 in the board portion 280A may be a through-hole formed through the board portion 280A in the optical-axis direction.

In an example, the bore 79 in the board portion 280A may expose the second surface 60B of the first circuit board 250, and may expose the terminals 262 of the first circuit board 250.

The terminal 41 of the board portion 280A may include a first portion 41a and a second portion 41b. The first portion 41a of the terminal 41 may be disposed within the board portion 280A, and the second portion 41b of the terminal 41 may be exposed to the outside of the board portion 280A, and may be coupled to the terminal 262 of the first circuit board 250 by means of a solder.

The board portion 280A may be disposed on the first surface 36A of the lower surface 42B of the holder 270, and may be coupled or attached to the first surface 36A of the lower surface 42B of the holder 270 by means of an adhesive member or the like.

For example, the board portion 280A may be implemented as a printed circuit board or an FPCB.

The elastic portion 280B may be exposed from the board portion 280A, and may be connected to the terminal 41 of the board portion 280A.

The elastic portion 280B may include a coupling portion 32A coupled to the support member 220 and a connection portion 33A connecting the coupling portion 32A to the terminal 41.

The elastic portion 280B and the terminal 41 of the board portion 280A may correspond to the connection spring 281 in FIG. 18.

For example, the first portion 41a of the terminal 41 may correspond to the first portion 31a of the connection spring 281 in FIG. 18, and the second portion 41b of the terminal 41 may correspond to the second portion 31b of the connection spring 281 in FIG. 18. The description of the first and second portions 31a and 31b of the connection spring 281 may also be applied to the first and second portions 41a and 41b of the terminal 41.

In addition, for example, the coupling portion 32A of the elastic portion 280B may correspond to the second coupling portion 32 of the connection spring 281 in FIG. 18, and the connection portion 33A of the elastic portion 280B may correspond to the connection portion 33 of the connection spring 281 in FIG. 18. The description of the second coupling portion 32 and the connection portion 33 of the connection spring 281 may also be applied to the coupling portion 32A and the connection portion 33A of the elastic portion 280B.

Figure 24:
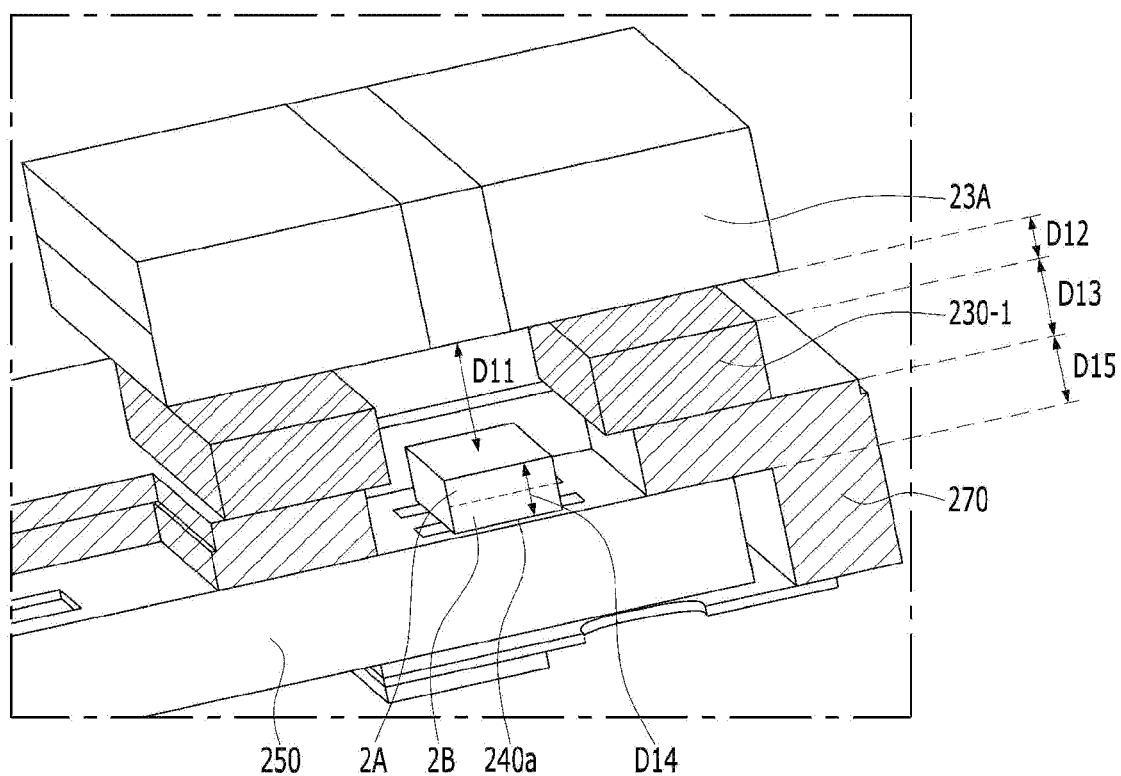
FIG. 24 shows disposition of the magnet, the OIS coil unit, the OIS position sensor, the holder, and the first circuit board according to the embodiment.

In addition, the description of the groups 1A to 4A of the elastic connection member 280 in FIGS. 15 and 16 may also be applied to the elastic connection member 280-1 in FIG. 24.

In addition, the board portion 280A may include the dummy members 28-1 to 28-4 described with reference to FIGS. 15 and 16, and the description of the dummy members 28-1 to 28-4 may also be applied to the dummy members of the board portion 280A.

Figure 23:
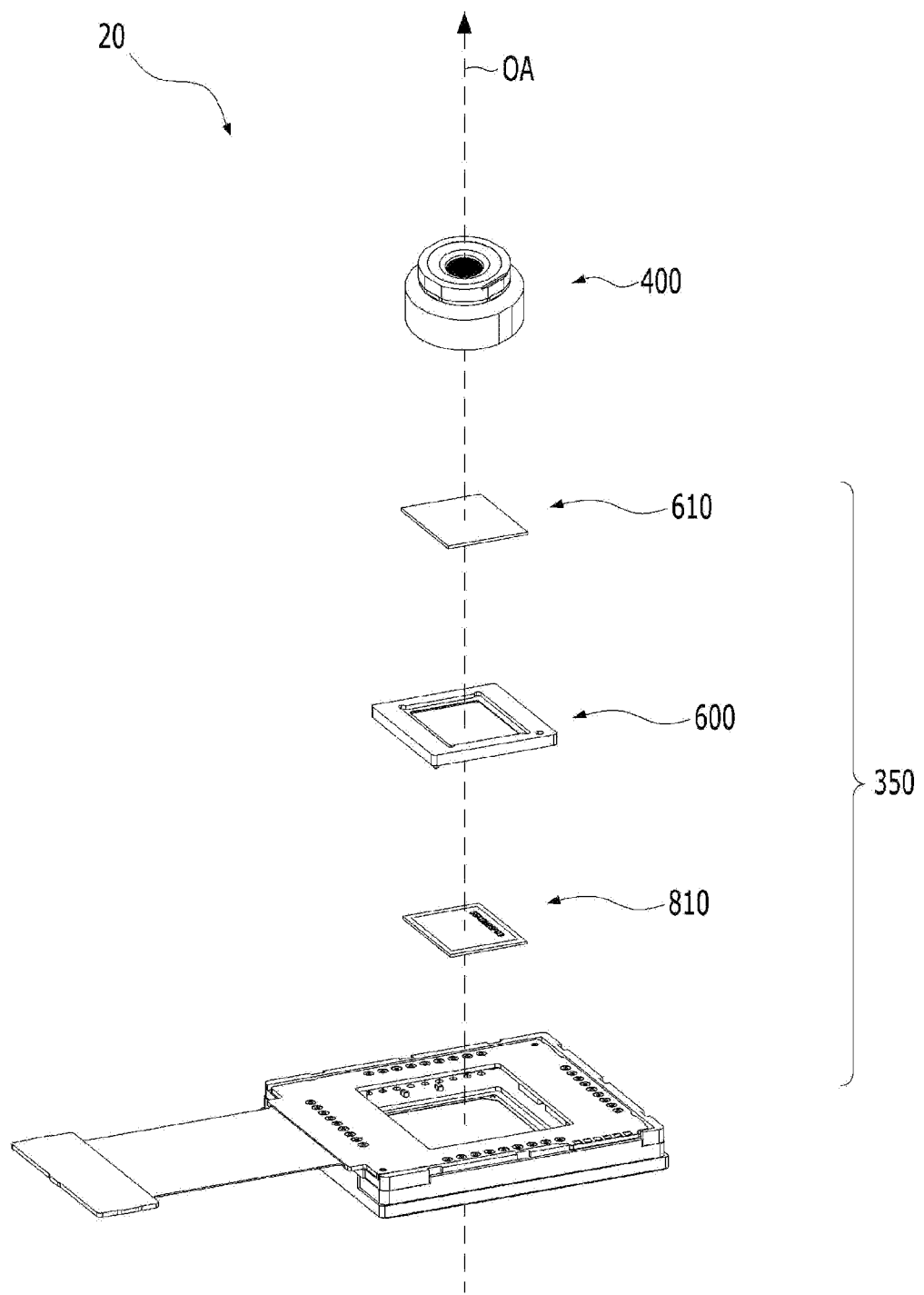
FIG. 23 is an exploded perspective view of a camera module according to another embodiment.

FIG. 23 is an exploded perspective view of a camera module 20 according to another embodiment. In FIG. 23, the same reference numerals as those in FIG. 2 denote the same components, and a description thereof will be given in brief or omitted.

Referring to FIG. 23, the camera module 20 may include a lens module 400 and an image sensor unit 350.

The lens module 400 of the camera module 20 in FIG. 23 may not be moved or shifted in the optical-axis direction, and may be stationary in the optical-axis direction.

In addition, the lens module 400 in FIG. 23 may not be moved or shifted in a direction perpendicular to the optical axis, and may be stationary in a direction perpendicular to the optical axis.

The camera module 20 may further include the cover member 300 in FIG. 2.

In an example, the lens module 400 may be coupled, attached, or secured to the holder 600 or the second circuit board 800. In an example, the lower portion, the lower end, or the lower surface of the lens module 400 may be coupled, attached, or secured to the upper surface of the holder 600 or the upper surface of the second circuit board 800.

In another example, the lens module 400 may be coupled, attached, or secured to the cover member 300.

As camera technology develops, the resolution of images becomes higher and higher, and thus the size of image sensors is increasing. As the size of image sensors is increasing, the size of a lens module and the size of an actuator for shifting the lens module are also increasing. Therefore, not only the weight of the lens module but also the weights of other actuator components for shifting the lens module increase.

In the embodiment, AF is performed using the AF moving unit 100 (or the first actuator), which realizes a lens shift scheme, and OIS is performed using the image sensor unit 350 (or the second actuator), which realizes an image sensor shift scheme, whereby the reliability of the camera device may be improved.

The embodiment is capable of achieving 5-axis hand-tremor compensation using a sensor shift scheme. For example, 5-axis hand shake may include 2-axis angular hand shake (e.g. pitch and yaw), 2-axis shifting hand shake (e.g. x-axis shift and y-axis shift), and 1-axis rotational hand shake (e.g. roll).

Figure 25:
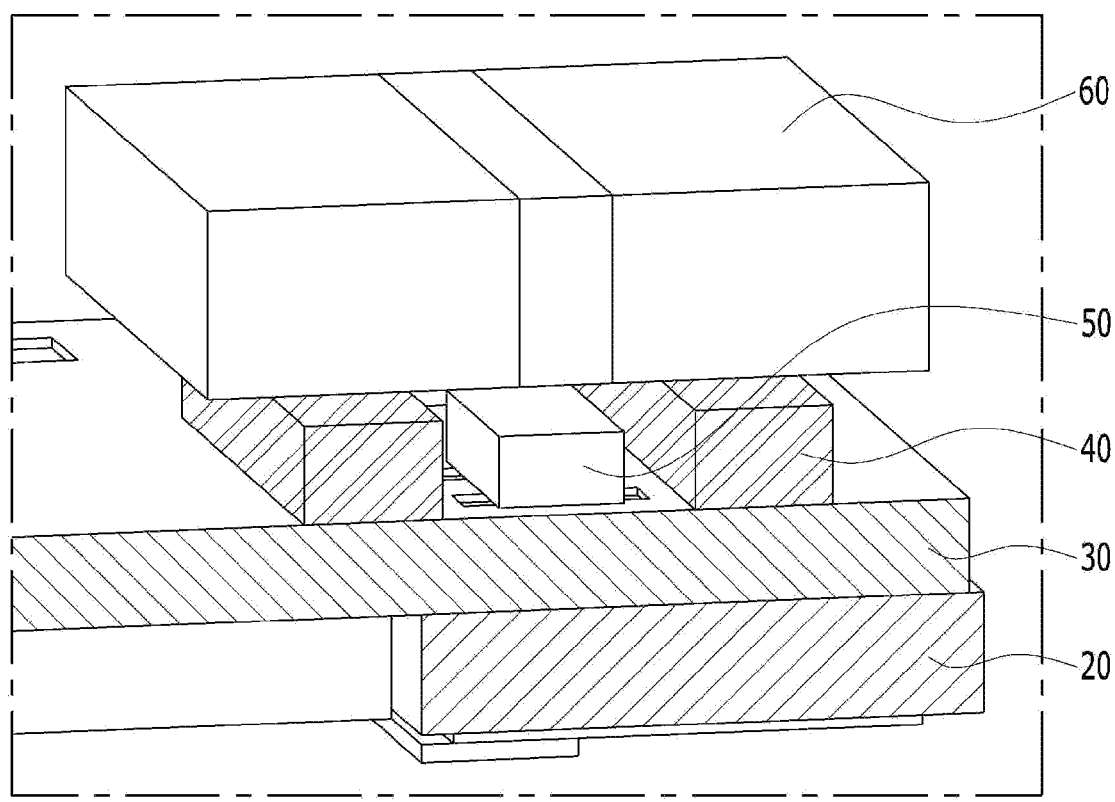
FIG. 25 shows disposition of a magnet, an OIS coil unit, an OIS position sensor, a first circuit board, and a holder according to a comparative example.

FIG. 24 shows disposition of the magnet 23A, the OIS coil unit 230-1, the OIS position sensor 240a, the holder 270, and the first circuit board 250 according to the embodiment, and FIG. 25 shows disposition of a magnet 60, an OIS coil unit 40, an OIS position sensor 50, a first circuit board 30, and a holder 20 according to a comparative example.

In the comparative example in FIG. 25, the OIS coil unit 40 and the OIS position sensor 50 may be disposed or mounted on a first surface (e.g. the upper surface) of the first circuit board 30. The holder 20 may be disposed below the first circuit board 30.

The OIS coil unit 40 may have a bore or a hole formed in the center thereof, and the OIS position sensor 50 may be disposed in the bore or the hole in the OIS coil unit 40. The OIS position sensor 50 may overlap the OIS coil unit 40 in a direction perpendicular to the optical axis or a direction parallel to the upper surface of the first circuit board 30. That is, the OIS coil unit 40 and the OIS position sensor 50, which correspond to each other, are disposed adjacent to the first surface (e.g. the upper surface) of the first circuit board 30.

When a driving signal is applied to the OIS coil unit 40 in order to perform OIS operation, a magnetic field may be generated in the OIS coil unit 40. In order to achieve accurate OIS feedback operation, the OIS position sensor 50 needs to produce output corresponding to a result of detecting only the magnetic field generated by the magnet 60 secured to the OIS fixed unit. However, in the comparative example in FIG. 25, because the OIS coil unit 40 and the OIS position sensor 50 are disposed adjacent to each other, the output of the OIS position sensor 50 may be greatly affected by the magnetic field generated in the OIS coil unit 40, and thus the accuracy and reliability of OIS feedback operation may be lowered.

Further, because the OIS position sensor 50 and the OIS coil unit 40 overlap each other in a direction perpendicular to the optical axis, the output of the OIS position sensor 50 may be greatly affected by the magnetic field generated in the OIS coil unit 40, and thus the accuracy and reliability of OIS feedback operation may be lowered.

Figure 26:
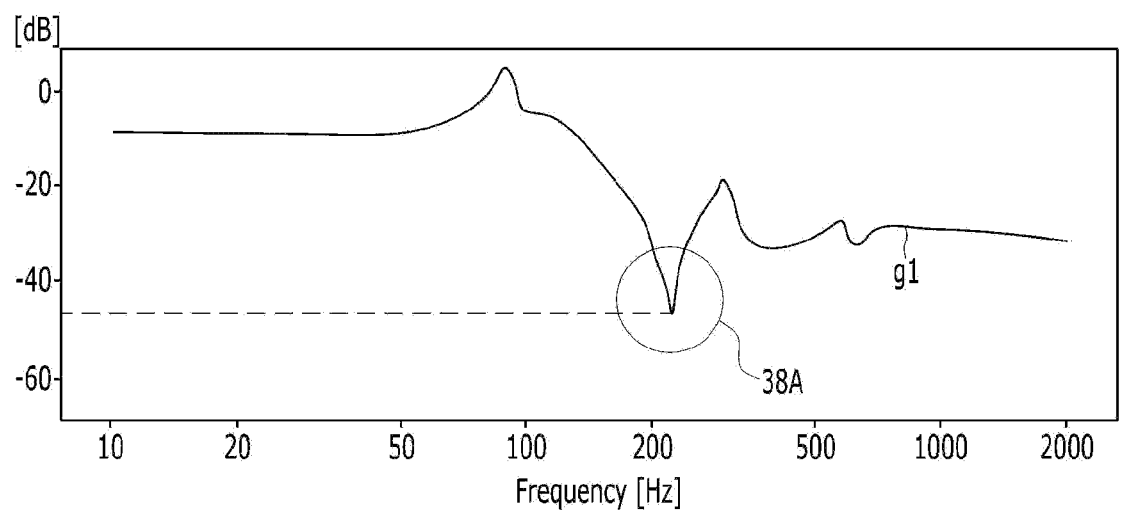
FIG. 26 shows frequency response characteristics on a driving signal input to the OIS coil unit and output of the OIS position sensor in the comparative example in FIG. 25.

FIG. 26 shows frequency response characteristics on a driving signal input to the OIS coil unit 40 and output of the OIS position sensor 50 in the comparative example in FIG. 25. In FIG. 26, the X-axis represents a frequency, and the Y-axis represents gain. "g1" represents frequency response characteristics on gain.

Referring to FIG. 26, there may occur a phenomenon 38A that the output of the OIS position sensor 50 is abnormally reduced in a certain frequency range (e.g. 200 Hz to 300 Hz) by the influence of the magnetic field of the OIS coil unit 40. Due to this phenomenon 38A, the reliability of OIS feedback operation may be deteriorated.

In contrast, in the embodiment in FIG. 24, the OIS position sensor (e.g. 240a) may be disposed below the OIS coil unit (e.g. 230-1), and the OIS position sensor (e.g. 240a) and the OIS coil unit (e.g. 230-1) may not overlap each other in a direction perpendicular to the optical axis or a direction parallel to the upper surface of the first circuit board 250.

In addition, for example, the spacing distance D12 between the magnet 23A and the OIS coil unit 230-1 in the optical-axis direction may be 0.05 mm to 0.2 mm. For example, D12 may be 0.1 mm to 0.18 mm. Alternatively, for example, D12 may be 0.12 mm to 0.15 mm.

In addition, for example, the length D13 of the OIS coil unit 230-1 in the optical-axis direction may be 0.1 mm to 0.5 mm. Alternatively, for example, D13 may be 0.2 mm to 0.4 mm. Alternatively, for example, D13 may be 0.25 mm to 0.3 mm.

For example, the spacing distance D11 between the magnet 23A and the OIS position sensor (e.g. 240a) in the optical-axis direction may be 0.25 mm to 0.8 mm.

Alternatively, for example, D11 may be 0.3 mm to 0.5 mm. Alternatively, for example, D11 may be 0.35 mm to 0.47 mm.

If D11 exceeds 0.8 mm, the intensity of the magnetic field of the magnet 23A detected by the OIS position sensor 240a may be reduced, and thus the sensitivity of the OIS position sensor 240a may decrease.

If D11 is shorter than 0.25 mm, in order to prevent the OIS coil unit and the OIS position sensor from overlapping each other in a direction perpendicular to the optical axis, the length D13 of the OIS coil unit 230-1 in the optical-axis direction needs to be reduced. In this case, however, the intensity of electromagnetic force resulting from interaction between the OIS coil unit and the magnet may be reduced.

In addition, for example, the thickness D14 of the OIS position sensor 240a may be 0.2 mm to 0.4 mm. For example, D14 may be 0.23 mm to 0.3 mm.

In addition, for example, the thickness D15 of the upper plate of the holder 270 may be 0.2 mm to 0.3 mm. For example, D15 may be 0.2 mm to 0.25 mm. For example, D15 may be a distance from the upper surface 42A of the holder 270 to the second surface 36B of the lower surface 42B of the holder 270.

For example, the distance from the lower surface (or the lower end) of the OIS coil unit 230-1 to the upper surface of the OIS position sensor 240a in the optical-axis direction or a direction parallel to the optical axis (hereinafter referred to as a "first distance") may be 0.01 mm to 0.2 mm. Alternatively, for example, the first distance may be 0.02 mm to 0.1 mm. Alternatively, for example, the first distance may be 0.02 mm to 0.05 mm.

If the first distance exceeds 0.2 mm, the spacing distance between the OIS position sensor 240a and the magnet 23A may greatly increase, and thus the output of the OIS position sensor 240a may be lowered, resulting in deterioration in the sensitivity thereof. In addition, when the first distance is shorter than 0.01 mm and as the first distance decreases, the influence of the magnetic field of the OIS coil unit 230-1 on the output of the OIS position sensor 240a may increase. However, the degree of the influence may be less than that in the comparative example in FIG. 26.

In another embodiment, the lower surface (or the lower end) of the OIS coil unit 230-1 and the upper surface of the OIS position sensor 240a may be located in the same plane, and the first distance may be zero.

The OIS position sensor 240a is disposed farther away from the OIS coil unit 230-1 than in the comparative example, and does not overlap the OIS coil unit 230-1 in a direction perpendicular to the optical axis compared to the comparative example. Accordingly, the embodiment may suppress or reduce the influence of the magnetic field of the OIS coil unit 40 on the output of the OIS position sensor, and may secure the accuracy and reliability of OIS feedback operation.

Figure 27:
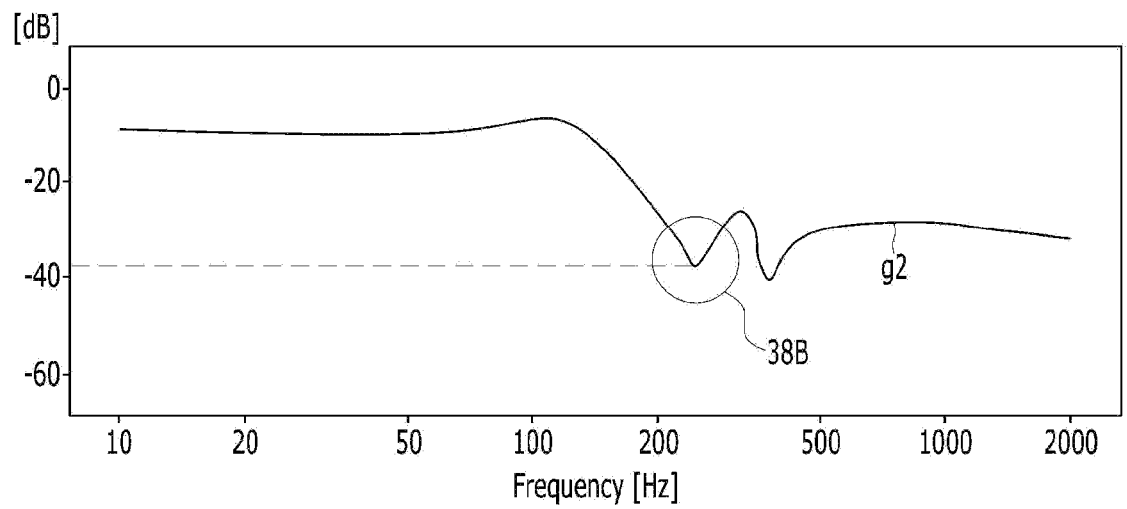
FIG. 27 shows frequency response characteristics on a driving signal input to the OIS coil unit and output of the OIS position sensor in the embodiment in FIG. 24.

FIG. 27 shows frequency response characteristics on a driving signal input to the OIS coil unit 230-1 and output of the OIS position sensor 240a in the embodiment in FIG. 24. In FIG. 27, the X-axis represents a frequency, and the Y-axis represents gain. "g2" represents frequency response characteristics on gain. Hereinafter, the frequency response characteristics in FIG. 26 will be referred to as "CASE1," and the frequency response characteristics in FIG. 27 will be referred to as "CASE2."

In CASE2, the phenomenon 38A occurring in CASE1 is alleviated or does not appear (38B).

In CASE1, gain at 200 Hz to 300 Hz is abnormally low (about −47 dB) due to the influence of the magnetic field of the OIS coil unit 40. Therefore, the reliability of OIS feedback operation may be deteriorated.

However, in CASE2, since the influence of the magnetic field of the OIS coil unit 230-1 is reduced or mitigated, the gain at 200 Hz to 300 Hz is higher than that in CASE1 (about −37 dB). That is, in CASE2, since the influence of the magnetic field of the OIS coil unit 230-1 is reduced or mitigated, it is possible to obtain normal frequency response characteristics.

In the embodiment, since the output of the OIS position sensor 240a is less affected by the magnetic field of the OIS coil unit 230-1, the recognition rate of the OIS position sensor 240a detecting the magnetic field of the magnet 23A may be increased, and accordingly, it is possible to prevent the occurrence of the phenomenon 38A in FIG. 26 and to perform OIS feedback operation with improved accuracy and reliability. As a result, it is possible to secure the reliability of hand-tremor compensation of the camera module.

Figure 28:
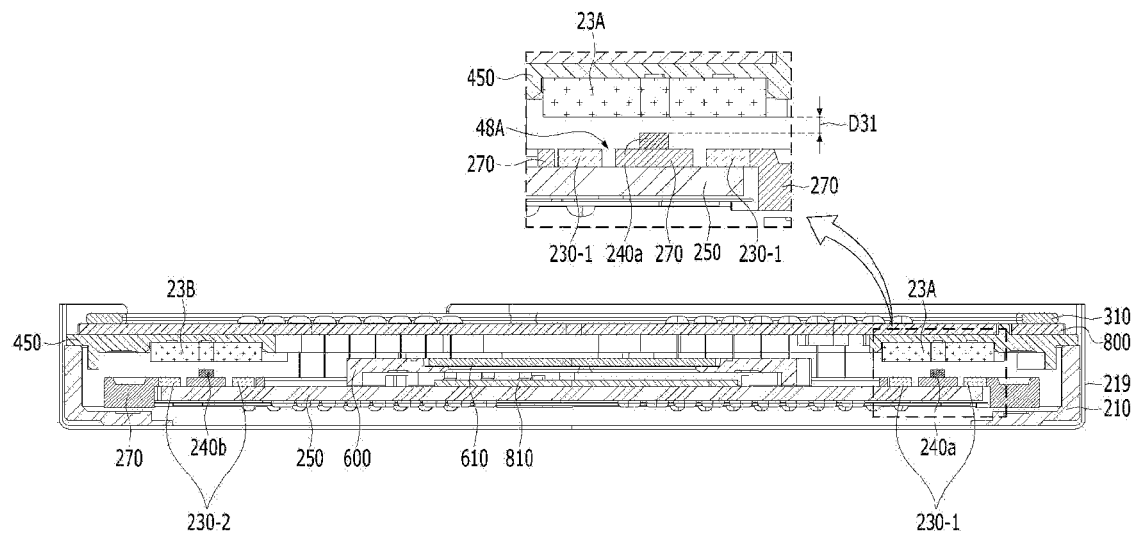
FIG. 28 shows disposition of the second coil and the second position sensor according to another embodiment.

FIG. 28 shows disposition of the second coil 230 and the second position sensor 240 according to another embodiment.

Referring to FIG. 28, the second coil 230 may be disposed on the first circuit board 230, and the second position sensor 240 may be disposed on the holder 270.

In an example, the second coil 230 may be disposed on the upper surface of the first circuit board 230. In an example, when viewed from above, the first to fourth coil units 230-1 to 230-4 may be disposed on the upper surface of the first circuit board 230, as shown in FIG. 12B.

In an example, in the embodiment in FIG. 28, the second position sensor 240 may be disposed on the upper surface of the holder 270. In an example, the second coil 230 may be coupled or attached to the upper surface of the first circuit board 250, and the second position sensor 240 may be coupled or attached to the upper surface of the holder 270.

In an example, in the embodiment in FIG. 28, the second position sensor 240 may be located higher than the second coil 230. In an example, the second position sensor 240 may be located closer to the magnet 23 than the second coil 230.

The second coil 230 and the second position sensor 240 may be conductively connected to the first circuit board 250. In an example, a wire, a metal layer, or a circuit pattern may be disposed or formed on the holder 270 in order to conductively connect the second position sensor 240 to the first circuit board 250.

In another embodiment, a surface electrode may be formed on at least one of the upper surface, the side surface, or the lower surface of the holder 270 in order to conductively connect the second position sensor 240 to the first circuit board 250. In still another embodiment, an insert electrode may be disposed in at least a portion of the holder 270. The insert electrode may conductively connect the second position sensor 240 to the first circuit board 250.

In addition, the holder 270 may include an escape portion 48A in order to avoid spatial interference with the second coil 230. For example, the escape portion 48A may be of a recess or hole type, and the second coil 230 may be disposed in the hole or the recess formed in the holder 270.

In the embodiment in FIG. 28, since the second position sensor 240 and the second coil 230 do not overlap each other in a direction perpendicular to the optical axis, the influence of the magnetic field generated by the second coil 230 on the output of the second position sensor 240 may be reduced, and thus the accuracy and reliability of OIS feedback operation may be improved. In the embodiment in FIG. 28, since the spacing distance D31 between the second position sensor 240 and the magnet 23 in the optical-axis direction is reduced, the sensitivity of the second position sensor 240 may be improved compared to the embodiment shown in FIG. 21.

Figure 29:
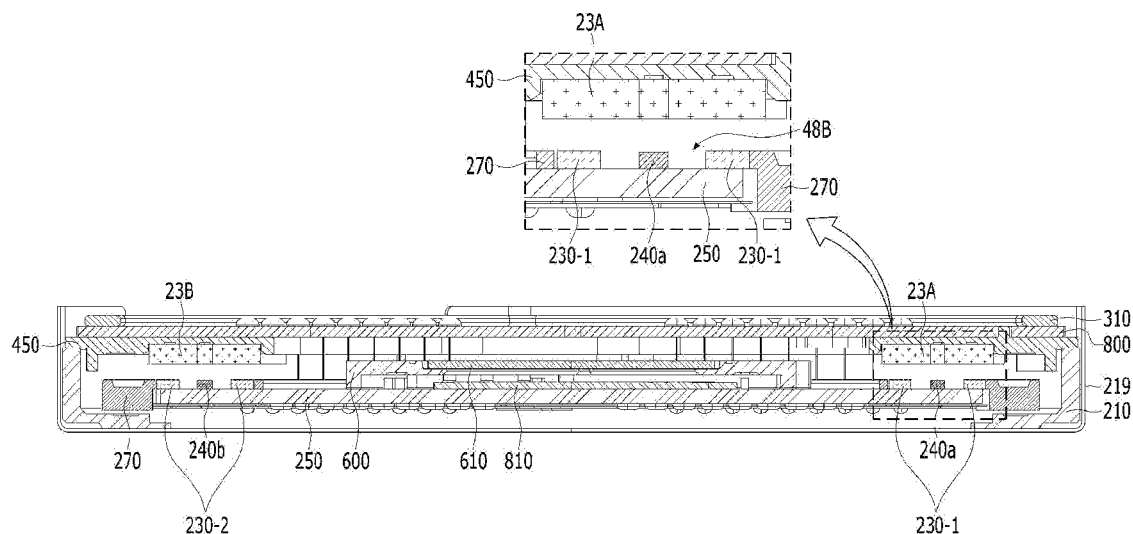
FIG. 29 shows disposition of the second coil and the second position sensor according to still another embodiment.

FIG. 29 shows disposition of the second coil 230 and the second position sensor 240 according to still another embodiment.

Referring to FIG. 29, the second coil 230 and the second position sensor 240 may be disposed on the first circuit board 230 so as to avoid the holder 270.

In an example, the holder 270 may include an escape portion 48B in order to avoid spatial interference with the second coil 230 and the second position sensor 240. For example, the escape portion 48B may be of a recess or hole type, and the second coil 230 and the second position sensor 240 may be disposed in the hole or the recess formed in the holder 270.

In an example, the second coil 230 and the second position sensor 240 may be disposed on the upper surface of the first circuit board 230. In an example, when viewed from above, the first to fourth coil units 230-1 to 230-4 may be disposed on the upper surface of the first circuit board 230, as shown in FIG. 12B.

In an example, in the embodiment in FIG. 29, the second coil 230 may be coupled or attached to the upper surface of the first circuit board 250, and the second position sensor 240 may be coupled or attached to the upper surface of the first circuit board 250.

In an example, in the embodiment in FIG. 29, the second position sensor 240 may overlap the second coil 230 in a direction perpendicular to the optical axis. In an example, the second position sensor 240 may be disposed in the center hole in the second coil 230.

The description given with reference to FIGS. 23 to 29 may also be applied to the coil units 230-2 to 230-4, the OIS position sensors 240b and 240c, and the magnets 23B to 23D.

The embodiment in FIGS. 1 to 22 includes the elastic support members 220 and 280 in order to support the moving unit (e.g. the first circuit board 250) with respect to the fixed unit (e.g. the second circuit board 800) and to conductively connect the first circuit board 250 to the second circuit board 800.

In another embodiment, a support board may be included instead of the elastic support members 220 and 280. The support board may alternatively be referred to as a "connection board" or an "interposer."

The support board may include a flexible substrate, or may be embodied as a flexible substrate. For example, the support board may include a flexible printed circuit board (FPCB). At least a portion of the support board may be flexible. The support board may be physically and/or conductively connected to the first circuit board 250. In an example, the support board may include a connection portion connected to the first circuit board 250. In an example, the first circuit board 250 and the support board may be integrally formed with each other. In another embodiment, the first circuit board 250 and the support board may be provided separately from each other, rather than being integrated, and may be connected to each other via the connection portion. The first circuit board and the support board may be conductively connected to each other. In addition, the support board may be conductively connected to the second circuit board 800 via a solder or a conductive adhesive.

The support board may guide movement of the OIS moving unit. The support board may guide the OIS moving unit to move in a direction perpendicular to the optical-axis direction. The support board may guide the OIS moving unit to rotate about the optical axis. The support board may restrict movement of the OIS moving unit in the optical-axis direction. A portion of the support board may be connected to the first circuit board 250, which is the OIS moving unit, and another portion of the support board may be coupled to the base 210, which is the fixed unit.

The support board may include an elastic portion and a circuit member. The elastic portion serves to elastically support the OIS moving unit, and may be embodied as an elastic body, for example a spring. The elastic portion may include metal, or may be made of an elastic material.

Figure 37:
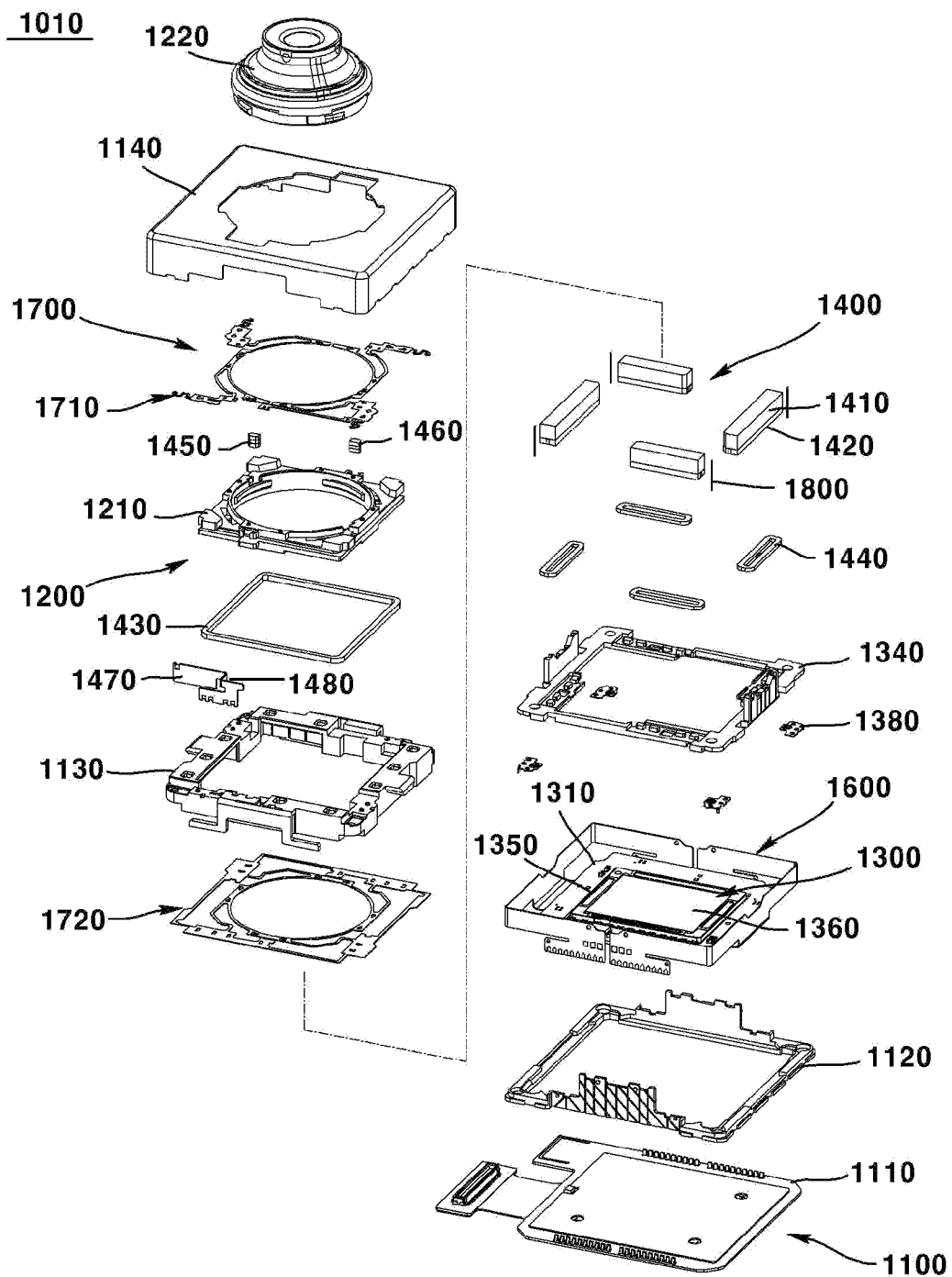
FIG. 37 is a first exploded perspective view of a camera device according to still another embodiment.
Figure 38:
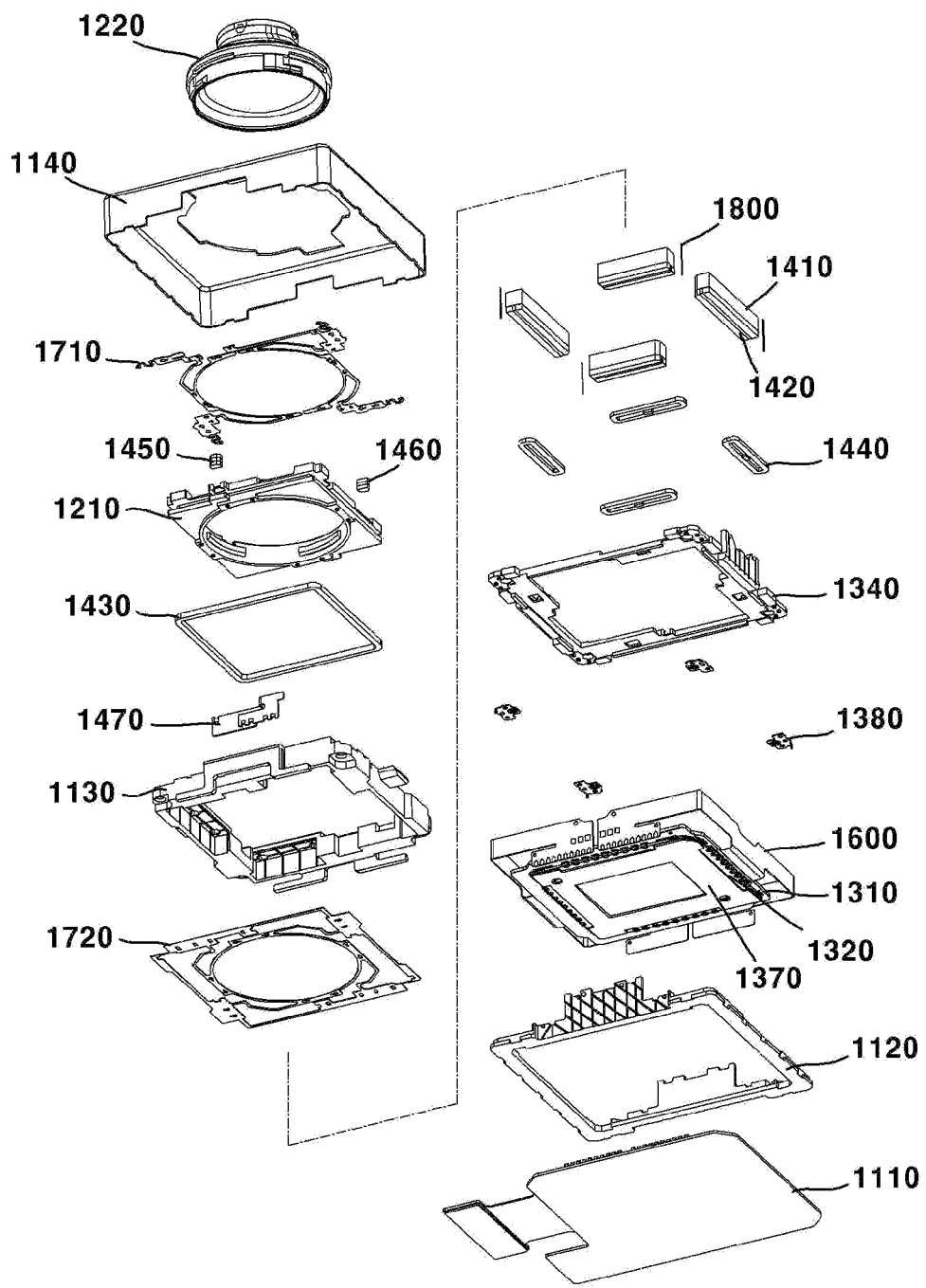
FIG. 38 is a second exploded perspective view of the embodiment in FIG. 37.
Figure 39:
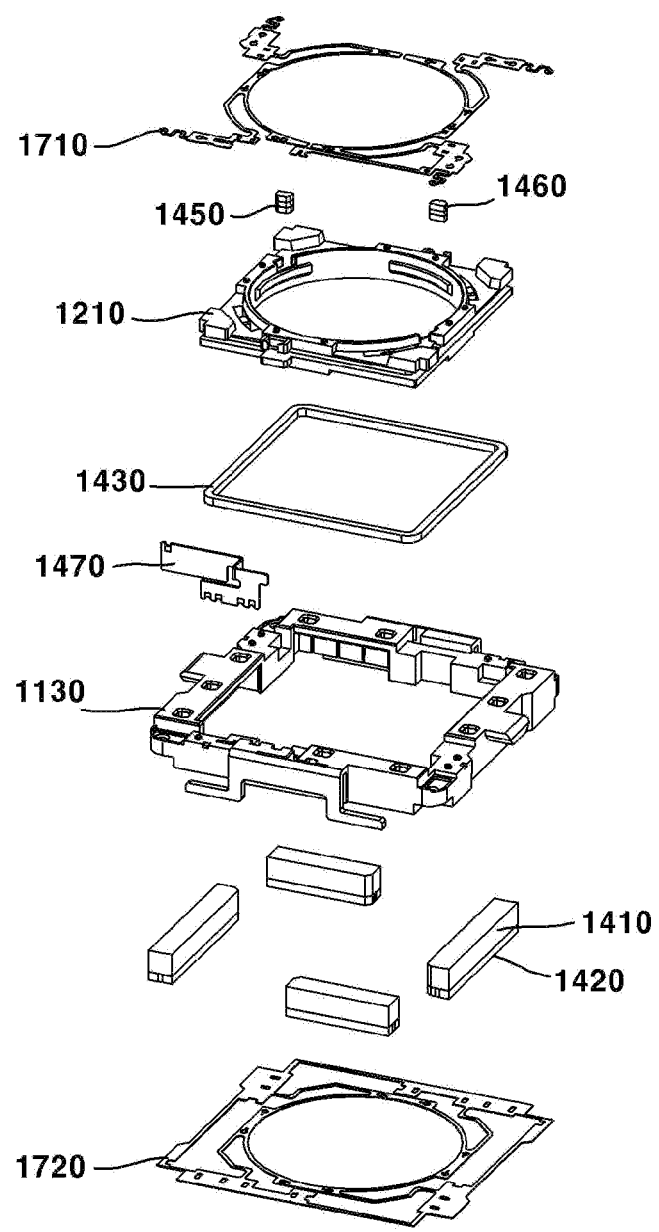
FIG. 39 is an exploded perspective view of a first moving unit of the camera device in FIG. 37.
Figure 40:
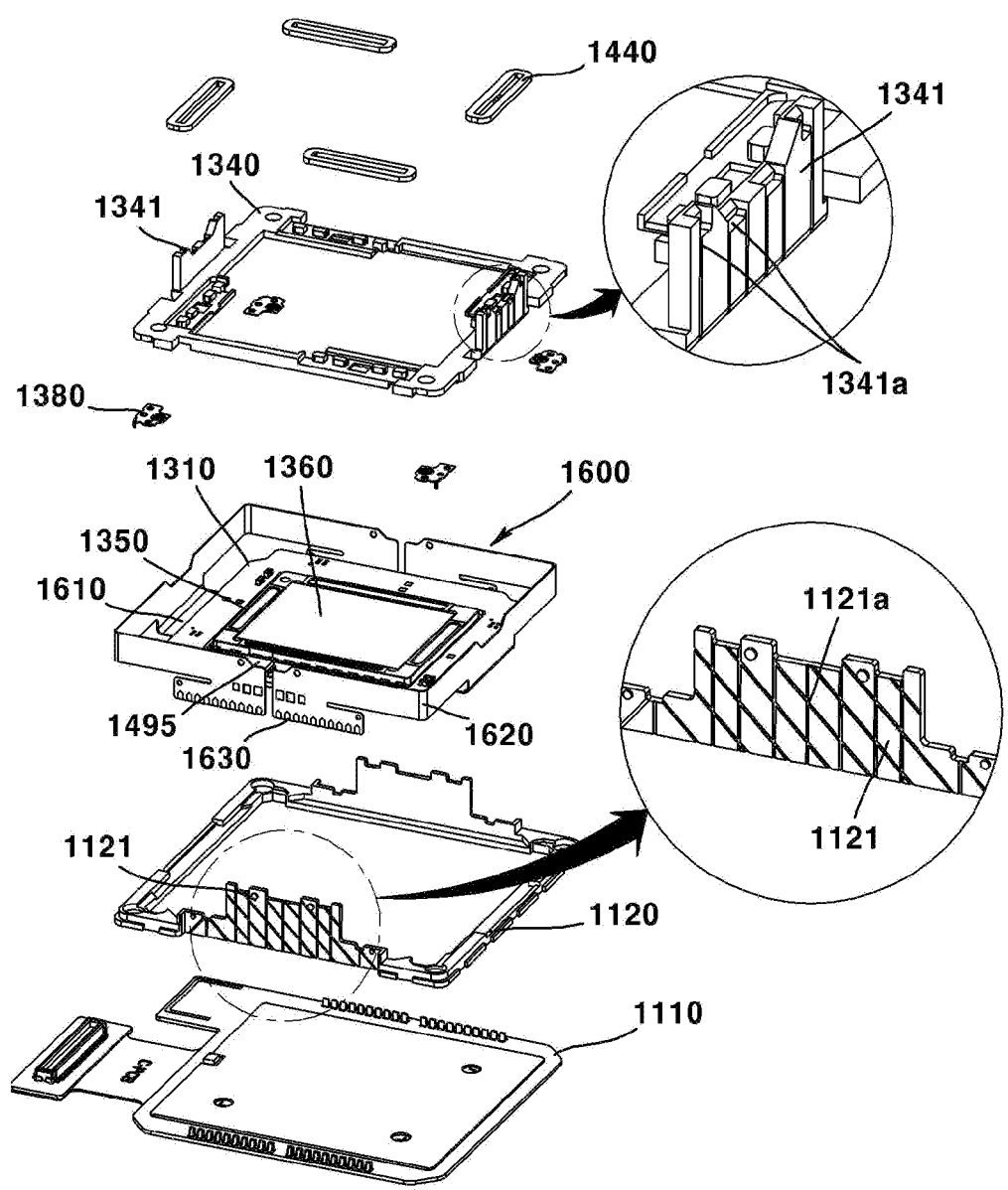
FIG. 40 is an exploded perspective view of a second moving unit in FIG. 37.
Figure 41:
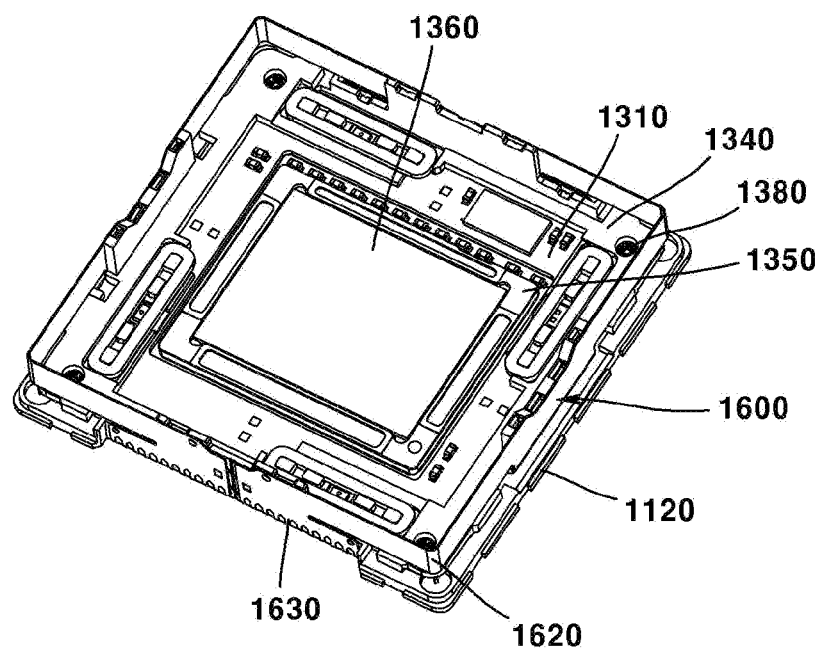
FIG. 41 is a perspective view of the second moving unit, a fixed unit, and a connection board in FIG. 37.
Figure 42:
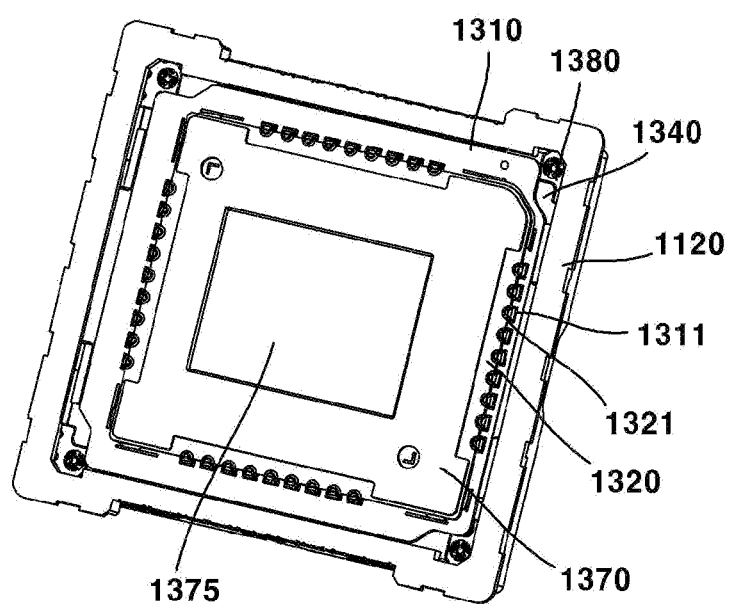
FIG. 42 is a bottom perspective view of the second moving unit and the fixed unit of the camera device in FIG. 37.
Figure 43:
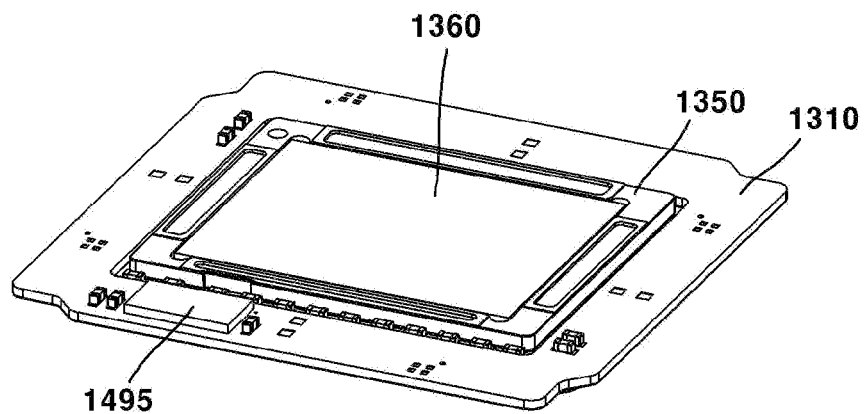
FIG. 43 is a perspective view of some components of the second moving unit of the camera device in FIG. 37.
Figure 44:
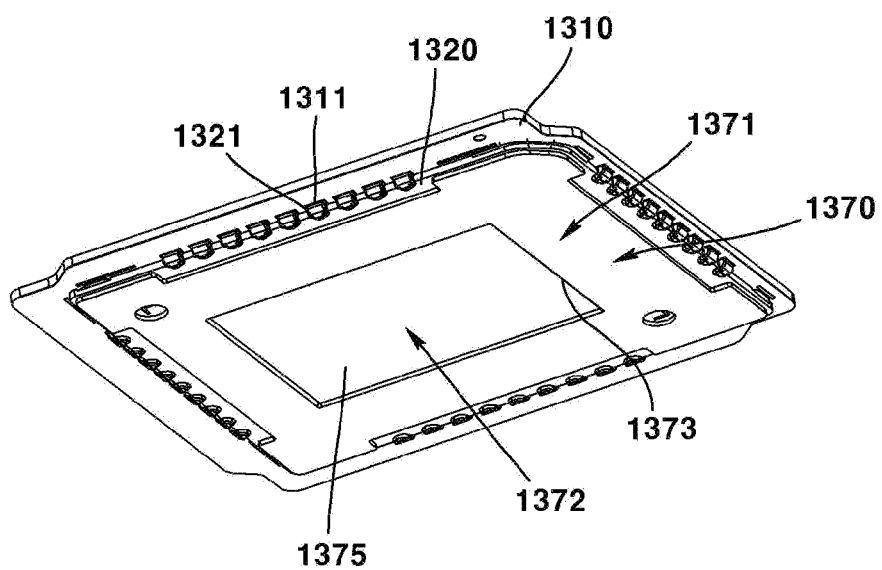
FIG. 44 is a bottom perspective view of some components of the second moving unit of the camera device in FIG. 37.
Figure 45:
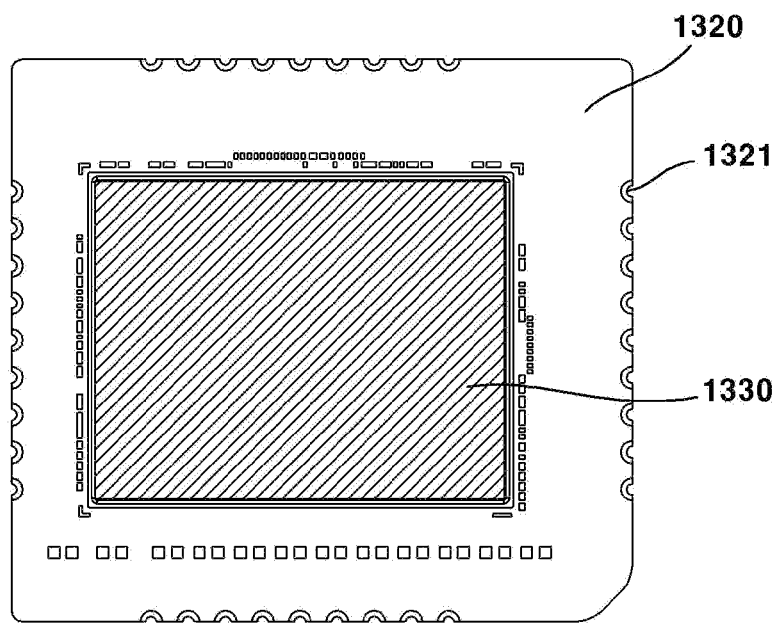
FIG. 45 is a plan view showing a configuration related to an image sensor of the camera device in FIG. 37.
Figure 46A:
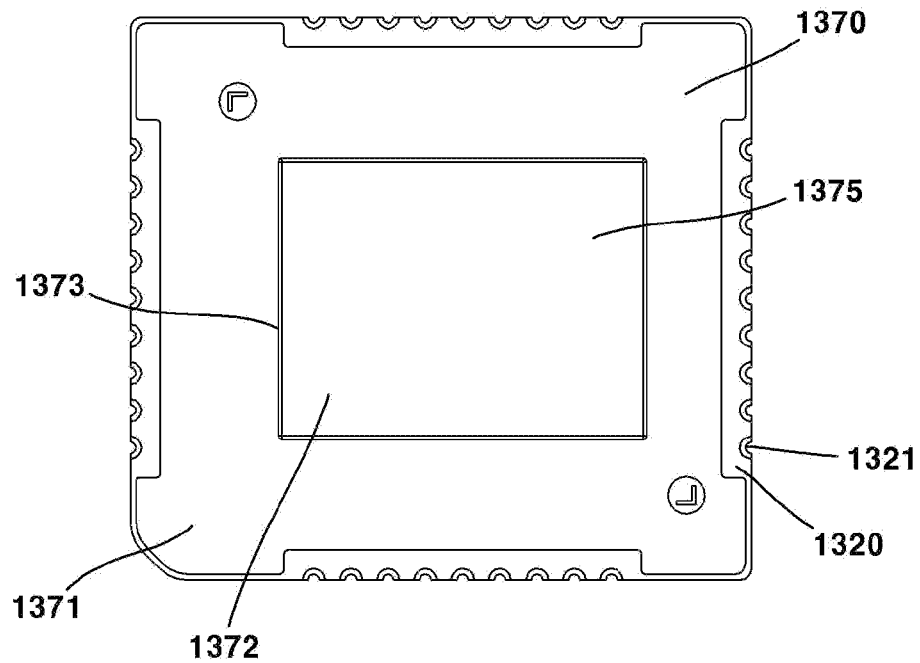
FIG. 46A is a bottom view of a configuration related to a plate member of the camera device in FIG. 37.
Figure 46B:
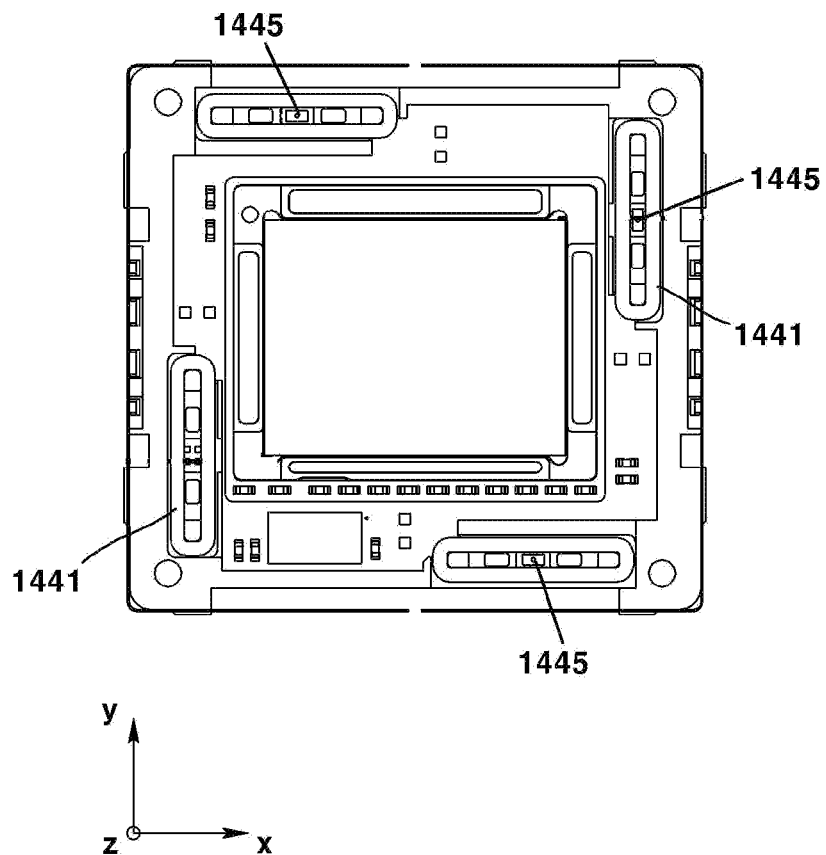
FIG. 46B shows disposition of a Hall sensor in FIG. 37.
Figure 47A:
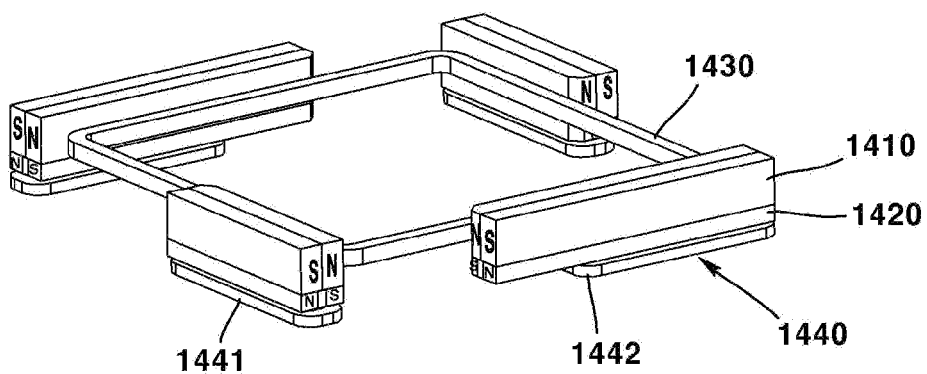
FIG. 47A is a perspective view showing a magnet and a coil of the camera device in FIG. 37.
Figure 47B:
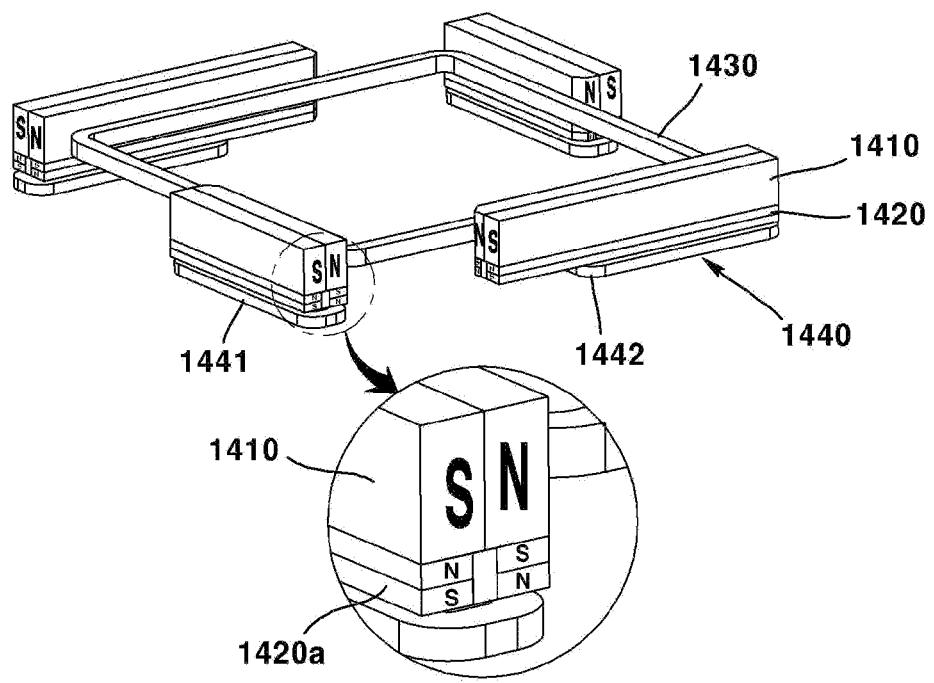
FIG. 47B shows a modified example of the magnet and the coil in FIG. 47A.

FIG. 37 is a first exploded perspective view of a camera device according to still another embodiment, FIG. 38 is a second exploded perspective view of the embodiment in FIG. 37, FIG. 39 is an exploded perspective view of a first moving unit of the camera device in FIG. 37, FIG. 40 is an exploded perspective view of a second moving unit in FIG. 37, FIG. 41 is a perspective view of the second moving unit, a fixed unit, and a connection board in FIG. 37, FIG. 42 is a bottom perspective view of the second moving unit and the fixed unit of the camera device in FIG. 37, FIG. 43 is a perspective view of some components of the second moving unit of the camera device in FIG. 37, FIG. 44 is a bottom perspective view of some components of the second moving unit of the camera device in FIG. 37, FIG. 45 is a plan view showing a configuration related to an image sensor of the camera device in FIG. 37, FIG. 46A is a bottom view of a configuration related to a plate member of the camera device in FIG. 37, FIG. 46B shows disposition of a Hall sensor in FIG. 37, FIG. 47A is a perspective view showing a magnet and a coil of the camera device in FIG. 37, and FIG. 47B shows a modified example of the magnet and the coil in FIG. 47A.

The camera device 1010 in FIG. 37 may include a fixed unit 1100. The fixed unit 1100 may be a unit that is stationary when moving units 1200 and 1300 move relative thereto. The fixed unit 1100 may be a unit that is stationary when at least one of the first moving unit 1200 or the second moving unit 1300 moves relative thereto. The fixed unit 1100 may accommodate the first moving unit 1200 and the second moving unit 1300. The fixed unit 1100 may be disposed outside the first moving unit 1200 and the second moving unit 1300.

Although described as being one component of the fixed unit 1100, it is to be understood that a first board 1110 is a component separate from the fixed unit 1100. The fixed unit 1100 may be disposed at the first board 1110. The fixed unit 1100 may be disposed on the first board 1110. The fixed unit 1100 may be disposed above the first board 1110.

The camera device 1010 may include a first board 1110. The fixed unit 1100 may include the first board 1110. The first board 1110 may be a main board. The first board 1110 may be a substrate. The first board 1110 may be a printed circuit board (PCB). The first board 1110 may be connected to a power supply of an optical instrument 1001. The first board 1110 may include a connector connected to the power supply of the optical instrument 1001.

The camera device 1010 may include a base 1120. The fixed unit 1100 may include the base 1120. The base 1120 may be disposed at the first board 1110. The base 1120 may be disposed on the first board 1110. The base 1120 may be disposed above the first board 1110. The base 1120 may be secured to the first board 1110. The base 1120 may be coupled to the first board 1110. The base 1120 may be adhered to the first board 1110 by means of an adhesive. The base 1120 may be disposed between the first board 1110 and a housing 1130.

A connection board 1600 may be disposed on the base 1120. The connection board 1600 may be connected to the base 1120. The connection board 1600 may be secured to the base 1120. The connection board 1600 may be coupled to the base 1120. The connection board 1600 may be adhered to the base 1120. The connection board 1600 may be fixed to the base 1120 by means of an adhesive. The connection board 1600 may be in contact with the base 1120.

The base 1120 may include a protruding portion 1121. The protruding portion 1121 may protrude from the upper surface of the base 1120. The protruding portion 1121 may protrude upwards from the outer side surface of the base 1120. The connection board 1600 may be disposed on the protruding portion 1121 of the base 1120. The connection board 1600 may be connected to the protruding portion 1121 of the base 1120. The connection board 1600 may be secured to the protruding portion 1121 of the base 1120. The connection board 1600 may be coupled to the protruding portion 1121 of the base 1120. The connection board 1600 may be adhered to the protruding portion 1121 of the base 1120. The connection board 1600 may be fixed to the protruding portion 1121 of the base 1120 by means of an adhesive. The connection board 1600 may be in contact with the protruding portion 1121 of the base 1120.

A terminal portion 630 of the connection board 1600 may be disposed on the protruding portion 1121 of the base 1120. The terminal portion 630 of the connection board 1600 may be connected to the protruding portion 1121 of the base 1120. The terminal portion 630 of the connection board 1600 may be secured to the protruding portion 1121 of the base 1120. The terminal portion 630 of the connection board 1600 may be coupled to the protruding portion 1121 of the base 1120. The terminal portion 630 of the connection board 1600 may be adhered to the protruding portion 1121 of the base 1120. The terminal portion 630 of the connection board 1600 may be fixed to the protruding portion 1121 of the base 1120 by means of an adhesive. The terminal portion 630 of the connection board 1600 may be in contact with the protruding portion 1121 of the base 1120.

The base 1120 may have a groove 1121a formed therein. The groove 1121a may be an adhesive receiving groove. The groove 1121a may be formed in the outer side surface of the protruding portion 1121 of the base 1120. The groove 1121a may be formed in the upper surface of the protruding portion 1121 of the base 1120. The groove 1121a may be formed from the upper surface of the protruding portion 1121 of the base 1120 to the lower surface thereof. An adhesive for bonding the connection board 1600 to the base 1120 may be disposed in the groove 1121a. The groove 1121a may include a plurality of grooves.

The camera device 1010 may include a housing 1130. The fixed unit 1100 may include the housing 1130. The housing 1130 may be disposed at the base 1120. The housing 1130 may be disposed on the base 1120. The housing 1130 may be disposed above the base 1120. The housing 1130 may be secured to the base 1120. The housing 1130 may be coupled to the base 1120. The housing 1130 may be adhered to the base 1120 by means of an adhesive. The housing 1130 may be disposed on the first board 1110. The housing 1130 may be disposed above the first board 1110. The housing 1130 may be formed as a member separate from the base 1120.

The camera device 1010 may include a cover member 1140. The fixed unit 1100 may include the cover member 1140. The cover member 1140 may be coupled to the base 1120. The cover member 1140 may be coupled to the housing 1130. The cover member 1140 may be coupled to the first board 1110. The cover member 1140 may be secured to the base 1120. The cover member 1140 may be secured to the housing 1130. The cover member 1140 may be secured to the first board 1110. The cover member 1140 may cover at least a portion of the base 1120. The cover member 1140 may cover at least a portion of the housing 1130.

The cover member 1140 may be a "cover can" or a "shield can." The cover member 1140 may be formed of a metal material. The cover member 1140 may block electromagnetic interference (EMI). The cover member 1140 may be conductively connected to the first board 1110. The cover member 1140 may be grounded to the first board 1110.

The cover member 1140 may include an upper plate. The cover member 1140 may have a hole formed in the upper plate thereof. The hole may be formed at a position corresponding to a lens 1220. The cover member 1140 may include a side plate. The side plate may include a plurality of side plates. The side plate may include four side plates. The side plate may include first to fourth side plates. The side plate may include first and second side plates, which are disposed opposite each other, and third and fourth side plates, which are disposed opposite each other. The cover member 1140 may include a plurality of corners formed between the plurality of side plates.

Although described as being one component of the fixed unit 1100 throughout the specification, it is to be understood that the cover member 1140 is a component separate from the fixed unit 1100. The cover member 1140 may be coupled to the fixed unit 1100. The cover member 1140 may cover the first moving unit 1200.

The camera device 1010 may include a first moving unit 1200. The first moving unit 1200 may move relative to the fixed unit 1100. The first moving unit 1200 may move in the optical-axis direction relative to the fixed unit 1100. The first moving unit 1200 may be disposed in the fixed unit 1100. The first moving unit 1200 may be movably disposed in the fixed unit 1100. The first moving unit 1200 may be disposed in the fixed unit 1100 so as to be movable in the optical-axis direction. When the first moving unit 1200 moves in the optical-axis direction relative to the fixed unit 1100, an autofocus (AF) function may be performed. The first moving unit 1200 may be disposed above the second moving unit 1300.

The camera device 1010 may include a bobbin 1210. The first moving unit 1200 may include the bobbin 1210. The bobbin 1210 may be disposed on the first board 1110. The bobbin 1210 may be disposed above the first board 1110. The bobbin 1210 may be disposed so as to be spaced upwards apart from the first board 1110. The bobbin 1210 may be disposed in the housing 1130. The bobbin 1210 may be disposed inside the housing 1130. At least a portion of the bobbin 1210 may be accommodated in the housing 1130. The bobbin 1210 may be movably disposed in the housing 1130. The bobbin 1210 may be disposed in the housing 1130 so as to be movable in the optical-axis direction. The bobbin 1210 may be coupled to the lens 1220. The bobbin 1210 may have a cavity or a hole formed therein. The lens 1220 may be disposed in the cavity or the hole in the bobbin 1210. The outer circumferential surface of the lens 1220 may be coupled to the inner circumferential surface of the bobbin 1210.

The camera device 1010 may include a lens 1220. The first moving unit 1200 may include the lens 1220. The lens 1220 may be coupled to the bobbin 1210. The lens 1220 may be secured to the bobbin 1210. The lens 1220 may move integrally with the bobbin 1210. The lens 1220 may be screwed to the bobbin 1210. The lens 1220 may be adhered to the bobbin 1210 by means of an adhesive. The lens 1220 may be disposed at a position corresponding to an image sensor 1330. The optical axis of the lens 1220 may coincide with the optical axis of the image sensor 1330. The optical axis may be the z-axis. The lens 1220 may include a plurality of lenses. The lens 1220 may include five or six lenses.

The camera device 1010 may include a lens module. The lens module may be coupled to the bobbin 1210. The lens module may include a barrel and one or more lenses 1220 disposed in the barrel.

The camera device 1010 may include a second moving unit 1300. The second moving unit 1300 may move relative to the fixed unit 1100. The second moving unit 1300 may move in a direction perpendicular to the optical-axis direction relative to the fixed unit 1100. The second moving unit 1300 may be disposed in the fixed unit 1100. The second moving unit 1300 may be movably disposed in the fixed unit 1100. The second moving unit 1300 may be disposed in the fixed unit 1100 so as to be movable in a direction perpendicular to the optical-axis direction. When the second moving unit 1300 moves in a direction perpendicular to the optical-axis direction relative to the fixed unit 1100, an optical image stabilization (O1S) function may be performed. The second moving unit 1300 may be disposed between the first moving unit 1200 and the first board 1110.

The camera device 1010 may include a second board 1310. The second moving unit 1300 may include the second board 1310. The second board 1310 may be a substrate. The second board 1310 may be a printed circuit board (PCB). The second board 1310 may be disposed between the first moving unit 1200 and the first board 1110. The second board 1310 may be disposed between the bobbin 1210 and the first board 1110. The second board 1310 may be disposed between the lens 1220 and the first board 1110. The second board 1310 may be spaced apart from the fixed unit 1100. The second board 1310 may be spaced apart from the fixed unit 1100 in the optical-axis direction and a direction perpendicular to the optical-axis direction. The second board 1310 may move in a direction perpendicular to the optical-axis direction. The second board 1310 may be conductively connected to the image sensor 1330. The second board 1310 may move integrally with the image sensor 1330. The second board 1310 may have a hole formed therein. The image sensor 1330 may be disposed in the hole in the second board 1310. The second board 1310 may be coupled to the upper surface of a sensor board 1320. The second board 1310 may be disposed on the upper surface of the sensor board 1320. The second board 1310 may be secured to the upper surface of the sensor board 1320.

The second board 1310 may include a terminal 1311. The terminal 1311 may be disposed on the lower surface of the second board 1310. The terminal 1311 may be coupled to a terminal 1321 of the sensor board 1320. The second board 1310 may be formed separately from the sensor board 1320. The second board 1310 may be formed separately from and coupled to the sensor board 1320. The terminal 1321 of the sensor board 1320 may be soldered to the terminal 1311 of the second board 1310.

The second board 1310 may have a hole 1312 formed therein. The hole 1312 may be formed in the second board 1310. The hole 1312 may be formed through the second board 1310 in the optical-axis direction. The hole 1312 may be formed in the center of the second board 1310. At least a portion of a sensor unit 1300a may be inserted into the hole 1312. A sensor holder 1350 may be inserted into the hole 1312. The sensor holder 1350 may be inserted into the hole 1312 in the second board 1310. The sensor holder 1350 may be disposed in the hole 1312 in the second board 1310.

The sensor holder 1350 may overlap the second board 1310 in a direction perpendicular to the optical-axis direction. A filter 1360 may overlap the second board 1310 in a direction perpendicular to the optical-axis direction.

The camera device 1010 may include a sensor unit 1300a. The second moving unit 1300 may include the sensor unit 1300a. The sensor unit 1300a may be coupled to the second board 1310. The sensor unit 1300a may be inserted into and coupled to the second board 1310 from below.

The sensor unit 1300a may include at least one of the sensor board 1320, the image sensor 1330, the sensor holder 1350, or the filter 1360. The sensor unit 1300a may include the sensor board 1320 including the terminal 1321 connected to the terminal 1311 of the second board 1310. The sensor unit 1300a may include the image sensor 1330 disposed on the sensor board 1320. The sensor unit 1300a may include the sensor holder 1350 disposed on the image sensor 1330. The sensor unit 1300a may include the filter 1360 disposed on the sensor holder 1350.

The upper surface of the filter 1360 may be disposed higher than the upper surface of the second board 1310. The upper surface of the filter 1360 may be disposed at the same height as the upper surface of the second board 1310. The upper surface of the filter 1360 may be disposed lower than the upper surface of the second board 1310. The lower surface of the filter 1360 may be disposed higher than the upper surface of the second board 1310. The lower surface of the filter 1360 may be disposed at the same height as the upper surface of the second board 1310. The lower surface of the filter 1360 may be disposed lower than the upper surface of the second board 1310 and higher than the lower surface of the second board 1310.

The camera device 1010 may include a sensor board 1320. The second moving unit 1300 may include the sensor board 1320. The sensor board 1320 may be a substrate. The sensor board 1320 may be a printed circuit board (PCB). The sensor board 1320 may be coupled to the image sensor 1330. The sensor board 1320 may be coupled to the second board 1310.

The sensor board 1320 may include a terminal 1321. The terminal 1321 of the sensor board 1320 may be coupled to the terminal 1311 of the second board 1310. The sensor board 1320 may be coupled to the lower surface of the second board 1310. The sensor board 1320 may be disposed under the second board 1310. The sensor board 1320 may be coupled to the lower side of the second board 1310 in the state in which the image sensor 1330 is coupled thereto.

The terminal 1321 may include a first portion 1321a. The first portion 1321a may be disposed on the lower surface of the sensor board 1320. The terminal 1321 may include a second portion 1321b. The second portion 1321b may be connected to the first portion 1321a. The second portion 1321b may be disposed on the side surface of the sensor board 1320.

The sensor board 1320 may have a hole 1322 formed therein. The hole 1322 may be a cavity. The image sensor 1330 may be disposed in the hole 1322 in the sensor board 1320. A portion of a plate member 1370 may be disposed in the hole 1322 in the sensor board 1320. A protruding portion 1374 of the plate member 1370 may be disposed in the hole 1322 in the sensor board 1320. The hole 1322 in the sensor board 1320 may have a size and a shape corresponding to those of the protruding portion 1374 of the plate member 1370. The size of the hole 1322 may be larger than that of a recess 1375 in the plate member 1370. The size of the hole 1322 may be larger than that of the recess 1375 in the plate member 1370 when viewed in a cross-sectional view that is perpendicular to the optical-axis direction. The area of the upper surface of the protruding portion 1374 may be larger than that of the bottom surface of the recess 1375.

The camera device 1010 may include an image sensor 1330. The second moving unit 1300 may include the image sensor 1330. The image sensor 1330 may be disposed on the sensor board 1320. The image sensor 1330 may be disposed between the sensor board 1320 and the sensor holder 1350. The image sensor 1330 may be conductively connected to the second board 1310. The image sensor 1330 may move integrally with the second board 1310. The image sensor 1330 may be disposed below the lens 1220. The image sensor 1330 may be disposed on the plate member 1370, and may be conductively connected to the sensor board 1320 through wire bonding.

Light that has passed through the lens 1220 and the filter 1360 may be incident on the image sensor 1330 to form an image. The image sensor 1330 may be conductively connected to the sensor board 1320, the second board 1310, and the first board 1110. The image sensor 1330 may include an effective image area. The image sensor 1330 may convert light radiated to the effective image area into an electrical signal. The image sensor 1330 may include at least one of a charge coupled device (CCD), a metal oxide semiconductor (MOS), a CPD, or a CID.

The camera device 1010 may include a holder 1340. The second moving unit 1300 may include the holder 1340. The holder 1340 may be formed of an insulating material. The holder 1340 may be disposed at the second board 1310. The holder 1340 may be disposed on the second board 1310. The holder 1340 may be disposed above the second board 1310. The holder 1340 may be secured to the second board 1310. The holder 1340 may be coupled to the second board 1310. The holder 1340 may have a cavity or a hole formed therein to allow the image sensor 1330 to be disposed therein. A second coil 1440 may be disposed on the holder 1340. The holder 1340 may include a protrusion around which the second coil 1440 is wound. The holder 1340 may have a hole formed therein to allow a Hall sensor 1445 to be disposed therein.

The connection board 1600 may be disposed on the holder 1340. The connection board 1600 may be connected to the holder 1340. The connection board 1600 may be secured to the holder 1340. The connection board 1600 may be coupled to the holder 1340. The connection board 1600 may be adhered to the holder 1340. The connection board 1600 may be fixed to the holder 1340 by means of an adhesive. The connection board 1600 may be in contact with the holder 1340.

The holder 1340 may include a protruding portion 1341. The protruding portion 1341 may protrude from the upper surface of the holder 1340. The protruding portion 1341 may protrude upwards from the outer side surface of the holder 1340. The connection board 1600 may be disposed on the protruding portion 1341 of the holder 1340. The connection board 1600 may be connected to the protruding portion 1341 of the holder 1340. The connection board 1600 may be secured to the protruding portion 1341 of the holder 1340. The connection board 1600 may be coupled to the protruding portion 1341 of the holder 1340. The connection board 1600 may be adhered to the protruding portion 1341 of the holder 1340. The connection board 1600 may be fixed to the protruding portion 1341 of the holder 1340 by means of an adhesive. The connection board 1600 may be in contact with the protruding portion 1341 of the holder 1340.

The holder 1340 may have a groove 1341a formed therein. The groove 1341a may be an adhesive receiving groove. The groove 1341a may be formed in the outer side surface of the protruding portion 1341 of the holder 1340. The groove 1341a may be formed in the upper surface of the protruding portion 1341 of the holder 1340. The groove 1341a may be formed from the upper surface of the protruding portion 1341 of the holder 1340 to the lower surface thereof. An adhesive for bonding the connection board 1600 to the holder 1340 may be disposed in the groove 1341a. The groove 1341a may include a plurality of grooves.

At least part of a connection portion 1610 and an extension portion 1620 of the connection board 1600 may be disposed on the protruding portion 1341 of the holder 1340. At least part of the connection portion 1610 and the extension portion 1620 of the connection board 1600 may be connected to the protruding portion 1341 of the holder 1340. At least part of the connection portion 1610 and the extension portion 1620 of the connection board 1600 may be secured to the protruding portion 1341 of the holder 1340. At least part of the connection portion 1610 and the extension portion 1620 of the connection board 1600 may be coupled to the protruding portion 1341 of the holder 1340. At least part of the connection portion 1610 and the extension portion 1620 of the connection board 1600 may be adhered to the protruding portion 1341 of the holder 1340. At least part of the connection portion 1610 and the extension portion 1620 of the connection board 1600 may be fixed to the protruding portion 1341 of the holder 1340 by means of an adhesive. At least part of the connection portion 1610 and the extension portion 1620 of the connection board 1600 may be in contact with the protruding portion 1341 of the holder 1340.

The camera device 1010 may include a sensor holder 1350. The second moving unit 1300 may include the sensor holder 1350. The sensor holder 1350 may be disposed on the sensor board 1320. The sensor holder 1350 may have a hole formed at a position corresponding to the image sensor 1330. The sensor holder 1350 may have a recess formed therein to allow the filter 1360 to be disposed therein. The sensor holder 1350 may protrude above the second board 1310. The sensor holder 1350 may be disposed in the hole 1312 in the second board 1310. The sensor holder 1350 may overlap the second board 1310 in a direction perpendicular to the optical-axis direction. A portion of the sensor holder 1350 may be disposed between the second board 1310 and the image sensor 1330 in a direction perpendicular to the optical-axis direction. The upper surface of the sensor holder 1350 may be disposed higher than the upper surface of the holder 1340 and lower than the upper surface of the second coil 1440.

The camera device 1010 may include a filter 1360. The second moving unit 1300 may include the filter 1360. The filter 1360 may be disposed between the lens 1220 and the image sensor 1330. The filter 1360 may be disposed on the sensor holder 1350. The filter 1360 may block introduction of light within a specific frequency band, among the light that has passed through the lens 1220, into the image sensor 1330. The filter 1360 may include an infrared cut filter. The filter 1360 may block introduction of infrared radiation into the image sensor 1330. The filter 1360 may be disposed at a higher position than the second board 1310. The upper surface of the filter 1360 may be disposed at the same height as the upper surface of the sensor holder 1350.

The camera device 1010 may include a plate member 1370. The second moving unit 1300 may include the plate member 1370. The plate member 1370 may be SUS. The plate member 1370 may be formed of SUS. The plate member 1370 may be formed of a copper alloy. The plate member 1370 may include copper. The plate member 1370 may be a reinforcing plate.

The plate member 1370 may be a stiffener. The plate member 1370 may be coupled to the lower surface of the sensor board 1320. The plate member 1370 may be disposed on the lower surface of the sensor board 1320. The plate member 1370 may be in contact with the lower surface of the sensor board 1320. The plate member 1370 may be secured to the lower surface of the sensor board 1320. The plate member 1370 may be adhered to the lower surface of the sensor board 1320 by means of an adhesive.

In an example, the image sensor 1330 may be directly disposed on the plate member 1370. Meanwhile, it may be easier to manage the flatness of the plate member 1370 than the sensor board 1320. Accordingly, the flatness of a surface for mounting the image sensor 1330 thereon may be easily managed. The image sensor 1330 may be conductively connected to the sensor board 1320 through wire bonding. The image sensor 1330 may be conductively connected to the sensor board 1320.

The plate member 1370 may include a protruding portion 1374. The protruding portion 1374 may protrude from the upper surface of the plate member 1370. At least part of the protruding portion 1374 may be disposed in the hole in the sensor board 1320. The protruding portion 1374 of the plate member 1370 may overlap the sensor board 1320 in a direction perpendicular to the optical-axis direction. The image sensor 1330 may be disposed on the protruding portion 1374 of the plate member 1370. The image sensor 1330 may be disposed above the protruding portion 1374 of the plate member 1370. The image sensor 1330 may be in contact with the protruding portion 1374 of the plate member 1370. The image sensor 1330 may be secured to the protruding portion 1374 of the plate member 1370. The image sensor 1330 may be adhered to the protruding portion 1374 of the plate member 1370 by means of an adhesive. In a modified example, the protruding portion 1374 may be omitted from the plate member 1370, and only a recess 1375 may be formed therein.

The plate member 1370 may have a recess 1375 formed therein. The recess 1375 may be formed at a position corresponding to the protruding portion 1374. The recess 1375 may be concavely formed in the lower surface of the plate member 1370. The recess 1375 may be formed through etching. In the second embodiment of the present disclosure, the weight of the plate member 1370 may be reduced by forming the recess 1375 in the plate member 1370. In an example, the weight of the plate member 1370 may be reduced by 15% to 25% due to the recess 1375. The weight of the plate member 1370 may be reduced by 10% to 30% due to the recess 1375.

The plate member 1370 may include a support area. The support area may be coupled to the sensor board 1320. The support area may be a support portion. The support area may be disposed outside the protruding portion 1374. The support area may form an edge. The protruding portion 1374 may protrude from the support area. The thickness of the protruding portion 1374 may be smaller than that of the sensor board 1320. In this case, the thickness of the protruding portion 1374 may be a thickness from the upper surface of the support area to the upper surface of the protruding portion 1374. That is, the thickness from the upper surface of the support area to the upper surface of the protruding portion 1374 may be smaller than that of the sensor board 1320.

The plate member 1370 may include a first portion 1371, which is located outside the protruding portion 1374. The plate member 1370 may include a second portion 1372 in which the recess 1375 is formed. The plate member 1370 may include a third portion 1373 interconnecting the first portion 1371 and the second portion 1372.

The camera device 1010 may include a terminal 1380. The second moving unit 1300 may include the terminal 1380. The terminal 1380 may be disposed on the holder 1340. The terminal 1380 may be coupled to a wire 1800. The terminal 1380 may be connected to the wire 1800 via a solder. The terminal 1380 may be formed of metal. The terminal 1380 may have a hole formed therein to allow the wire 1800 to pass therethrough. The terminal 1380 may include a shock-absorbing portion for mitigating shock. The terminal 1380 may include a shape bent multiple times. The terminal 1380 may include a plurality of terminals. The terminal 1380 may include four terminals disposed in the four corner regions of the holder 1340.

The camera device 1010 may include a driving unit. The driving unit may move the moving units 1200 and 1300 relative to the fixed unit 1100. The driving unit may perform an autofocus (AF) function. The driving unit may perform an optical image stabilization (OIS) function. The driving unit may move the lens 1220. The driving unit may move the image sensor 1330. The driving unit may include a magnet and a coil. The driving unit may include a shape memory alloy (SMA).

The camera device 1010 may include a first driving unit. The first driving unit may be an AF driving unit. The first driving unit may move the first moving unit 1200 in the optical-axis direction. The first driving unit may move the bobbin 1210 in the optical-axis direction. The lens 1220 may be moved in the optical-axis direction. The first driving unit may perform an autofocus (AF) function. The first driving unit may move the first moving unit 1200 upwards in the optical-axis direction. The first driving unit may move the first moving unit 1200 downwards in the optical-axis direction.

The camera device 1010 may include a second driving unit. The second driving unit may be an OIS driving unit. The second driving unit may move the second moving unit 1300 in a direction perpendicular to the optical-axis direction. The second driving unit may move the second board 1310 in a direction perpendicular to the optical-axis direction. The second driving unit may move the sensor board 1320 in a direction perpendicular to the optical-axis direction. The second driving unit may move the image sensor 1330 in a direction perpendicular to the optical-axis direction. The second driving unit may move the holder 1340 in a direction perpendicular to the optical-axis direction. The second driving unit may move the sensor holder 1350 in a direction perpendicular to the optical-axis direction. The second driving unit may move the filter 1360 in a direction perpendicular to the optical-axis direction. The second driving unit may perform an optical image stabilization (OIS) function.

The second driving unit may move the second moving unit 1300 in a first direction, which is perpendicular to the optical-axis direction. The second driving unit may move the second moving unit 1300 in a second direction, which is perpendicular to the optical-axis direction and the first direction. The second driving unit may rotate the second moving unit 1300 about the optical axis.

The first driving unit may include a first coil 1430. The second driving unit may include a second coil 1440. The first driving unit may include a first driving magnet 1410. The second driving unit may include a second driving magnet 1420. In a modified example, the first driving unit and the second driving unit may include a driving magnet, which is commonly used for interaction between the first coil 1430 and the second coil 1440. That is, the first driving unit and the second driving unit may include coils, which are individually controlled, and a common magnet.

The camera device 1010 may include a first driving magnet 1410. The driving unit may include the first driving magnet 1410. The first driving magnet 1410 may be a magnet. The first driving magnet 1410 may be a permanent magnet. The first driving magnet 1410 may be a common magnet. The first driving magnet 1410 may be used for autofocus (AF).

The first driving magnet 1410 may be disposed in the fixed unit 1100. The first driving magnet 1410 may be secured to the fixed unit 1100. The first driving magnet 1410 may be coupled to the fixed unit 1100. The first driving magnet 1410 may be adhered to the fixed unit 1100 by means of an adhesive. The first driving magnet 1410 may be disposed in the housing 1130. The first driving magnet 1410 may be secured to the housing 1130. The first driving magnet 1410 may be coupled to the housing 1130. The first driving magnet 1410 may be adhered to the housing 1130 by means of an adhesive. The first driving magnet 1410 may be disposed on a corner of the housing 1130. The first driving magnet 1410 may be disposed close to a corner of the housing 1130.

The first driving magnet 1410 may be a 2-pole magnetized magnet, which includes one N-pole area and one S-pole area. In a modified example, the first driving magnet 1410 may be a 4-pole magnetized magnet, which includes two N-pole areas and two S-pole areas.

The first driving magnet 1410 may include a plurality of magnets. The first driving magnet 1410 may include four magnets. The first driving magnet 1410 may include first to fourth magnets. The first to fourth magnets may be symmetrically disposed with respect to the optical axis. The first to fourth magnets may have the same size and shape as each other.

The camera device 1010 may include a second driving magnet 1420. The driving unit may include the second driving magnet 1420. The second driving magnet 1420 may be a magnet. The second driving magnet 1420 may be a permanent magnet. The second driving magnet 1420 may be a common magnet. The second driving magnet 1420 may be used for optical image stabilization (O1S).

The second driving magnet 1420 may be disposed in the fixed unit 1100. The second driving magnet 1420 may be secured to the fixed unit 1100. The second driving magnet 1420 may be coupled to the fixed unit 1100. The second driving magnet 1420 may be adhered to the fixed unit 1100 by means of an adhesive. The second driving magnet 1420 may be disposed in the housing 1130. The second driving magnet 1420 may be secured to the housing 1130. The second driving magnet 1420 may be coupled to the housing 1130. The second driving magnet 1420 may be adhered to the housing 1130 by means of an adhesive. The second driving magnet 1420 may be disposed on a corner of the housing 1130. The second driving magnet 1420 may be disposed close to a corner of the housing 1130.

As shown in FIG. 44A, the second driving magnet 1420 may be a 2-pole magnetized magnet, which includes one N-pole area and one S-pole area. In a modified example, as shown in FIG. 44B, the second driving magnet 1420 may be a 4-pole magnetized magnet, which includes two N-pole areas and two S-pole areas. The second driving magnet 1420 may include an air gap. The second driving magnet 1420 may include a neutral portion. The neutral portion of the second driving magnet 1420 may be a portion having a neutral polarity. The air gap of the second driving magnet 1420 may be disposed in the optical-axis direction.

The second driving magnet 1420 may include a plurality of magnets. The second driving magnet 1420 may include four magnets. The second driving magnet 1420 may include first to fourth magnets. The first to fourth magnets may be symmetrically disposed with respect to the optical axis. The first to fourth magnets may have the same size and shape as each other.

The second driving magnet 1420 may be disposed under the first driving magnet 1410. The second driving magnet 1420 may be disposed on the lower surface of the first driving magnet 1410. The second driving magnet 1420 may be in contact with the lower surface of the first driving magnet 1410. The second driving magnet 1420 may be secured to the lower surface of the first driving magnet 1410. The second driving magnet 1420 may be coupled to the lower surface of the first driving magnet 1410 by means of an adhesive. The length of the second driving magnet 1420 in the optical-axis direction may be shorter than the length of the first driving magnet 1410 in the optical-axis direction. The size of the second driving magnet 1420 may be smaller than the size of the first driving magnet 1410.

The camera device 1010 may include a first coil 1430. The driving unit may include the first coil 1430. The first coil 1430 may be disposed in the first moving unit 1200. The first coil 1430 may be secured to the first moving unit 1200. The first coil 1430 may be coupled to the first moving unit 1200. The first coil 1430 may be adhered to the first moving unit 1200 by means of an adhesive. The first coil 1430 may be disposed on the bobbin 1210. The first coil 1430 may be secured to the bobbin 1210. The first coil 1430 may be coupled to the bobbin 1210. The first coil 1430 may be adhered to the bobbin 1210 by means of an adhesive. The first coil 1430 may be conductively connected to a driver IC 1480. The first coil 1430 may be conductively connected to a lower elastic member 1720, a sensing board 1470, and the driver IC 1480. The first coil 1430 may receive current from the driver IC 1480.

The first coil 1430 may be disposed at a position corresponding to the first driving magnet 1410. The first coil 1430 may be disposed on the bobbin 1210 at a position corresponding to the first driving magnet 1410. The first coil 1430 may face the first driving magnet 1410. The first coil 1430 may include a surface facing the first driving magnet 1410. The first coil 1430 may be disposed adjacent to the first driving magnet 1410. The first coil 1430 may interact with the first driving magnet 1410. The first coil 1430 may electromagnetically interact with the first driving magnet 1410.

The first coil 1430 may move the first moving unit 1200 in the optical-axis direction. The first coil 1430 may move the bobbin 1210 in the optical-axis direction. The first coil 1430 may move the lens 1220 in the optical-axis direction. The first coil 1430 may move the first moving unit 1200 upwards in the optical-axis direction. The first coil 1430 may move the bobbin 1210 upwards in the optical-axis direction. The first coil 1430 may move the lens 1220 upwards in the optical-axis direction. The first coil 1430 may move the first moving unit 1200 downwards in the optical-axis direction. The first coil 1430 may move the bobbin 1210 downwards in the optical-axis direction. The first coil 1430 may move the lens 1220 downwards in the optical-axis direction.

The camera device 1010 may include a second coil 1440. The driving unit may include the second coil 1440. The second coil 1440 may be disposed in the second moving unit 1300. The second coil 1440 may be secured to the second moving unit 1300. The second coil 1440 may be coupled to the second moving unit 1300. The second coil 1440 may be adhered to the second moving unit 1300 by means of an adhesive. The second coil 1440 may be disposed on the holder 1340. The second coil 1440 may be secured to the holder 1340. The second coil 1440 may be coupled to the holder 1340. The second coil 1440 may be adhered to the holder 1340 by means of an adhesive. The second coil 1440 may be disposed so as to be wound around the protrusion of the holder 1340. The second coil 1440 may be disposed above the holder 1340. The second coil 1440 may be conductively connected to the second board 1310. Both ends of the second coil 1440 may be soldered to the second board 1310. The second coil 1440 may be conductively connected to a driver IC 1495. The second coil 1440 may be conductively connected to the second board 1310 and the driver IC 1495. The second coil 1440 may receive current from the driver IC 1495.

The second coil 1440 may be disposed at a position corresponding to the second driving magnet 1420. The second coil 1440 may be disposed on the holder 1340 at a position corresponding to the second driving magnet 1420. The second coil 1440 may face the second driving magnet 1420. The second coil 1440 may include a surface facing the second driving magnet 1420. The second coil 1440 may be disposed adjacent to the second driving magnet 1420. The second coil 1440 may interact with the second driving magnet 1420. The second coil 1440 may electromagnetically interact with the second driving magnet 1420.

The second coil 1440 may move the second moving unit 1300 in a direction perpendicular to the optical-axis direction. The second coil 1440 may move the second board 1310 in a direction perpendicular to the optical-axis direction. The second coil 1440 may move the sensor board 1320 in a direction perpendicular to the optical-axis direction. The second coil 1440 may move the image sensor 1330 in a direction perpendicular to the optical-axis direction. The second coil 1440 may move the holder 1340 in a direction perpendicular to the optical-axis direction. The second coil 1440 may rotate the second moving unit 1300 about the optical axis. The second coil 1440 may rotate the second board 1310 about the optical axis. The second coil 1440 may rotate the sensor board 1320 about the optical axis. The second coil 1440 may rotate the image sensor 1330 about the optical axis. The second coil 1440 may rotate the holder 1340 about the optical axis.

The second coil 1440 may include a plurality of coils. The second coil 1440 may include four coils. The second coil 1440 may include a coil for x-axis shift. The second coil 1440 may include a coil for y-axis shift.

The second coil 1440 may include a 2-1st coil 1441. The 2-1st coil 1441 may be a first sub-coil. The 2-1st coil 1441 may be a coil for x-axis shift. The 2-1st coil 1441 may move the second moving unit 1300 in the x-axis direction. The 2-1st coil 1441 may be disposed so as to be elongated along the y-axis. The 2-1st coil 1441 may include a plurality of coils. The 2-1st coil 1441 may include two coils. The two coils of the 2-1st coil 1441 may be conductively connected to each other. The 2-1st coil 1441 may include a connection coil connecting the two coils to each other. In this case, the two coils of the 2-1st coil 1441 may receive current at the same time. Alternatively, the two coils of the 2-1st coil 1441 may be conductively separated from each other, and may receive current individually.

The second coil 1440 may include a 2-2nd coil 1442. The 2-2nd coil 1442 may be a second sub-coil. The 2-2nd coil 1442 may be a coil for y-axis shift. The 2-2nd coil 1442 may move the second moving unit 1300 in the y-axis direction. The 2-2nd coil 1442 may be disposed so as to be elongated along the x-axis. The 2-2nd coil 1442 may include a plurality of coils. The 2-2nd coil 1442 may include two coils. The two coils of the 2-2nd coil 1442 may be conductively connected to each other. The 2-2nd coil 1442 may include a connection coil connecting the two coils to each other. In this case, the two coils of the 2-2nd coil 1442 may receive current at the same time. Alternatively, the two coils of the 2-2nd coil 1442 may be conductively separated from each other, and may receive current individually.

Referring to FIG. 46B, the camera device 1010 may include a Hall sensor 1445. The Hall sensor 1445 may be disposed on the second board 1310. The Hall sensor 1445 may be disposed in the hole in the holder 1340. The Hall sensor 1445 may include a Hall element (a Hall IC). The Hall sensor 1445 may detect the second driving magnet 1420. The Hall sensor 1445 may detect magnetic force of the second driving magnet 1420. The Hall sensor 1445 may face the second driving magnet 1420. The Hall sensor 1445 may be disposed at a position corresponding to the second driving magnet 1420. The Hall sensor 1445 may be disposed adjacent to the second driving magnet 1420. The Hall sensor 1445 may detect the position of the second moving unit 1300. The Hall sensor 1445 may detect movement of the second moving unit 1300. The Hall sensor 1445 may be disposed in the bore in the second coil 1440. A value detected by the Hall sensor 1445 may be used for feedback of hand-tremor compensation operation. The Hall sensor 1445 may be conductively connected to the driver IC 1495.

The Hall sensor 1445 may include a plurality of Hall sensors. The Hall sensor 1445 may include three Hall sensors. The Hall sensor 1445 may include first to third Hall sensors. The first Hall sensor may detect displacement of the second moving unit 1300 in the x-axis direction. The second Hall sensor may detect displacement of the second moving unit 1300 in the y-axis direction. The third Hall sensor alone may detect rotation of the second moving unit 1300 about the z-axis, or the third Hall sensor may detect rotation of the second moving unit 1300 about the z-axis together with at least one of the first Hall sensor or the second Hall sensor.

The camera device 1010 may include a sensing magnet 1450. The sensing magnet 1450 may be disposed in the first moving unit 1200. The sensing magnet 1450 may be secured to the first moving unit 1200. The sensing magnet 1450 may be coupled to the first moving unit 1200. The sensing magnet 1450 may be adhered to the first moving unit 1200 by means of an adhesive. The sensing magnet 1450 may be disposed on the bobbin 1210. The sensing magnet 1450 may be secured to the bobbin 1210. The sensing magnet 1450 may be coupled to the bobbin 1210. The sensing magnet 1450 may be adhered to the bobbin 1210 by means of an adhesive. The sensing magnet 1450 may have a size smaller than that of the first driving magnet 1410. The sensing magnet 1450 may have a size smaller than that of the second driving magnet 1420. Accordingly, the influence of the sensing magnet 1450 on operation may be minimized.

The sensing magnet 1450 may be disposed opposite a correction magnet 1460. The sensing magnet 1450 and the correction magnet 1460 may be disposed opposite each other with respect to the first moving unit 1200. The sensing magnet 1450 and the correction magnet 1460 may be disposed on opposite sides of the bobbin 1210.

The camera device 1010 may include a correction magnet 1460. The correction magnet 1460 may be a compensation magnet. The correction magnet 1460 may be disposed in the first moving unit 1200. The correction magnet 1460 may be secured to the first moving unit 1200. The correction magnet 1460 may be coupled to the first moving unit 1200. The correction magnet 1460 may be adhered to the first moving unit 1200 by means of an adhesive. The correction magnet 1460 may be disposed on the bobbin 1210. The correction magnet 1460 may be secured to the bobbin 1210. The correction magnet 1460 may be coupled to the bobbin 1210. The correction magnet 1460 may be adhered to the bobbin 1210 by means of an adhesive. The correction magnet 1460 may have a size smaller than that of the first driving magnet 1410. The correction magnet 1460 may have a size smaller than that of the second driving magnet 1420. Accordingly, the influence of the correction magnet 1460 on operation may be minimized. In addition, the correction magnet 1460 may be disposed opposite the sensing magnet 1450, thereby establishing magnetic force equilibrium with the sensing magnet 1450. Accordingly, it is possible to prevent the occurrence of tilting due to the sensing magnet 1450.

The camera device 1010 may include a sensing board 1470. The sensing board 1470 may be a substrate. The sensing board 1470 may be a printed circuit board (PCB). The sensing board 1470 may be a flexible substrate. The sensing board 1470 may be an FPCB. The sensing board 1470 may be coupled to the first board 1110. The sensing board 1470 may be connected to the first board 1110. The sensing board 1470 may be conductively connected to the first board 1110. The sensing board 1470 may be soldered to the first board 1110. The sensing board 1470 may be disposed in the housing 1130. The sensing board 1470 may be secured to the housing 1130. The sensing board 1470 may be coupled to the housing 1130. The housing 1130 may have formed therein a recess or a hole having a shape corresponding to that of the sensing board 1470. The sensing board 1470 may be disposed in the recess or the hole in the housing 1130.

The camera device 1010 may include a driver IC 1480. The driver IC 1480 may be an AF driver IC. The driver IC 1480 may be conductively connected to the first coil 1430. The driver IC 1480 may apply current to the first coil 1430 in order to perform AF operation. The driver IC 1480 may apply power to the first coil 1430. The driver IC 1480 may apply current to the first coil 1430. The driver IC 1480 may apply voltage to the first coil 1430. The driver IC 1480 may be disposed on the sensing board 1470. The driver IC 1480 may be disposed at a position corresponding to the sensing magnet 1450. The driver IC 1480 may be disposed so as to face the sensing magnet 1450. The driver IC 1480 may be disposed adjacent to the sensing magnet 1450.

The driver IC 1480 may include a sensor. The sensor may include a Hall element (a Hall IC). The sensor may be disposed at a position corresponding to the sensing magnet 1450. The sensor may be disposed so as to face the sensing magnet 1450. The sensor may be disposed adjacent to the sensing magnet 1450. The sensor may detect the sensing magnet 1450. The sensor may detect magnetic force of the sensing magnet 1450. The sensor may detect the position of the first moving unit 1200. The sensor may detect movement of the first moving unit 1200. A value detected by the sensor may be used for feedback of autofocus operation.

The camera device 1010 may include a gyro sensor (not shown). The gyro sensor may be disposed on the first board 1110. The gyro sensor may detect shaking of the camera device 1010. The gyro sensor may detect an angular speed or a linear speed generated by shaking of the camera device 1010. The gyro sensor may be conductively connected to the driver IC 1495. Shaking of the camera device 1010 detected by the gyro sensor may be used for optical image stabilization (OIS) operation.

The camera device 1010 may include a driver IC 1495. The driver IC 1495 may be an OIS driver IC. The driver IC 1495 may be conductively connected to the second coil 1440. The driver IC 1495 may apply current to the second coil 1440 in order to perform OIS operation. The driver IC 1495 may apply power to the second coil 1440. The driver IC 1495 may apply current to the second coil 1440. The driver IC 1495 may apply voltage to the second coil 1440. The driver IC 1495 may be disposed on the second board 1310.

The camera device 1010 may include a connection member. The connection member may be an interposer. The connection member may support movement of the second moving unit 1300. The connection member may movably support the second moving unit 1300. The connection member may connect the second moving unit 1300 to the fixed unit 1100. The connection member may connect the first board 1110 to the second board 1310. The connection member may conductively connect the first board 1110 to the second board 1310. The connection member may connect the first board 1110 to the second moving unit 1300. The connection member may guide movement of the second moving unit 1300. The connection member may guide the second moving unit 1300 to move in a direction perpendicular to the optical-axis direction. The connection member may guide the second moving unit 1300 to rotate about the optical axis. The connection member may restrict movement of the second moving unit 1300 in the optical-axis direction.

The connection member may include a connection board 1600. The connection member may include an elastic member connecting the fixed unit 1100 to the second moving unit 1300. The connection member may include a leaf spring. The connection member may include a wire 1800. The connection member may include a ball disposed between the fixed unit 1100 and the second moving unit 1300.

The camera device 1010 may include a connection board 1600. The connection board 1600 may be a connection part. The connection board 1600 may be a connection member. The connection board 1600 may be a flexible substrate. The connection board 1600 may be a flexible substrate. The connection board 1600 may be a flexible printed circuit board. The connection board 1600 may be a flexible printed circuit board (FPCB). At least a portion of the connection board 1600 may be flexible. The second board 1310 and the connection board 1600 may be integrally formed with each other.

The connection board 1600 may support the second moving unit 1300. The connection board 1600 may support movement of the second moving unit 1300. The connection board 1600 may movably support the second moving unit 1300. The connection board 1600 may connect the second moving unit 1300 to the fixed unit 1100. The connection board 1600 may connect the first board 1110 to the second board 1310. The connection board 1600 may conductively connect the first board 1110 to the second board 1310. The connection board 1600 may guide movement of the second moving unit 1300. The connection board 1600 may guide the second moving unit 1300 to move in a direction perpendicular to the optical-axis direction. The connection board 1600 may guide the second moving unit 1300 to rotate about the optical axis. The connection board 1600 may restrict movement of the second moving unit 1300 in the optical-axis direction. A portion of the connection board 1600 may be coupled to the base 1120.

The connection board 1600 may include two connection boards 1600, which are spaced apart from each other and are formed to be symmetrical with each other. The two connection boards 1600 may be disposed on opposite sides of the second board 1310. The connection board 1600 may be bent six times to connect the first board 1110 to the second board 1310.

The connection board 1600 may include a first region that is connected to the second board 1310 and is bent in the optical-axis direction. The first region may be connected to the second board 1310, and may be bent in the optical-axis direction. The first region may be connected to the second board 1310, and may extend in the optical-axis direction. The first region may be connected to the second board 1310, and may be bent and extend in the optical-axis direction. The connection board 1600 may include a second region extending from the first region. The connection board 1600 may include a third region that is bent from the second region in a direction perpendicular to the optical-axis direction. The third region may be bent from the second region in a direction perpendicular to the optical-axis direction. The third region may extend from the second region in a direction perpendicular to the optical-axis direction. The third region may be bent and extend from the second region in a direction perpendicular to the optical-axis direction.

The connection board 1600 may include a connection portion 1610 including the first region. The connection board 1600 may include an extension portion 1620 including the second region and the third region. The connection board 1600 may include a connection portion 1610 connected to the second board 1310. The connection board 1600 may include an extension portion 1620 extending from the connection portion 1610. The connection board 1600 may include a terminal portion 1630, which is connected to the extension portion 1620 and includes a terminal.

The connection board 1600 may include a connection portion 1610. The connection portion 1610 may be connected to the second moving unit 1300. The connection portion 1610 may be coupled to the second moving unit 1300. The connection portion 1610 may be secured to the second moving unit 1300. The connection portion 1610 may be connected to the second board 1310. The connection portion 1610 may be coupled to the second board 1310. The connection portion 1610 may be secured to the second board 1310. The connection portion 1610 may include a first bent region bent in the optical-axis direction. The connection portion 1610 may include a first region, which is bent in the optical-axis direction with respect to the second board 1310, and a second region, which extends from the first region and is bent in a direction perpendicular to the optical-axis direction.

The connection board 1600 may include an extension portion 1620. The extension portion 1620 may connect the connection portion 1610 to the terminal portion 1630. The extension portion 1620 may extend from the connection portion 1610. The extension portion 1620 may include a second bent region bent in a direction perpendicular to the optical-axis direction.

The connection board 1600 may include a terminal portion 1630. The terminal portion 1630 may be coupled to the fixed unit 1100. The terminal portion 1630 may be secured to the fixed unit 1100. The terminal portion 1630 may be coupled to the first board 1110. The terminal portion 1630 may be connected to the first board 1110. The terminal portion 1630 may be soldered to the first board 1110. The terminal portion 1630 may be secured to the first board 1110. The terminal portion 1630 may be coupled to the base 1120.

The terminal portion 1630 may be secured to the base 1120. The terminal portion 1630 may include a terminal. The terminal may be coupled to the first board 1110.

The camera device 1010 may include a flexible substrate. The flexible substrate may connect the fixed unit 1100 to the second moving unit 1300. The flexible substrate may include a connection portion 1610, which is connected to the second moving unit 1300, an extension portion 1620, which extends from the connection portion 1610, and a terminal portion 1630, which is connected to the extension portion 1620 and includes a terminal.

The connection board 1600 may include a first portion coupled to the first board 1110, a second portion coupled to the second board 1310, and a third portion connecting the first portion to the second portion. At least part of the third portion may be disposed parallel to the optical axis. The length of the third portion in the optical-axis direction may be greater than the thickness thereof. At least part of the second portion of the connection board 1600 may be disposed parallel to the second board 1310. At least part of the third portion of the connection board 1600 may be disposed perpendicular to the second portion. A part of the third portion of the connection board 1600, which corresponds to a corner of the second board 1310, may be bent so as to be round. The second board 1310 may include a first side surface and a second side surface, which are disposed opposite each other, and a third side surface and a fourth side surface, which are disposed opposite each other. The second portion of the connection board 1600 may be coupled to the first side surface and the second side surface of the second board 1310. The first portion of the connection board 1600 may be coupled to portions of the first board 1110 that correspond to the third side surface and the fourth side surface of the second board 1310.

The camera device 1010 may include a metal plate. The connection member may include the metal plate. The connection board 1600 may include the metal plate. However, it is to be understood that the metal plate is a component separate from the connection board 1600. The metal plate may be a metal member. The metal plate may be a metal part. The metal plate may be a metal layer. The metal plate may be a metal thin film. The metal plate may be formed of metal. The metal plate may be formed of an alloy. The metal plate may be formed of a copper alloy. The metal plate may be formed of a conductive material. The metal plate may be distinguished from a conductive layer 1602 of the connection board 1600. The metal plate may be formed of a material different from that of the conductive layer 1602 of the connection board 1600. The metal plate may be disposed on the connection board 1600. The metal plate may be coupled to the connection board 1600. The metal plate may be secured to the connection board 1600. The metal plate may be integrally formed with the connection board 1600. The metal plate may be elastic.

At least a portion of the metal plate may have the same length as the extension portion 1620 in the optical-axis direction. The metal plate may extend to have the same length as the extension portion 1620 in the optical-axis direction. The thickness of the metal plate may be equal to that of the connection board 1600. The thickness of the metal plate may be greater than that of the connection board 1600. The thickness of the conductive layer may be 7 to 50 μm. The thickness of the metal plate may be 20 to 150 μm. The metal plate may be connected to the ground GND, and thus may be used for impedance matching and noise suppression.

At least a portion of the metal plate may be disposed on the extension portion 1620 of the connection board 1600.

The extension portion 1620 may include a bent region bent in a direction perpendicular to the optical-axis direction. In this case, the metal plate may be disposed in the bent region. The metal plate may be disposed on the inner surface of the extension portion 1620. The metal plate may be disposed on the outer surface of the extension portion 1620.

The metal plate may be formed of a conductive material. The metal plate may be conductively connected to the second board 1310. The metal plate may be conductively connected to the image sensor 1330. The metal plate may be conductively connected to the driver IC 1495. The metal plate may be connected to a terminal 1631 of the connection board 1600. The metal plate may be conductively connected to the terminal 1631 of the connection board 1600. The metal plate may be in direct contact with the terminal 1631 of the connection board 1600. The metal plate may be coupled to the terminal 1631 of the connection board 1600 by means of a conductive member. The metal plate may be used as the ground GND. The metal plate may be connected to a ground terminal of the connection board 1600. The metal plate may be conductively connected to the first board 1110. In this case, the number of power connection patterns of the connection board 1600 may be reduced.

The camera device 1010 may include a sheet of electromagnetic interference (EMI) tape. The connection board 1600 may include a metal member disposed on the outer side surface thereof. The metal member may include at least one of a sheet of EMI tape or a metal plate. The connection board 1600 may include an EMI member. The connection board 1600 may include a sheet of EMI tape. The EMI member may include the EMI tape. The EMI member may further include a non-adhesive EMI member. The EMI tape may replace the metal plate. Alternatively, the EMI tape may be disposed together with the metal plate. The EMI tape may be a sheet of conductive tape. The EMI tape may be conductive and adhesive. The EMI tape may be disposed on the connection board 1600. The EMI tape may be disposed on the inner surface of the connection board 1600. The EMI tape may be disposed on the outer surface of the connection board 1600. The EMI tape may be disposed on the inner surface of the extension portion 1620 of the connection board 1600. The EMI tape may be disposed on the outer surface of the extension portion 1620 of the connection board 1600. The EMI tape may be adhered to the connection board 1600 to increase the elasticity or rigidity of the connection board 1600. The EMI tape may be a reinforcing member.

The EMI tape may be conductively connected to the second board 1310. The EMI tape may be conductively connected to the image sensor 1330. The EMI tape may be conductively connected to the driver IC 1495. The EMI tape may be connected to the terminal 1631 of the connection board 1600. The EMI tape may be conductively connected to the terminal 1631 of the connection board 1600. The EMI tape may be in direct contact with the terminal 1631 of the connection board 1600. The EMI tape may be used as the ground GND. The EMI tape may be connected to the ground terminal of the connection board 1600. The EMI tape may be conductively connected to the first board 1110. In this case, the number of power connection patterns of the connection board 1600 may be reduced.

The camera device 1010 may include an elastic member 1700. The elastic member 1700 may be a support member. The elastic member 1700 may connect the fixed unit 1100 to the first moving unit 1200. The elastic member 1700 may elastically connect the fixed unit 1100 to the first moving unit 1200. The elastic member 1700 may connect the bobbin 1210 to the housing 1130. The elastic member 1700 may elastically connect the bobbin 1210 to the housing 1130. The elastic member 1700 may support the first moving unit 1200 so that the first moving unit 1200 is movable relative to the fixed unit 1100. The elastic member 1700 may be deformed when the first moving unit 1200 moves. When the movement of the first moving unit 1200 ends, the elastic member 1700 may move the first moving unit 1200 to the initial position using the restoring force (elastic force) thereof. The elastic member 1700 may include a leaf spring. The elastic member 1700 may include a spring. At least a portion of the elastic member 1700 may be elastic. The elastic member 1700 may apply restoring force (elastic force) to the first moving unit.

The camera device 1010 may include an upper elastic member 1710. The elastic member 1700 may include the upper elastic member 1710. The upper elastic member 1710 may be disposed on the lower elastic member 1720. The upper elastic member 1710 may include an inner portion coupled to the bobbin 1210. The inner portion of the upper elastic member 1710 may be coupled to the upper portion of the bobbin 1210. The inner portion of the upper elastic member 1710 may be disposed on the upper surface of the bobbin 1210. The upper elastic member 1710 may include an outer portion coupled to the housing 1130. The outer portion of the upper elastic member 1710 may be coupled to the lower portion of the housing 1130. The outer portion of the upper elastic member 1710 may be disposed on the lower surface of the housing 1130. The upper elastic member 1710 may include a connection portion connecting the inner portion thereof to the outer portion thereof. The connection portion may be elastic.

The camera device 1010 may include a lower elastic member 1720. The elastic member 1700 may include the lower elastic member 1720. The lower elastic member 1720 may be disposed under the upper elastic member 1710. The lower elastic member 1720 may include an inner portion coupled to the bobbin 1210. The inner portion of the lower elastic member 1720 may be coupled to the lower portion of the bobbin 1210. The inner portion of the lower elastic member 1720 may be disposed on the lower surface of the bobbin 1210. The lower elastic member 1720 may include an outer portion coupled to the housing 1130. The outer portion of the lower elastic member 1720 may be coupled to the upper portion of the housing 1130. The outer portion of the lower elastic member 1720 may be disposed on the upper surface of the housing 1130. The lower elastic member 1720 may include a connection portion connecting the inner portion thereof to the outer portion thereof. The connection portion may be elastic.

The lower elastic member 1720 may include a plurality of lower elastic units. The lower elastic member 1720 may include first and second lower elastic units 1720-1 and 1720-2. The lower elastic member 1720 may include two lower elastic units 1720-1 and 1720-2. The two lower elastic units 1720-1 and 1720-2 may be spaced apart from each other to conductively connect the sensing board 1470 to the first coil 1430.

The camera device 1010 may include a wire 1800. The wire 1800 may be a wire spring. The wire 1800 may be an elastic member. Alternatively, the wire 1800 may be a leaf spring. The wire 1800 may connect the fixed unit 1100 to the second moving unit 1300. The wire 1800 may elastically connect the fixed unit 1100 to the second moving unit 1300. The wire 1800 may connect the housing 1130 to the second board 1310. The wire 1800 may elastically connect the housing 1130 to the second board 1310. The wire 1800 may movably support the second moving unit 1300.

The wire 1800 may be disposed in the optical-axis direction. The wire 1800 may support the second moving unit 1300 to move or rotate in a direction perpendicular to the optical-axis direction. The wire 1800 may connect the upper elastic member 1710 to the terminal 1380. The wire 1800 may conductively connect the upper elastic member 1710 to the terminal 1380. The wire 1800 may be coupled to the upper elastic member 1710 by means of a solder. The wire 1800 may be coupled to the terminal 1380 by means of a solder. The wire 1800 may include a plurality of wires. The wire 1800 may include four wires.

The image sensor 1330 may be assembled in the following order. The sensor board 1320, which is a rigid cavity PCB, may be attached to the upper side of the plate member 1370, which is a metal stiffener. Thereafter, the image sensor 1330 may be mounted on the upper surface of the stiffener. Thereafter, the image sensor 1330 may be wire-bonded to the sensor board 1320. The plate member 1370 may be etched in the mounting area of the sensor board 1320. Furthermore, additional etching may also be applied to the lower surface thereof. Accordingly, the weight of the plate member 1370 may be reduced.

The description of X-axis shift operation, Y-axis shift operation, and rolling operation of the OIS moving unit due to electromagnetic interaction between the first to fourth coil units 230-1 to 230-4 and the first to fourth magnets 23A to 23D in FIG. 31 may also be applied to X-axis shift operation, Y-axis shift operation, and rolling operation of the second moving unit 1300 due to electromagnetic interaction between the second driving magnet 1420 and the second coil 1440.

In addition, the description given with reference to FIGS. 32A to 32C may also be applied to movement of the second moving unit 1300 caused by operation of the second coil 1440 of the camera device 1010 according to the embodiment in FIG. 37.

The three Hall sensors 1445 of the camera device 1010 according to the embodiment in FIG. 37 may correspond to the first to third sensors 240a to 240c in FIG. 9, and the description of the first to third sensors 240a to 240c in FIG. 9 may also be applied to the three Hall sensors 1445 in FIG. 37.

In addition, the driver IC 1495 in FIG. 37 may correspond to the controller 830, 830-1, or 885 of the camera device according to the embodiment in FIG. 9, and the description of the controller 830, 830-1, or 885 of the camera device according to the embodiment in FIG. 9 may also be applied to the driver IC 1495 in FIG. 37.

In addition, the camera module 10 or 20 according to the embodiment may be included in an optical instrument for the purpose of forming an image of an object present in a space using reflection, refraction, absorption, interference, and diffraction, which are characteristics of light, for the purpose of increasing visibility, for the purpose of recording and reproduction of an image using a lens, or for the purpose of optical measurement or image propagation or transmission. For example, the optical instrument according to the embodiment may be a cellular phone, a mobile phone, a smartphone, a portable smart device, a digital camera, a laptop computer, a digital broadcasting terminal, a personal digital assistant (PDA), a portable multimedia player (PMP), a navigation device, etc., without being limited thereto, and may also be any of devices for capturing images or pictures.

Figure 48:
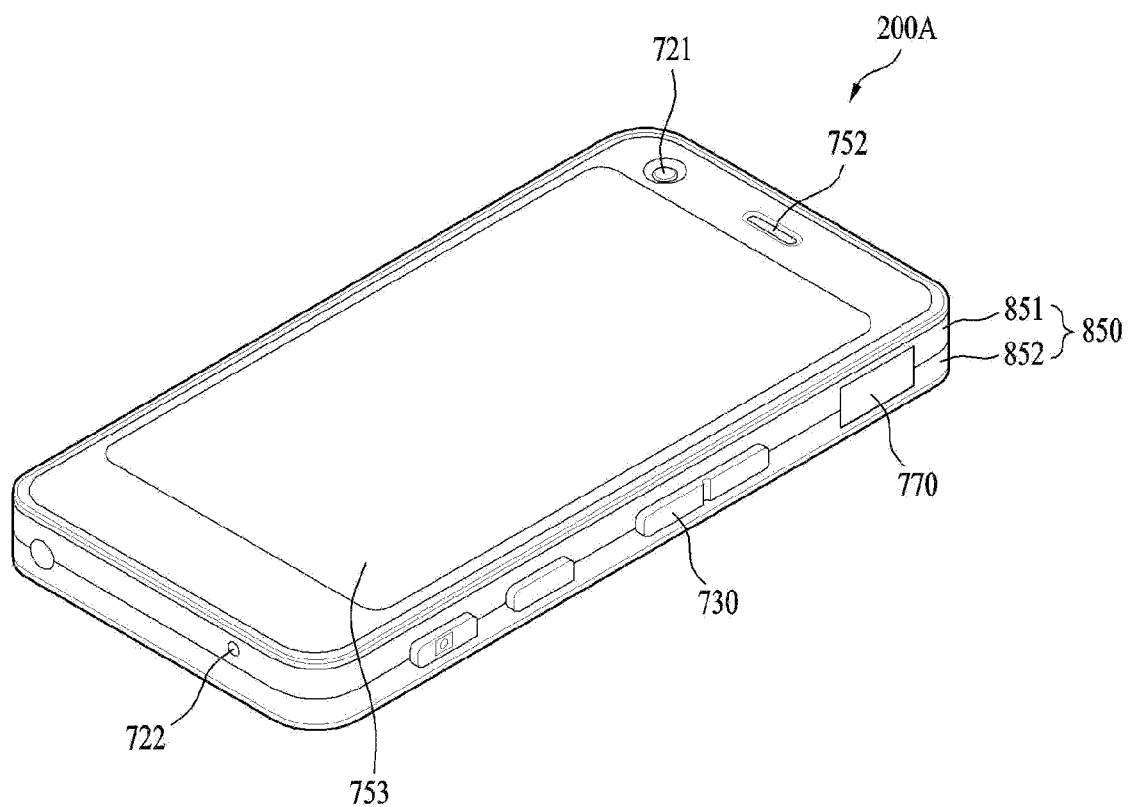
FIG. 48 is a perspective view of a portable terminal according to an embodiment.
Figure 49:
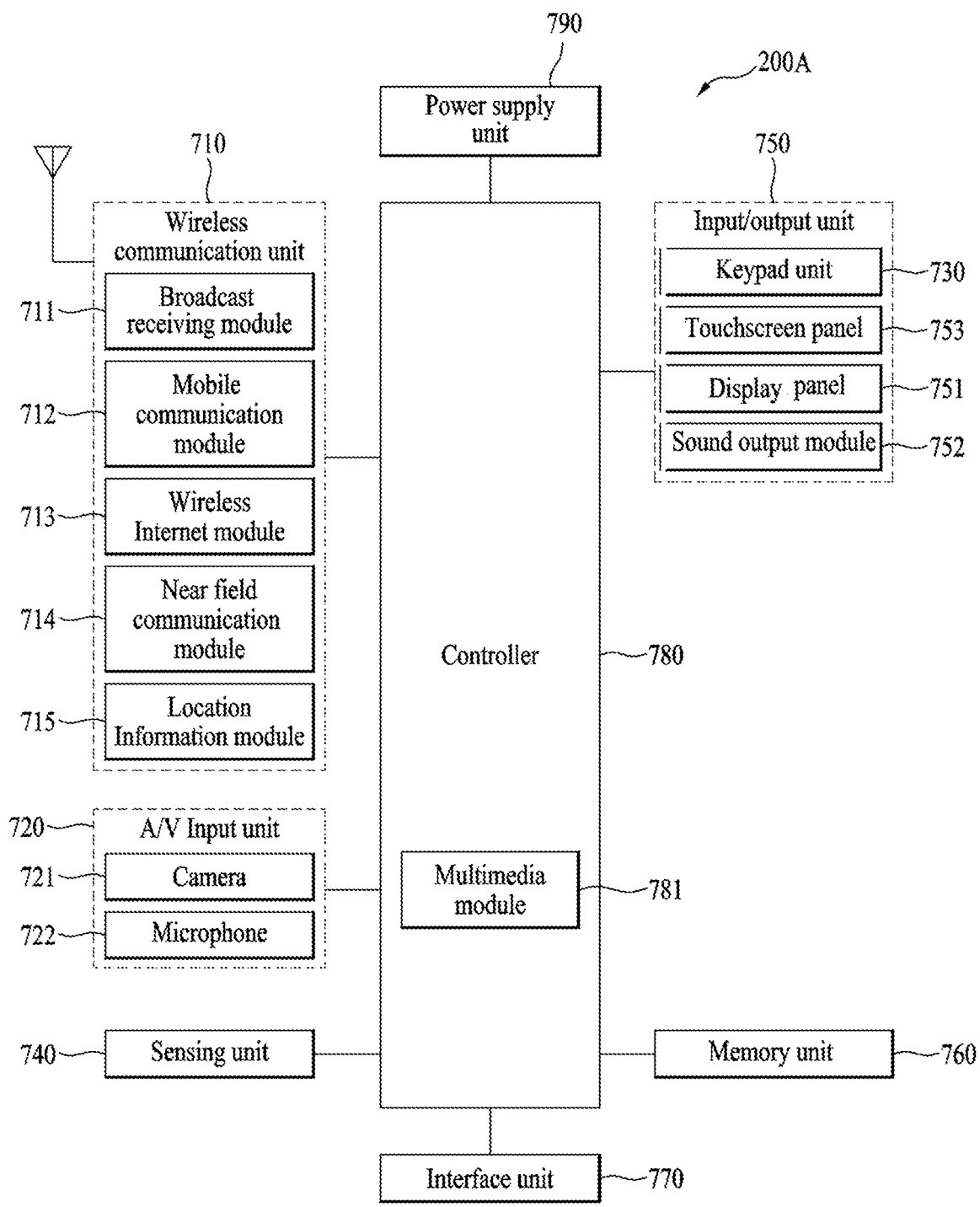
FIG. 49 is a configuration diagram of the portable terminal shown in FIG. 48.

FIG. 48 is a perspective view of the optical instrument 200A according to the embodiment, and FIG. 49 is a configuration diagram of the optical instrument 200A shown in FIG. 48.

Referring to FIGS. 48 and 49, the optical instrument 200A (hereinafter referred to as a "terminal") may include a body 850, a wireless communication unit 710, an A/V input unit 720, a sensor unit 740, an input/output unit 750, a memory unit 760, an interface unit 770, a controller 780, and a power supply unit 790.

The body 850 shown in FIG. 48 may have a bar shape, without being limited thereto, and may be any of various types such as, for example, a slide type, a folder type, a swing type, or a swivel type, in which two or more sub-bodies are coupled so as to be movable relative to each other.

The body 850 may include a case (a casing, a housing, a cover, or the like) defining the external appearance thereof. In an example, the body 850 may be divided into a front case 851 and a rear case 852. A variety of electronic components of the terminal may be mounted in the space defined between the front case 851 and the rear case 852.

The wireless communication unit 710 may include one or more modules, which enable wireless communication between the optical instrument 200A and a wireless communication system or between the optical instrument 200A and a network in which the optical instrument 200A is located. In an example, the wireless communication unit 710 may include a broadcast receiving module 711, a mobile communication module 712, a wireless Internet module 713, a nearfield communication module 714, and a location information module 715.

The audio/video (A/V) input unit 720 serves to input audio signals or video signals, and may include a camera 721 and a microphone 722.

The camera 721 may include the camera module 10 or 20 according to the embodiment.

The sensor unit 740 may sense the current state of the optical instrument 200A, such as the open or closed state of the optical instrument 200A, the position of the optical instrument 200A, the presence or absence of a user's touch, the orientation of the optical instrument 200A, or the acceleration/deceleration of the optical instrument 200A, and may generate a sensing signal to control the operation of the optical instrument 200A. For example, when the optical instrument 200A is a slide-type phone, whether the slide-type phone is open or closed may be detected. In addition, the sensor unit 740 serves to sense whether power is supplied from the power supply unit 790 or whether the interface unit 770 is coupled to an external device.

The input/output unit 750 serves to generate visual, audible, or tactile input or output. The input/output unit 750 may generate input data to control the operation of the optical instrument 200A, and may display information processed in the optical instrument 200A.

The input/output unit 750 may include a keypad unit 730, a display module 751, a sound output module 752, and a touchscreen panel 753. The keypad unit 730 may generate input data in response to input to a keypad.

The display module 751 may include a plurality of pixels, the color of which varies in response to electrical signals. In an example, the display module 751 may include at least one of a liquid crystal display, a thin-film transistor liquid crystal display, an organic light-emitting diode, a flexible display, or a 3D display.

The sound output module 752 may output audio data received from the wireless communication unit 710 in a call-signal reception mode, a call mode, a recording mode, a voice recognition mode, or a broadcast reception mode, or may output audio data stored in the memory unit 760.

The touchscreen panel 753 may convert variation in capacitance, caused by a user's touch on a specific region of a touchscreen, into electrical input signals.

The memory unit 760 may store programs for the processing and control of the controller 780, and may temporarily store input/output data (e.g. a phone book, messages, audio, still images, pictures, and moving images). For example, the memory unit 760 may store images captured by the camera 721, for example, pictures or moving images.

The interface unit 770 serves as a passage for connection between the optical instrument 200A and an external device. The interface unit 770 may receive data or power from the external device, and may transmit the same to respective components inside the optical instrument 200A, or may transmit data inside the optical instrument 200A to the external device. For example, the interface unit 770 may include a wired/wireless headset port, an external charger port, a wired/wireless data port, a memory card port, a port for connection of a device having an identification module, an audio input/output (I/O) port, a video input/output (I/O) port, and an earphone port.

The controller 780 may control the overall operation of the optical instrument 200A. For example, the controller 780 may perform control and processing related to voice calls, data communication, and video calls.

The controller 780 may include a multimedia module 781 for multimedia playback. The multimedia module 781 may be provided inside the controller 780, or may be provided separately from the controller 780.

The controller 780 may perform pattern recognition processing, by which writing or drawing input to the touchscreen is perceived as characters or images.

The power supply unit 790 may supply power required to operate the respective components upon receiving external power or internal power under the control of the controller 780.

The features, structures, effects, and the like described above in the embodiments are included in at least one embodiment of the present disclosure, but are not necessarily limited to only one embodiment. Furthermore, the features, structures, effects, and the like exemplified in the respective embodiments may be combined with other embodiments or modified by those skilled in the art. Therefore, content related to such combinations and modifications should be construed as falling within the scope of the present disclosure.

INDUSTRIAL APPLICABILITY

Embodiments may be used for a camera module and an optical instrument capable of increasing an OIS correction angle resulting from rolling operation and reducing the amount of power consumed during OIS operation.

The invention claimed is:

1. A camera module comprising:
a fixed unit comprising a magnet; and
a moving unit comprising a first circuit board spaced apart from the fixed unit, an image sensor electrically connected to the first circuit board, a coil facing the magnet, and a spacing member disposed between the first circuit board and the coil,
wherein the moving unit is configured to move in a direction perpendicular to an optical axis by an interaction between the magnet and coil,
wherein the spacing member comprises an upper surface facing the fixed unit and a lower surface which is formed opposite the upper surface thereof, and
wherein the coil is disposed on the upper surface of the spacing member and the first circuit board is disposed on the lower surface of the spacing member.

2. The camera module according to claim 1, comprising a position sensor disposed on the first circuit board.

3. The camera module according to claim 2, wherein the position sensor is not overlapped with the coil in an optical axis direction.

4. The camera module according to claim 1, comprising an elastic support member coupled to the fixed unit and the moving unit.

5. The camera module according to claim 4, wherein the fixed unit comprises a second circuit board spaced apart from the first circuit board.

6. The camera module according to claim 1, wherein the coil is coupled to the spacing member and electrically connected to the first circuit board.

7. The camera module according to claim 1, wherein the lower surface of the spacing member comprises a first surface and a second surface which is stepped with respect to the first surface, wherein the second surface is located higher than the first surface, and the first circuit board is disposed the second surface of the spacing member.

8. The camera module according to claim 1, wherein the image sensor is disposed on the first circuit board.

9. The camera module according to claim 1, wherein the spacing member comprises a bore corresponding to the image sensor, and the coil is disposed between the bore and a side of the upper surface of the spacing member.

10. The camera module according to claim 1, wherein the spacing member comprises a coupling protrusion protruding from an upper surface thereof and the coil comprises a hole coupled to the coupling protrusion.

11. The camera module according to claim 1, wherein the spacing member comprises a hole, and at least a portion of the position sensor is disposed in the hole of the spacing member and overlaps the magnet in an optical axis direction.

12. The camera module according to claim 1, wherein the first circuit board comprises a protruding portion protruding each of corners thereof with respect to a side thereof, and
wherein a seating recess is formed in the lower surface of the spacing member, and the protruding portion of the first circuit board is disposed in the seating recess of the spacing member.

13. The camera module according to claim 1, wherein the coil comprises first to fourth coil units disposed four corners of the spacing member, and
wherein the magnet comprises a first magnet corresponding to the first coil unit, a second magnet corresponding to the second coil unit, a third magnet corresponding to the third coil unit, and a fourth magnet corresponding to the fourth coil unit.

14. The camera module according to claim 13, comprising:
a first sensor disposed below the first coil unit and facing the first magnet in an optical axis direction;
a second sensor disposed below the second coil unit and facing the second magnet in an optical axis direction; and
a third sensor disposed below the third coil unit and facing the third magnet in an optical axis direction.

15. The camera module according to claim 14, wherein the first to fourth coil units are driven individually.

16. The camera module according to claim 14, wherein the first to third coil units are driven individually, and the fourth coil unit is driven together with any one of the first to third coil units.

17. A camera module comprising:
a lens;
an image sensor disposed at a position corresponding to the lens;
a driving unit configured to move the image sensor;
a circuit board disposed to be spaced apart from the lens;
a position sensor disposed on the circuit board; and
a spacing member disposed on the circuit board,
wherein the driving unit comprises a magnet and a coil facing the magnet,
wherein the spacing member comprises a lower surface facing the circuit board and an upper surface opposite the lower surface thereof,
wherein the coil is disposed on the upper surface of the spacing member and the circuit board is disposed on the lower surface of the spacing member, and
wherein the image sensor is configured to move in a direction perpendicular to an optical axis direction.

18. A camera module comprising:
a fixed unit comprising a magnet;
a moving unit comprising a first circuit board spaced apart from the fixed unit, an image sensor electrically connected to the first circuit board, a holder disposed on the first circuit board, a coil facing the magnet and disposed on the holder, and a position sensor disposed on the first circuit board; and
a support member connecting the fixed unit and the moving unit,
wherein the moving unit is configured to move in a direction perpendicular to an optical axis by an interaction between the magnet and coil,
wherein the position sensor is configured to detect a displacement of the moving unit in the direction perpendicular to the optical axis,
wherein the holder comprises an upper surface facing the fixed unit and a lower surface which is formed opposite the upper surface thereof, and
wherein the coil is disposed on the upper surface of the holder and the first circuit board is disposed on the lower surface of the holder.

19. The camera module according to claim 18, wherein the holder is disposed between the coil and the first circuit board.

* * * * *